US009946144B2

(12) United States Patent
Abe et al.

(10) Patent No.: US 9,946,144 B2
(45) Date of Patent: Apr. 17, 2018

(54) PROJECTION OPTICAL SYSTEM AND IMAGE PROJECTING APPARATUS

(75) Inventors: Issei Abe, Kanagawa (JP); Kazuhiro Fujita, Tokyo (JP); Atsushi Takaura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 1440 days.

(21) Appl. No.: 12/160,818

(22) PCT Filed: Nov. 28, 2007

(86) PCT No.: PCT/JP2007/073527
§ 371 (c)(1),
(2), (4) Date: Jul. 14, 2008

(87) PCT Pub. No.: WO2008/069253
PCT Pub. Date: Jun. 12, 2008

(65) Prior Publication Data
US 2010/0157421 A1    Jun. 24, 2010

(30) Foreign Application Priority Data

Dec. 4, 2006  (JP) ................................. 2006-327592
Oct. 10, 2007  (JP) ................................. 2007-264801

(51) Int. Cl.
*G02B 17/00*     (2006.01)
*G03B 21/20*     (2006.01)
(Continued)

(52) U.S. Cl.
CPC ..... *G03B 21/2066* (2013.01); *G02B 17/0852* (2013.01); *G02B 17/0896* (2013.01);
(Continued)

(58) Field of Classification Search
CPC ........ G02B 17/00; G02B 17/02; G02B 17/06; G02B 17/0626; G02B 17/0647;
(Continued)

(56) References Cited

U.S. PATENT DOCUMENTS 4,342,503 A * 8/1982 Shafer ................ G02B 17/0808
                                                        359/729
4,783,158 A * 11/1988 Shackman ................. 359/366
(Continued)

FOREIGN PATENT DOCUMENTS

JP      4 57014      2/1992
JP      7 13157      1/1995
(Continued)

OTHER PUBLICATIONS

U.S. Appl. No. 12/055,520, filed Mar. 26, 2008, Takaura, et al.
(Continued)

*Primary Examiner* — Thong Nguyen
(74) *Attorney, Agent, or Firm* — Oblon, McClelland, Maier & Neustadt, L.L.P.

(57) ABSTRACT

A projection optical system is disclosed. The projection optical system includes a first optical system configured to form a first image conjugated with an object and a second optical system configured to project a second image conjugated with the first image toward a projection surface. At least one of the first optical system and second optical system includes at least one optical element(s) movable relative to the object is provided. An image distance of the projection optical system is changed and a size of the second image is changed, by moving at least one of the optical element(s) relative to the object.

20 Claims, 37 Drawing Sheets

(51) Int. Cl.
*G02B 17/08* (2006.01)
*G03B 21/00* (2006.01)
*G03B 21/10* (2006.01)
*G03B 21/28* (2006.01)

(52) U.S. Cl.
CPC .......... *G03B 21/005* (2013.01); *G03B 21/10* (2013.01); *G03B 21/28* (2013.01)

(58) Field of Classification Search
CPC .. G02B 17/08; G02B 17/0804; G02B 17/082; G02B 17/0836; G02B 15/00; G02B 15/14; G02B 15/15; G02B 15/16
USPC ................................ 359/362–366, 432, 676
See application file for complete search history.

(56) References Cited

U.S. PATENT DOCUMENTS

| | | | |
|---|---|---|---|
| 4,812,030 A * | 3/1989 | Pinson | 359/859 |
| 5,089,910 A * | 2/1992 | Sigler | G02B 13/14 359/357 |
| 5,285,287 A | 2/1994 | Shikama | |
| 5,400,161 A * | 3/1995 | Lambert, Jr. | 349/1 |
| 5,671,993 A * | 9/1997 | Shikama | 353/77 |
| 5,993,006 A | 11/1999 | Takeuchi | |
| 6,384,984 B1 * | 5/2002 | Ishii | G02B 15/177 359/433 |
| 6,580,518 B2 * | 6/2003 | Eda et al. | 356/609 |
| 6,829,099 B2 * | 12/2004 | Kato et al. | 359/650 |
| 7,048,388 B2 | 5/2006 | Takaura et al. | |
| 7,086,742 B2 * | 8/2006 | Hatakeyama et al. | 353/70 |
| 2004/0156117 A1 * | 8/2004 | Takaura et al. | 359/651 |
| 2004/0174611 A1 * | 9/2004 | Hatakeyama | 359/676 |
| 2005/0094287 A1 * | 5/2005 | Yeo | 359/691 |
| 2005/0243300 A1 | 11/2005 | Pate et al. | |
| 2006/0050407 A1 | 3/2006 | Hakko et al. | |
| 2006/0114430 A1 | 6/2006 | Masubuchi et al. | |
| 2006/0126032 A1 | 6/2006 | Takaura et al. | |
| 2006/0262277 A1 * | 11/2006 | Takahashi | 353/30 |
| 2007/0024821 A1 | 2/2007 | Devos et al. | |
| 2007/0253076 A1 | 11/2007 | Takaura et al. | |
| 2007/0291236 A1 | 12/2007 | Hirata | |
| 2008/0068563 A1 | 3/2008 | Abe et al. | |
| 2008/0068564 A1 | 3/2008 | Abe et al. | |
| 2008/0079915 A1 | 4/2008 | Amano et al. | |
| 2010/0165308 A1 | 7/2010 | Morikuni et al. | |
| 2011/0063586 A1 | 3/2011 | Amano | |

FOREIGN PATENT DOCUMENTS

| | | |
|---|---|---|
| JP | 2001 264627 | 9/2001 |
| JP | 2002 6398 | 1/2002 |
| JP | 2002-14283 | 1/2002 |
| JP | 2002 174853 | 6/2002 |
| JP | 2003 177320 | 6/2003 |
| JP | 2004 258620 | 9/2004 |
| JP | 2004 295107 | 10/2004 |
| JP | 2005 128487 | 5/2005 |
| JP | 2006-162781 | 6/2006 |

OTHER PUBLICATIONS

Office Action dated Dec. 3, 2010, in European Patent Application No. 07 832 976.0-1234.
U.S. Office Action issued in U.S. Appl. No. 14/015,080 dated Nov. 23, 2015.
U.S. Office Action issued in U.S. Appl. No. 14/015,080 dated Sep. 28, 2016.
U.S. Office Action issued in U.S. Appl. No. 14/015,080 dated Feb. 14, 2017.
Office Action dated Nov. 8, 2017 in U.S Appl. No. 14/015,080.

* cited by examiner

FIG.14
(a)
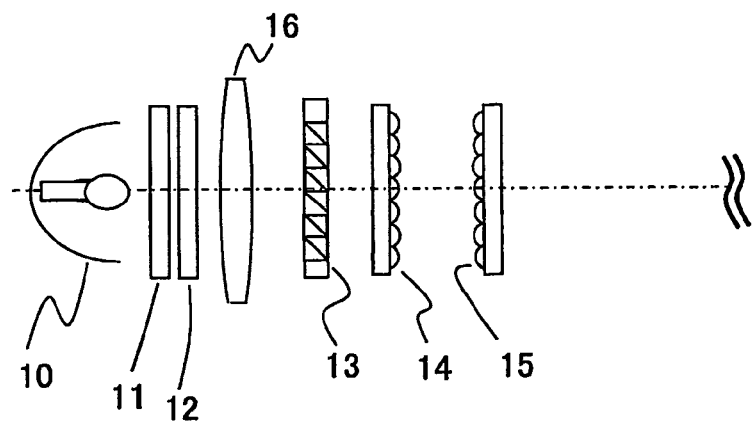
(b)
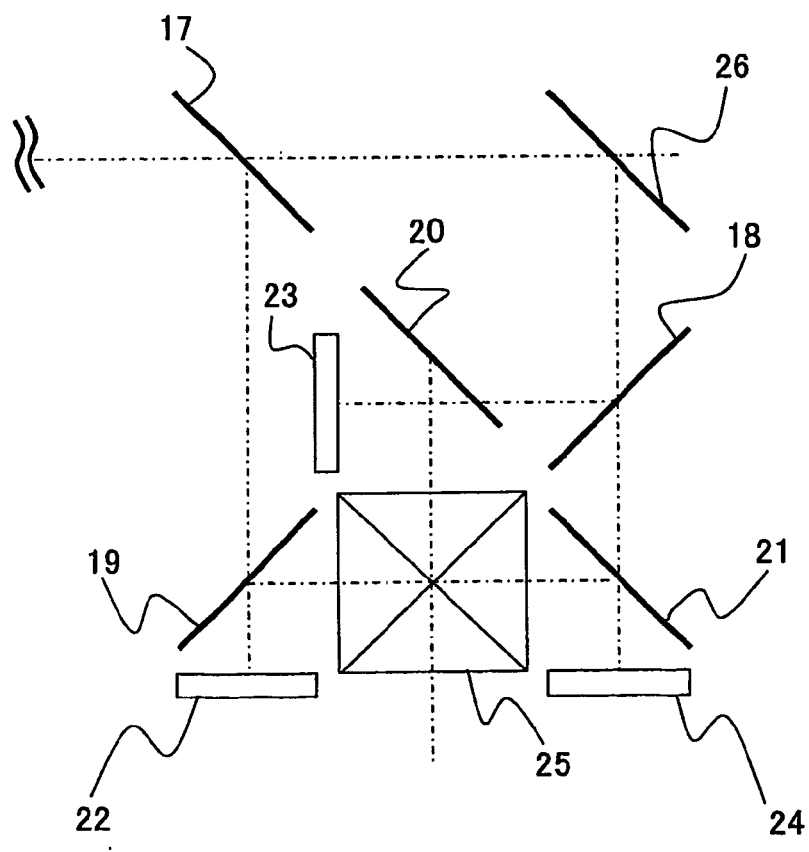

PROJECTION OPTICAL SYSTEM AND IMAGE PROJECTING APPARATUS

TECHNICAL FIELD

The present invention relates to a projection optical system and an image projecting apparatus.

BACKGROUND ART

Projector-type image displaying apparatus are known which enlarge and project a static image or dynamic image of a character or picture that is displayed on a compact light valve as a two-dimensional image, by a projection optical system, so as to display an image. Recently, attention has also been focused on an enlargement projection method that uses a display device (referred to as a light valve, below) which uses a transmission-type or reflection-type dot matrix liquid crystal, a DMD (Digital Micro-mirror Device) or the like, enlarges an image displayed on the light valve and projects it onto a screen so as to show a large-size image. Furthermore, as for a light valve, recently, attention is focused on an LCOS (Liquid Crystal on Silicon) that is excellent in a contrast characteristic, in addition to a transmission-type liquid crystal panel and a DLP (Digital Light Processor).

Practically, an image enlarging projection apparatus (a projector) has also been utilized widely, at an office, a school and a home, since no constraint is required for an image size so as to allow a powerful large image to be obtained.

As for a projector-type image displaying apparatus, there are provided a front-projection-type one which enlarges an image on a light valve and projects it onto a projection surface such as a reflection-type screen provided away from the apparatus so as to observe reflected light and a rear-projection-type one with a transmission-type screen provided in the apparatus as a projection surface on which an image on a light valve is enlarged and projected from the side of the back face of the screen so as to observe an image from the side of the front face of the screen.

As for an example of optical system, JP-A-2004-258620 is provided. It is a projection optical system with a configuration such that an intermediate image is once formed by a lens system and it is enlarged and projected by a concave mirror, and projection in a close range has been realized. However, since there is no mechanism for changing the size of a projected image and projection with a fixed size is only allowed, there is a possibility of restricting a use condition on the condition that a projection size is fixed.

Therefore, optical systems for changing the size of a projected image have been suggested, and as an example of a projection optical system for a front-projection-type one, JP-A-2003-177320 is provided which requires a telecentric system composed of four mirrors. The projection optical system disclosed in JP-A-2003-177320 is composed of four mirror elements arranged oppositely and is a projection optical system that allows projection with a variable magnification in a close range by means of mirror movement.

However, since a mirror has a sensitivity of performance degradation to the positional displacement thereof which is generally higher than that of a lens, it is expected that the degradation of an image quality due to an error in the position of a mirror is large when the mirror is moved for projection with a variable magnification. That is, it is necessary to move a mirror for variation of magnification but it is expected that the degradation of an image quality due to an error in the position of the mirror is large and it is considered that it is necessary to provide a strict precision of the arrangement of the mirror.

Also, an optical path on which light rays are repeatedly reflected between mirrors is adopted and the light rays are high at the last mirror at the side of enlargement. Accordingly, it is difficult to reduce the height of such an apparatus and the size of the apparatus is larger in use. Furthermore, the size of the forth mirror is also large. In addition, since the mirror is provided outside a housing of the apparatus, it is considered that the mirror is easily deteriorated due to an external factor such as dust, contaminants, and impacts.

Also, JP-A-2004-295107 discloses a variable magnification projection optical system in which a first optical system composed of plural lens systems capable of moving to the side of an object and a second optical system with a mirror system having a reflective curved surface at the side of an image are arranged.

In the example of optical system disclosed in JP-A-2004-295107, variation of magnification is attained by moving a lens part while a mirror part is fixed. Also, it includes an optical system composed of lens systems and an optical system composed of plural curved mirrors and the lens systems form an intermediate image in the mirror part. The position of the intermediate image is provided at the enlargement side of the mirror system from the first surface that is the closest to the lens systems in the mirror system.

In this system, the image size of the intermediate image is changed by moving the lens part and the changed intermediate image is imaged by a second optical system again, whereby variation of magnification is attained by changing the size of a projected image. However, since the angle of view is changed for variation of magnification without a projection distance, it is necessary to change the (total) focal length of an optical component having an optical power (a lens part) by a factor of the magnification change of the size of a projected image, whereby the optical component is complex and the degree of the movement of a lens part serving to it is also large.

Also, plural rotationally asymmetric aspherical mirror is required in a practical example, in order that an aberration change caused by a change of the focal length is compensated for by the mirror part, and it goes without saying that the cost is increased. Then, the manufacturing assembly is difficult due to the high tolerance sensitivity and the projection distance, per se, is so large that it is not suitable for use in a small space like a projection optical system for a close range.

Furthermore, a variable magnification optical system in which the first optical system is composed of a transmission refractive optical system and the second optical system is composed of plural mirrors is disclosed and illustrated in JPA-2004-295107, but no example of one-mirror configuration is provided. In the second optical system for repeating reflection by the plural mirrors, the heights of light rays gradually increase while they are sequentially reflected from the plural mirrors, and therefore, it is difficult to bring the height of a mirror system in line with the height of a lens system and to be configured to a compact one. As a result, it is difficult to configure an apparatus with a small height.

Also, the first optical system is composed of plural movable lens systems, and if the lens systems are folded and configured to a compact one, a lens in front or back of folding is moved, whereby it is considered that the mechanism of a cam is complicated. In the disclosed figure, all the lens groups of the first optical system are moved for variation of magnification, and therefore, it is considered that it is difficult to configure a mechanism for folding a lens system. Also, since the full length of the part of mirror system in the second optical system is large, it is considered that it is difficult to configure the apparatus to a compact one.

Furthermore, the variable magnification optical system disclosed in JP-A-2004-295107 has a function of changing a projection magnification by changing an angle of view at a generally identical projection distance, but no function of changing a projection magnification at the time of changing the projection distance is disclosed. Also, since the angle of view is small in the variable magnification optical system, the projection distance has to be changed drastically if the projection magnification is changed by changing the projection distance while the angle of view is kept constant. Since the projection distance is changed drastically, the degree of focusing also increases.

FIG. 23 is a schematic diagram showing the configuration of an optical system disclosed in JP-A-2004-295107.

Both a first optical system 102 and a second optical system 104 form real images, and therefore, their powers are positive. Also, the second optical system 104 is composed of a mirror system but even if it is schematically expressed by a lens, there is no problem in the following descriptions. In the relation between an object 101 and an image 105 thereof, the size of an intermediate image 103 is changed in order to change the size of the image 105 since the second optical system 104 is fixed (see FIG. 2 of JP-A-2004-295107). Then, the first optical system 102 has to change the power thereof as well as to move the principal points thereof, in accordance with the size change of the intermediate image 103. Practically, the focal length or magnification has to be changed by a factor of the magnification change of the intermediate image 103 in the paraxial theory. That is, where a factor of the magnification change of an image size (the value of the maximum image size divided by the minimum image size) is represented by α' and the maximum focal length and minimum focal length of the first optical system 102 are represented by fa' and fb', respectively, the following formula (2) is satisfied.

$$\alpha' = fa'/fb' \qquad (2)$$

DISCLOSURE OF THE INVENTION

Problems to be Solved by the Invention

One object of the present invention is to provide a projection optical system that comprises a first optical system configured to form a first image conjugated with an object and a second optical system configured to project a second image conjugated with the first image toward a projection surface, wherein an image distance is changed and a size of the second image is changed.

Another object of the present invention is to provide an image projecting apparatus comprising a projection optical system that comprises a first optical system configured to form a first image conjugated with an object and a second optical system configured to project a second image conjugated with the first image toward a projection surface, wherein an image distance is changed and a size of the second image is changed.

Means for Solving the Problem

According to one aspect of the present invention, there is provided a projection optical system comprising a first optical system configured to form a first image conjugated with an object and a second optical system configured to project a second image conjugated with the first image toward a projection surface, in which at least one of the first optical system and second optical system comprises at least one optical element(s) movable relative to the object, wherein an image distance of the projection optical system is changed and a size of the second image is changed, by moving at least one of the optical element(s) relative to the object.

According to another aspect of the present invention, there is provided an image projecting apparatus configured to project an image onto a projection surface, which comprises the projection optical system as described above.

ADVANTAGEOUS EFFECT OF THE INVENTION

According to one aspect of the present invention, there may be provided a projection optical system that comprises a first optical system configured to form a first image conjugated with an object and a second optical system configured to project a second image conjugated with the first image toward a projection surface, wherein an image distance is changed and a size of the second image is changed.

According to another aspect of the present invention, there may be provided an image projecting apparatus comprising a projection optical system that comprises a first optical system configured to form a first image conjugated with an object and a second optical system configured to project a second image conjugated with the first image toward a projection surface, wherein an image distance is changed and a size of the second image is changed.

BRIEF DESCRIPTION OF THE DRAWINGS

FIGS. 14 (a) and (b) show a fifth specific example of an embodiment of the present invention.

EXPLANATION OF LETTERS OR NUMERALS

Figure 1:
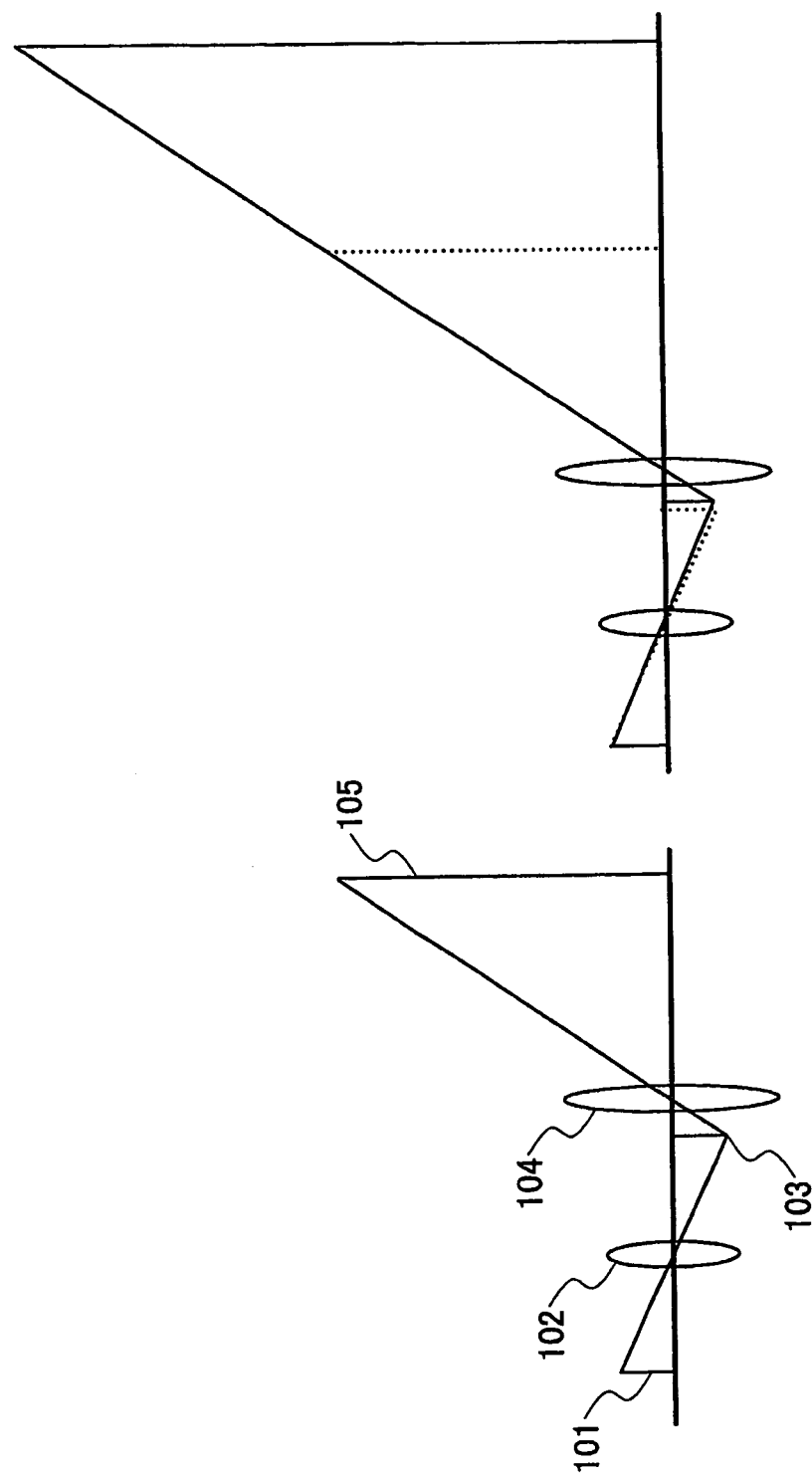
FIG. 1 is a schematic diagram showing a specific example of an embodiment of the present invention.

1: Object plane
2: Composite system of a polarization beam splitter and a cross prism
3: Plural optical elements having a refractive power
3': First optical system
4: Reflective curved surface.
5: Image plane
6: Intermediate image plane
7: Folding mirror.
8: Housing
9: Aperture
10: Light source
11, 12: Cut-off filter
13: Polarized light conversion element
14, 15: Fly-eye lens array
16: Condenser lens
17, 18: Dichroic mirror
19, 20, 21: Polarization beam splitter
22, 23, 24: Light valve element
25: Cross prism
26: Mirror
101: Object
102: First optical system
103: Intermediate image
104: Second optical system
105: Image Best Mode for Carrying out the Invention Next, an embodiment(s) of the present invention is/are described with reference to the drawings.

The first embodiment of the present invention is a projection optical system including a first optical system for forming a first image conjugated with an object and a second optical system for projecting a second image conjugated with the first image toward a projection surface, in which at least one of the first optical system and second optical system includes at least one optical element(s) movable relative to the object, wherein the image distance of the projection optical system is changed and the size of the second image is changed, by moving at least one of the optical element(s) relative to the object.

Herein, the projection surface may be a component of the projection optical system or may not be a component of the projection optical system. For example, when the projection surface is a component of the projection optical system, the position of the projection surface may be brought into identical to the position of the second image by moving components including the projection surface relative to the object while an appropriate well-known mechanism is used. Also, for example, when the projection surface is not a component of the projection optical system, the position of the second image may be brought into identical to the position of the projection surface by moving the entire projection optical system relative to a housing of the projection optical system or the like while an appropriate well-known mechanism is used. Also, for example, when the projection surface is not a component of the projection optical system, the position of the second image may be brought into identical to the position of the projection surface by moving the entire projection optical system relative to the projection surface due to artificial means of a user. Additionally, it is only necessary for the second image to be projected toward the projection surface and it is not necessarily required to be formed on the projection surface.

Also, each of the first image and second image may be an image containing an aberration. Furthermore, any of well-known means is allowed to be used for the means for moving relative to the object the at least one optical element movable relative to an object.

Additionally, the image distance of a projection optical system means a paraxial-optical distance from the principal point of the entire projection optical system at the side of a second image to the paraxial-optical position of the second image.

According to the first embodiment of the present invention, it may be possible to provide a projection optical system including a first optical system for forming a first image conjugated with an object and a second optical system for projecting a second image conjugated with the first image toward a projection surface, wherein an image distance is changed and a size of the second image is changed.

In the projection optical system according to the first embodiment of the present invention, preferably, the distance between the first image and the second optical system is changed by moving at least one of the optical element(s) relative to the object.

Herein, the distance between the first image and the second image means the distance between the paraxial-optical position of the first image and one arbitrary position in the second optical system.

In this case, it may be possible to provide a projection optical system in which is allowed to change the image distance of the projection optical system and to change the size of the second image comparatively easily by changing the distance between the first image and the second optical system.

For example, when the first optical system includes at least one of the optical element(s) and the second optical system includes no optical element movable relative to the object, the distance between the first image and the second optical system may be changed by moving at least one of the optical element(s) included in the first optical system relative to the object so that the first image is moved relative to the object. As a result, it is allowed to change the image distance of the projection optical system and to change the size of the second image.

Also, for example, when the second optical system includes at least one of the optical element(s) and the first optical system includes no optical element movable to the object, the distance between the first image and the second optical system may be changed by moving at least one of the optical element(s) included in the second optical system relative to the object so that the first image is fixed relative to the object and the second optical system is moved relative to the first image. As a result, it is allowed to change the image distance of the projection optical system and to change the size of the second image.

In the projection optical system according to the first embodiment of the present invention, preferably, the first optical system includes at least one of the optical element(s) and the first image is moved relative to the object by moving at least one of the optical element(s) included in the first optical system relative to the object.

Where the ratio of the paraxial-optical size of the first image to the paraxial optical size of the object, that is, the magnification ratio of the first optical system is denoted by m1 (>0) and the ratio of the paraxial-optical size of the second image to the paraxial-optical size of the first image, that is, the magnification ratio of the second optical system is denoted by m2 (>0), the ratio of the paraxial-optical size of the second image to the paraxial-optical size of the object, that is, the magnification ratio of the projection optical system is m1×m2. Herein, the rate of a change of the paraxial-optical magnification ratio of the projection optical system to a change Δm1 of the magnification ratio of the first optical system is m2 and the rate of a change of the paraxial-optical magnification ratio of the projection optical system to a change Δm2 of the magnification ratio of the second optical system is m1.

Hence, for example, in a projection optical system that satisfies m2>m1, the ratio of a change of the paraxial-optical magnification ratio of the projection optical system to a change of the magnification ratio of the first optical system (the sensitivity of the magnification ratio of the first optical system) may be larger than the ratio of a change of the paraxial-optical magnification ratio of the projection optical system to a change of the magnification ratio of the second optical system (the sensitivity of the magnification ratio of the second optical system).

Therefore, a projection optical system in which the first optical system includes at least one of the optical element(s) and the size of the second image is changed by moving at least one of the optical element(s) included in the first optical system relative to the object has a sensitivity of magnification ratio which is higher than that of a projection optical system in which the second optical system includes at least one of the optical element(s) and the size of the second image is changed by moving at least one of the optical element(s) included in the second optical system relative to the object, and may change the size of the second image with a less extent of the movement of at least one of the optical element(s).

Thus, when the projection optical system satisfies m2>m1, it may be possible to provide a projection optical system that is allowed to change the image distance of the projection optical system and to change the size of the second image more easily.

In the projection optical system according to the first embodiment of the present invention, preferably, the second optical system is fixed relative to the object.

In this case, it is allowed to change the image distance of the projection optical system and to change the size of the second image comparatively easily by only moving at least one of the optical element(s) included in the first optical system relative to the object while the second optical system is fixed relative to the object. As a result, it is allowed to provide a projection optical system comparatively easily in which the image distance of the projection optical system is changed and the size of the second image is changed.

For example, the projection optical system may be a projection optical system which projects an enlarged or reduced image of an object onto an image plane, is capable of changing the ratio of the size of an image to that of an object, and has a first optical system provided with a lens unit movable at the time of the change and having a positive optical power, a second optical system provided with a reflection curved surface fixed at the time of the change and having a positive optical power and an intermediate image provided by generally focusing a light beam emitted from an object surface between the first optical system and the second optical system, wherein it is allowed to change the size of the image by moving the intermediate image by moving the first optical system at the time of the change and accordingly changing the image distance.

In this case, the projection optical system is an optical system that is capable of an enlarging projection with a high magnification ratio from a small projection distance and is allowed to change the projection size. Since the change may be realized by moving an intermediate image in the optical system so that the projection distance is changed, a change of the image size may be realized by a simple configuration such that only the movement of an optical component(s) for the movement of the intermediate image is required. Also, since the variation of aberration which is caused by the movement of the optical component(s) is small, a mirror optical system for enlarging and projecting an intermediate image onto an image plane may be realized by a small number of component(s) and the ease of assembly may be improved drastically.

That is, a novel projection optical system may be provided which is capable of providing enlarging projection at a high magnification change factor of a projected-image size even if the projection distance is small, has a simple optical system whereby the cost of the apparatus is low, and attains the ease of assembly.

Also, for example, the projection optical system may be provided with, at least, a planar object plane, a first optical system arranged at the side of the image plane, having a refractive power, involving a movement mechanism in directions of the optical axis thereof, and including plural optical elements capable of moving in the directions of the optical axis thereof, and a second optical system arranged at the side of an image plane and including a reflection surface, wherein the first optical system forms an intermediate image at the side of the first optical system from an optical surface of the second optical system which surface is closest to the first optical system, and the second optical system enlarges and projects the intermediate image and the position of the intermediate image is moved by moving the optical element(s) included in the first optical system, whereby the projection distance and the size of an image are changed accordingly.

The projection optical system may not only have a feature such that enlarging projection with a high magnification ration is allowed at a small projection distance but also may conduct the adjustment of focusing at the time of changing a projection magnification ratio while a mirror is fixed. That is, the focal length of the projection optical system may be adjusted by moving an optical element having a refractive power in the first optical system so that the adjustment of focusing may be conducted. Accordingly, no mechanism of mirror movement is required. In a method for conducting focusing by means of mirror movement, the cost required for the mechanism of mirror movement is high since the required precision of mirror movement is high, but the cost may be reduced by an embodiment of the present invention. It may be easy to move an optical element having a refractive power in the directions of the optical axis thereof in the first optical system, and therefore, a movement mechanism may be provided at low cost.

Also, since the angle of view in the projection is large, the projection magnification ratio may be greatly changed by only slightly changing the projection distance and therefore the amount of focusing control may also be small.

Furthermore, the intermediate image may be enlarged and projected at a small projection distance by using the reflection surface on the configuration condition that the first optical system including an optical element having a refractive power, the intermediate image, and the reflection surface are arranged in the order from the object plane (or the intermediate image is between a mirror system and a lens system).

Thus, since an optical system for enlarging and projecting an intermediate image is provided, the mirror may be small. Also, although the mirror size is small, an image with a high magnification ration and a less distortion may be obtained and the cost for manufacturing the mirror may be reduced.

Also, enlarging projection with a high magnification ratio is allowed at a small projection distance due to the projection optical system regard to an image projecting apparatus using the projection optical system, the apparatus may be positioned near a projection screen. In space for meeting or the like, the apparatus is not necessarily positioned near a user. That is, the apparatus may be used even if the distance between a user and it is large. Also, the apparatus may be used without providing a user with an influence caused by noise or exhaust gas generated by the apparatus.

Then, in the apparatus, a projection image is projected obliquely, with a predetermined angle with respect to the normal of a projection screen. In this way, even if a user approaches at the projection screen, the projected light is not easily shielded and no shadow may be created. Accordingly, it is easy to use and the convenience thereof may be improved.

That is, a novel projection optical system may be provided which is advantageous in reducing the height of an image displaying apparatus and downsizing it, has a low apparatus cost for suppressing the degradation of an image when the projection magnification ratio is changed, and is capable of conducting enlarging projection with a high magnification ratio even if the projection distance is small.

Furthermore, in the projection optical system, preferably, in two arbitrary states whose projection magnification ratios are different from each other, the projection distances from an element closest to an image plane in the projection optical system to the image plane are different and the separations between some elements in the first optical system are different (while the separation(s) between other elements is/are identical).

In this case, a mechanism for moving an optical element constituting the second optical system is not required. The second optical system includes a reflection mirror. Since a high precision(s) is/are required for the mechanism for moving a mirror, the cost required for the mechanism for moving a mirror is high. According to such a projection optical system, no mechanism for moving a mirror which has a high cost is required. Then, when the projection magnification ratio is changed, a stable image quality may be provided. Also, the cost of an apparatus may be reduced. Furthermore, the variation of image quality depending on the apparatus may also be reduced.

In the projection optical system according to the first embodiment of the present invention, preferably, when the focal length of the first optical system is changed from a first focal length to a second focal length and the size of the second image is changed from a first size to a second size by moving at least one of the optical element(s) included in the first optical system relative to the object, the ratio of the second focal length to the first focal length is different from the ratio of the second size to the first size.

In this case, the size of the second image may be changed comparatively easily, while the image distance of the projection optical system is changed, by changing the focal length of the first optical system from the first focal length to the second focal length with the ratio of the second focal length to the first focal length which is different from the ratio of the second image to the first image when the size of the second image is changed from the first size to the second size. As a result, it may be possible to provide a projection optical system comparatively easily in which the image distance of the projection optical system is changed and the size of the second image is changed.

In the projection optical system according to the first embodiment of the present invention, preferably, when the second focal length is greater than the first focal length and the second size is greater than the first size, the ratio of the second size to the first size is greater than the ratio of the second focal length to the first focal length.

In this case, the size of the second image may be changed comparatively easily while the image distance of the projection optical system is changed, by changing the focal length of the first optical system from the first focal length to the second focal length with the ratio of the second focal length to the first focal length which is smaller than the ratio of the second size to the first size when the size of the second image is changed from the first size to the second size. As a result, it may be possible to provide a projection optical system comparatively easily in which the image distance of the projection optical system is changed and the size of the second image is changed.

For example, the above-mentioned projection optical system may be a projection optical system that satisfies the following conditional formula (1):

$$\alpha > fa/fb \qquad (1),$$

wherein $\alpha$ is a value obtained by dividing the maximum size of an image by the minimum size of the image, fa is the maximum focal length of the first optical system, and fb is the minimum focal length of the first optical system.

Also, the conditional formula (1) may be expressed by:

$$1/\alpha < fb/fa \qquad (1)'.$$

Also, it can be understood from the conditional formula (1) or (1)' that the ratio of fa and fb is not equal to the ratio of the maximum size of an image at fa and the minimum size of the image at fb ($\alpha$ or $1/\alpha$), by taking the size of the image at fa being the maximum size of the image and the size of the image at fb being the minimum size of the image into consideration.

In this case, the projection optical system may be an optical system which is capable of conducting enlarging projection at a high magnification ratio from a small projection distance and capable of changing the projection size. Since the magnification change may be attained by moving an intermediate image created in the optical system so that the projection distance is changed, only the movement of an optical component for moving the intermediate image may be required, whereby the magnification change of the image size may be attained with a simple configuration. Also, since the variation of aberration which is caused by moving the optical component may be small, a mirror optical system for enlarging and projecting an intermediate image onto an image plane may be attained with a small number of component(s) whereby the ease of assembly may be improved drastically.

In the projection optical system according to the first embodiment of the present invention, preferably, at least one of the first optical system and second optical system, which include(s) at least one of the optical element(s), is a coaxial optical system.

In this case, since at least one of the optical element(s) is included in a coaxial optical system and at least one of the optical element(s) may be comparatively easily moved relative to the object along the optical axis of the coaxial optical system, it may be possible to provide a projection optical system comparatively easily in which the image distance of the projection optical system is changed and the size of the second image is changed.

In the projection optical system according to the first embodiment of the present invention, preferably, one of the first optical system and second optical system includes the at least one optical element(s) and includes optical element(s) more than an optical element(s) constituting the other of the first optical system or second optical system.

In this case, since the at least one optical element is included in the (first or second) optical system that includes more optical components, the degradation of the performance of the second image may be reduced when at least one of the optical element(s) is moved. As a result, it may be possible to provide a projection optical system with a higher optical performance in which the image distance of the projection optical system is changed and the size of the second image is changed.

In the projection optical system according to the first embodiment of the present invention, preferably, the half angle of view of a principal ray projected toward the projection surface is substantially constant while the size of the second image is changed.

Herein, the principal ray projected toward the projection surface means a light ray at the center of a light beam projected toward a projection surface. Also, the half angle of view of a principal ray projected toward the projection surface means 90°—(an angle between the normal vector of a projection surface and the directional vector of a principal ray at a point of incidence of the principal ray on the projection surface (less than 90°)). Furthermore, the half angle of view of a principal ray projected toward the projection surface being substantially constant means that the variation of the half angle of view of a principal ray projected toward the projection surface is within ±2° when the image distance of the projection optical system is changed and the size of the second image is changed.

In this case, it may be possible to provide a projection optical system which is allowed to change the image distance of the projection optical system and to change the size of the second image while the half angle of view of a principal ray projected toward the projection surface is substantially constant.

For example, the projection optical system may be a projection optical system in which the maximum incident angle of a principal ray incident on an image plane is not substantially changed at the time of a magnification change.

In this case, since the size of an image is linearly changed depending on the projection distance without substantially changing the maximum incident angle of a principal ray incident on an image plane, the situation of the magnification change of the image size may be easily expected, which is easy to use.

In the projection optical system according to the first embodiment of the present invention, preferably, the maximum vale of the half angle of view of a principal ray projected toward the projection surface is equal to or greater than 60°.

In this case, it may be possible to provide a (super-wide angle) projection optical system in which the maximum value of the half angle of view of a principal ray projected toward a projection surface is equal to or greater than 60° when the image distance of the projection optical system is changed and the size of the second image is changed.

In the projection optical system according to the first embodiment of the present invention, preferably, the second optical system includes at least one optical element with a reflection surface having a positive power.

In this case, it may be possible to provide a projection optical system comparatively easily in which the maximum value of the half angle of view of a principal ray projected toward the projection surface is large when the image distance of the projection optical system is changed and the size of the second image is changed.

For example, the second optical system in the projection optical system may have one or more mirrors having a power. Also, in the projection optical system, one or more mirrors in the second optical system may have a positive power.

In this case, an intermediate image is allowed to be enlarged and projected. When an intermediate image is formed, a light beam traveling from an object to the intermediate image is converged and a light beam traveling from the intermediate image to an image plane is diverged. Then, the diverged light beam is condensed by one or more mirrors having a power again so as to obtain an enlarged image. Also, a reflected light beam is guided onto a predetermined image plane by providing an appropriate power, so as to provide an image. Furthermore, the distortion of an image may be reduced.

As described above, although the light beam traveling from the intermediate image to the second optical system is diverged, it may be condensed by a reflection surface having a positive power again.

When the number of reflection surfaces is equal to or greater than 2, it is only necessary that the total power of the reflection surfaces is positive, and a reflection surface having a negative power may be provided. Herein, the power(s) of one or more reflection surfaces is/are positive. The reflection surface having a positive power means a so-called concave mirror.

The light rays reflected from the reflection surface having a positive power travel on the light path crossing in front of an image plane and subsequently reaching the image plane. At the position of the crossing, the width of the light beam is reduced. A flare component is allowed to be excluded by providing an aperture at this position. Accordingly, an effect of improving the contrast of an image may be obtained. The effect may not be obtained in a not-crossing optical system. The position and shape of the aperture may be optimized by a design thereof.

In the projection optical system according to the first embodiment of the present invention, preferably, at least one of the reflection surface(s) having a positive power in the at least one optical element with a reflection surface having a positive power is a rotationally symmetric aspherical surface.

Herein, the rotationally symmetric aspherical surface means that the reflection surface having a positive power has a rotation axis and the shape of the reflection surface is completely or substantially axially symmetric around the rotation axis. Additionally, the substantially axially symmetric one means that it is axially symmetric in the design thereof and asymmetry caused by an error in the processing thereof may be present.

In this case, aberration in the second image may be reduced comparatively easily by using a rotationally symmetric aspherical surface. As a result, it may be possible to provide a projection optical system with a higher optical performance comparatively easily in which the image distance of the projection optical system is changed and the size of the second image is changed.

For example, the rotationally symmetric aspherical surface may be represented by a well-known formula of aspherical surface (a):

$$Z=c \cdot r^2/[1+\sqrt{\{1-(1+k)c^2 r^2\}}]+Ar^4+Br^6+Cr^8 \qquad (a),$$

wherein Z is the depth thereof in the directions of the optical axis thereof, c is the paraxial radius of curvature thereof, r is the distance thereof from the optical axis in the directions orthogonal to the optical axis, k is the constant of the cone thereof, and A, B, C, . . . , etc., are the higher order coefficients of aspherical surface, and the shape thereof is specified by substituting specific values for k, A, B, C, . . . .

Alternatively, for example, the shape of rotationally symmetric aspherical surface may be a shape of aspherical surface which includes an even-ordered term and an odd-ordered term as coefficients of aspherical surface. The shape of aspherical surface which includes an even-ordered term and an odd-ordered term is represented by the following formula (b):

$$Z(r)=(cr^2)/[1+\sqrt{\{1-(1+K)c^2 r^2\}}]+C1 \cdot r+C2 \cdot r^2+C3 \cdot r^3+C4 \cdot r^4+ \qquad (b),$$

wherein c is the paraxial curvature thereof, K is the coefficient of the cone thereof, and Cis (i=1, 2, 3, . . . ) are the coefficients of aspherical surface.

Herein, r is the distance thereof from the optical axis thereof and Z is the depth thereof in the directions of the optical axis.

For example, in the projection optical system, at least one surface in a reflection curved surface(s) of the second optical system may be a surface having a shape of axially symmetric aspherical surface. Alternatively, in the projection optical system, the shape of the mirror may be an axially symmetric aspherical surface.

In this case, when the reflection mirror has a shape of axially symmetric aspherical surface, the freedom of the design may be increased and the convergence of light rays may be good. Also, the resolution performance may be improved and the same function may be reproduced with a small number of a component(s). Furthermore, both the resolution and the correction of the distortion may be easily attained by using an aspherical mirror surface.

In the projection optical system according to the first embodiment of the present invention; preferably, at least one of the reflection surface(s) having a positive power in the at least one optical element with a reflection surface having a positive power is a free-form surface.

Herein, the free-form surface means any of the spherical surfaces except rotationally symmetric aspherical surfaces.

In this case, aberration in the second image may be reduced better by using a free-form surface. As a result, it may be possible to provide a projection optical system with a higher optical performance in which the image distance of the projection optical system is changed and the size of the second image is changed.

For example, an anamorphic polynomial free-form surface may be a shape represented by:

$$Z = X2 \cdot x^2 + Y2 \cdot y^2 + X2Y \cdot x^2 y + Y3 \cdot y^3 + X4 \cdot x^4 + X2Y2 \cdot x^2 y^2 + Y4 \cdot y^4 + X4Y \cdot x^4 y + X2Y3 \cdot x^2 y^3 + Y5 \cdot y^5 + X6 \cdot x^6 + X4Y2 \cdot x^4 y^2 + X2Y4 \cdot x^2 y^4 + Y6 \cdot y^6 + \quad (c)$$

wherein the Y-directions are short axis directions, the X-directions are long axis directions, the Z-directions are in the directions of the depth of the curved surface, and X2, Y, X2Y, Y3, X2Y2, etc., are the coefficients thereof, with respect to a projected image as a reference.

For example, in the projection optical system, at least one surface in the reflection curved surface in the second optical system may be a surface having a shape of free-form surface. Alternatively, in the projection optical system, the shape of one or more mirrors as described above is a free-form surface.

When the reflection mirror has a shape of axially symmetric aspherical surface or a shape of free-form surface, the freedom of the design may be increased and the convergence of light rays may be good. Also, the resolution performance may be improved and the same function may be reproduced with a small number of a component(s).

Furthermore, both the resolution and the correction of the distortion may be not only easily attained by using a free-form surface but also a configuration such that a mirror is arranged near the optical axis may be attained. Accordingly, the thickness of the apparatus may be reduced. Also, the size of a mirror may be reduced. Accordingly, the cost of the mirror may be reduced. The cost of the apparatus may also be reduced. The downsizing and cost reduction of the apparatus may be attained simultaneously.

In the projection optical system according to the first embodiment of the present invention, preferably, the number of the at least one optical element with a reflection surface having a positive power, included in the second optical system is one.

In this case, since the configuration of the second optical system may be simpler, it may be possible to provide a projection optical system with a simpler configuration in which the image distance of the projection optical system is changed and the size of the second image is changed.

For example, the number of a reflection curved surface of the second optical system may be one in the projection optical system.

In this case, when the number of a mirror(s) is one, not only the cost of the whole of the second optical system may be reduced but also the productibity may be improved since the assembly of a mirror system with a high tolerance sensitivity is completed at once. Also, when the optical system is included in a housing, the size thereof is small, leading to the downsizing.

In the projection optical system according to the first embodiment of the present invention, preferably, at least one folding mirror for folding an optical path from the object to the second image is included in the optical path.

In this case, the optical path from the object to the second image is folded whereby it may be possible to provide a more compact projection optical system in which the image distance of the projection optical system is changed and the size of the second image is changed.

For example, in the projection optical system, the optical path thereof may be folded by arranging a folding mirror between the object plane and the image plane. Alternatively, in the projection optical system, the first optical system may be configured to fold the optical path.

In this case, when a folding mirror is arranged to fold the optical path, the occupation surface area of the optical system may be reduced and the size of a housing may be reduced. Alternatively, the first optical system may be included in a compact housing. That is, a housing of the apparatus may be configured to be compact. Accordingly, the portability of the apparatus and the ease of positioning thereof may be improved.

In the projection optical system according to the first embodiment of the present invention, preferably, the at least one optical element(s) movable relative to the object is arranged at a side of the object or at a side of the second image relative to the at least one folding mirror.

In this case, the at least one optical element movable relative to the object may be moved relative to the object more easily (or with a simpler mechanism) such that the image distance of the projection optical system is changed and the size of the second image is changed. As a result, it may be possible to provide a projection optical system with a simpler configuration in which the image distance of the projection optical system is changed and the size of the second image is changed.

For example, in the projection optical system, only an optical element at the side of either one of the object or the image may be moved relative to the position of folding in the first optical system.

Commonly, a mechanism for cooperatively moving both optical elements in front and back of the folding configuration is complicated and tends to increase the cost thereof. However, according to the projection optical system, the complication of such a cam mechanism may be avoided so that the cost of the cam is reduced and the cost of the apparatus is reduced. Also, since the optical system is arranged to be folded, the apparatus may be compact.

In the projection optical system according to the first embodiment of the present invention, preferably, the at least one folding mirror is arranged between the object and the first image.

In this case, since the position of the first image may be prevented from overlapping with the position of the at least one folding mirror, the influence of the at least one folding mirror on the first image, that is, the influence of the at least one folding mirror on the second image, may be reduced. As a result, it may be possible to provide a projection optical system with a better optical performance in which the image distance of the projection optical system is changed and the size of the second image is changed.

For example, in the projection optical system, the folding mirror may be arranged in the first optical system.

In this case, the optical axis of the first optical system extends in the directions perpendicular to a screen but the first optical system may be compact by folding the optical path thereof as described above. Also, an intermediate image between the first optical system and the second optical system may be prevented from overlapping with a folding mirror, by folding not between the first optical system and the second optical system but in the first optical system, that is, in a lens unit thereof. Additionally, a light beam emitted from one point on the object is generally converged at the intermediate image again so that the diameter of the light beam is small, and therefore, if a tiny dust or the like adheres to the folding mirror, the ratio of the size of the dust to the diameter of the light beam may be large so that the influence thereof on an image on a subsequent image plane tends to be large. Therefore, it is preferable to prevent the intermediate image from overlapping with the folding mirror.

In the projection optical system according to the first embodiment of the present invention, preferably, the first optical system includes an optical element fixed relative to the object and being closest to the first image.

In this case, even if the first optical system includes at least one optical element movable relative to the object, the at least one optical element movable relative to the object is arranged between an object and an optical element fixed relative to the object and being closest to the first image, and therefore, at least one of the optical element(s) may be moved relative to the object more easily. As a result, it may be possible to provide a projection optical system with a simpler configuration in which the image distance of the projection optical system is changed and the size of the second image is changed.

For example, in the projection optical system, the lens unit of the first optical system which is closest to the side of an image may be fixed at the time of a magnification change.

In this case, since the unit of the first optical system which is closest to the side of an image is provided at the location at which a light beam emitted from each point on an object is most separated, the diameter of the lens is large and the weight thereof is high. However, when the lens unit is fixed, a variable mechanism for a body tube thereof may be small and may be a mechanism that is easy to operate. Also, in regard to an effect of the folding mirror in combination with the effect of the configuration of the arrangement thereof in the first optical system, when a folding mirror fixed just in front of a lens unit at the side of an object is arranged, it is only necessary to move only a lens unit between the object and the folding mirror, whereby the design of a body tube thereof may be easy or simple. On the contrary, if the unit is also variable, lens units whose optical axis is folded by a folding mirror in front and back of the mirror have to be moved simultaneously and linearly, and therefore, it may be very complicated to design a variable mechanism for a body tube thereof.

In the projection optical system according to the first embodiment of the present invention, preferably, the first image has a curvature of field which curves toward a side of the object.

In this case, the curvature of field of the first image that is curved toward the side of the object may be reduced more easily by using at least one optical component with a reflection surface having a positive power. As a result, it may be possible to provide a projection optical system with a higher optical performance comparatively easily in which the image distance of the projection optical system is changed and the size of the second image is changed.

For example, in the projection optical system, the intermediate image may have a characteristic of a curvature of field at the under side. Herein, the under side of an image refers to the direction in which the more the coordinate in an plane perpendicular to an optical axis is separated from the optical axis, the more it approaches to the side of an object, and the over side of an object refers to the direction in which the more the coordinate in an plane perpendicular to an optical axis is separated from the optical axis, the more it departs from the side of an image.

Thus, when the intermediate image is provided with a characteristic of a curvature of field at the under side, it may be easy to correct the inclination of an image in combination with a mirror having a positive power. The characteristic of a curvature of field at the under side refers to a state such that the larger the distance from the optical axis is, the smaller the distance between the intermediate image and the first optical system is. If the intermediate image is considered as an object plane for the second optical system, the object plane is inclined to the direction of the over side. That is, the larger the distance of a position from the optical axis is, the larger the distance from the intermediate image to the mirror is. In such a condition, it may be easy to correct the image inclination of a secondary image of the intermediate image which secondary image is obtained by a mirror having a positive power. Additionally, the secondary image of the intermediate image corresponds to an image for the projection optical system.

Also, when an image of an object is obtained by an optical element having a positive power, the image plane tends to, incline to the under side on the condition that the object is not inclined. Herein, the amount of inclination of an image plane inclining to the under side may be reduced with inclining an object plane to the over side. Commonly, the inclination is not linear but is curved. Meanwhile, it is commonly difficult to curve an object plane in a curved shape. The object plane is planar in many practical examples. For example, the object plane may be on a light valve element in a projector optical system and an image on the light valve element is formed into a planar shape. For a light valve element, a DMD (Digital Mirror Device), an LCoS (Liquid Crystal on Silicon), a transmission-type liquid crystal light valve, and the like are provided. Any of them has a planar shape. Therefore, a high cost may be required for making it into a curved shape. However, according to an embodiment of the present invention, since the object plane is an intermediate image, a different situation is provided. That is, it may be possible to provide an intermediate image with a shape curving to the under side due to a design of the first optical system and an additional cost required for implementation may be low. Then, there may be provided an effect such that the inclination of an image plane for the projection optical system may be easily corrected by providing an intermediate image curving to the under side.

In the projection optical system according to the first embodiment of the present invention, preferably, the first optical system is a coaxial optical system and the object is decentered relative to the optical axis of the first optical system.

In this case, the object is decentered relative to optical axis of the first optical system whereby it may be possible to provide a projection optical system in which the first optical system and the second optical system are arranged more appropriately while the image distance of the projection optical system is changed and the size of the second image is changed.

For example, the projection optical system may be a projection optical system such that the center of an object plane is arranged to be decentered relative to the optical axis of the first optical system and the height of a light ray incident on the mirror is lower than the optical axis of the first optical system.

In the projection optical system, the center of an object plane is arranged to be decentered relative to the optical axis of the first optical system. Herein, a Cartesian coordinate system is defined such that the Z-axis is in the directions of the optical axis and the X-axis and Y-axis are in one of the directions orthogonal to the optical axis and in the other, respectively. When the object plane is shifted to the direction of +Y, the intermediate image is formed to the direction of −Y based on the imaging principle of optics. When a mirror of the second optical system is arranged at the side of enlargement with respect to the intermediate image, the mirror may be arranged in a region of −Y so as to reflect light. If the direction of +Y is taken in the directions of the height of the apparatus, a mirror may be arranged not to project from the upper side of the apparatus. Accordingly, the mirror may be included in a housing of the apparatus. Then, a user does not contact the mirror. Also, since the mirror is covered by a housing, dust does not easily adhere to it. If the dust is scorched by heat, the reflectance of the mirror may be reduced, or the image quality of a projected image may be degraded while it functions as a scattering source. Then, the reduction of the reflectance may reduce the brightness. The scattering may reduce the contrast. However, such situations may be prevented. Also, damages such as generation of breakage or warping caused by contacting a mirror may also be prevented.

The second embodiment of the present invention is an image projecting apparatus for projecting an image onto a projection surface, which includes the projection optical system according to the first embodiment of the present invention.

According to the second embodiment of the present invention, it may be possible to provide an image projecting apparatus that includes a projection optical system which includes a first optical system for forming a first image conjugated with an object and a second optical system for projecting a second image conjugated with the first image toward a projection surface wherein the image distance thereof is changed and the size of the second image is changed.

For example, the image projecting apparatus may be an image displaying apparatus having at least one image forming element, an illumination optical system for illuminating the image forming element, and a projection optical system for enlarging or reducing a light image signal modulated by the image forming element, wherein the projection optical system is any of the projection optical systems described above.

In this case, an image displaying apparatus using a novel projection optical system may be attained which is capable of enlarging and projecting a projection image with a size at a high magnification ratio even if the projection distance is small, has a low apparatus cost due to a simple optical system and attains an ease of assembly.

Also, the image projecting apparatus, for example, may be an image displaying apparatus having t least one light valve element, an illumination optical system for illuminating the light valve, and a projection optical system for enlarging and projecting a light image signal modulated by the light valve, wherein the projection optical system is any of the projection optical systems described above.

According to such an image projecting apparatus, it may be possible to provide a configuration such that a mirror is included in a housing without increasing the height and/or thickness of the housing. Thereby, an effect of the projection optical system may be obtained in which the center of the image plane is arranged to be decentered with respect to the optical axis of the first optical system and the height of a light ray incident on the mirror is lower than the optical axis of the first optical system. Also, the image shape of the intermediate image may be controlled by the design of the first optical system with a low cost. Thereby, an image plane that is focused well without inclination thereof may be obtained. Also, since the object plane is shifted, oblique projection may be provided with a predetermined angle with respect to the normal line of an image plane, and therefore, enlarging projection may be provided at a small projection distance. Furthermore, even if the projection magnification ratio is changed, focusing may be provided without moving a mirror. No mechanism for moving a mirror which may require a high precision and may cause a cost increase is required. Also, since the mirror may be configured to be small, the cost of the mirror may be low. Furthermore, since the mirror may be configured to be small and have even a shape of free-form surface except shapes of aspherical surfaces, a high image aberration correcting effect may be obtained by the free-form surface while the cost is suppressed, whereby an image quality may be improved. Although elements having a refractive power which are represented by lenses are arranged in the first optical system, focusing may be controlled by only moving them in the directions of the optical axis thereof, and therefore, no special movement mechanism is required. Also, a housing may be configured to be compact by taking a configuration such that the first optical system is folded. Although it is preferable that the folding direction be generally a folding in an XY-plane, the spirit of the present invention is not lost even if a folding angle component in an XZ-plane may be present according to need. Also, it may be possible to attain a configuration such that a mechanism for moving an optical element is not complicated even if folding is applied.

That is, it may be possible to provide an image displaying apparatus using a novel projection optical system which is advantageous in reducing the height of the image displaying apparatus to be compact, has a low apparatus cost for suppressing the degradation of an image at the time of changing the projection magnification ratio, and is capable of providing enlarging projection with a high magnification ratio even if the projection distance is small.

Next, specific examples of embodiments of the present invention are described with reference to the drawings.

FIG. 1 is a schematic diagram showing a specific example of an embodiment of the present invention.

Figure 23:
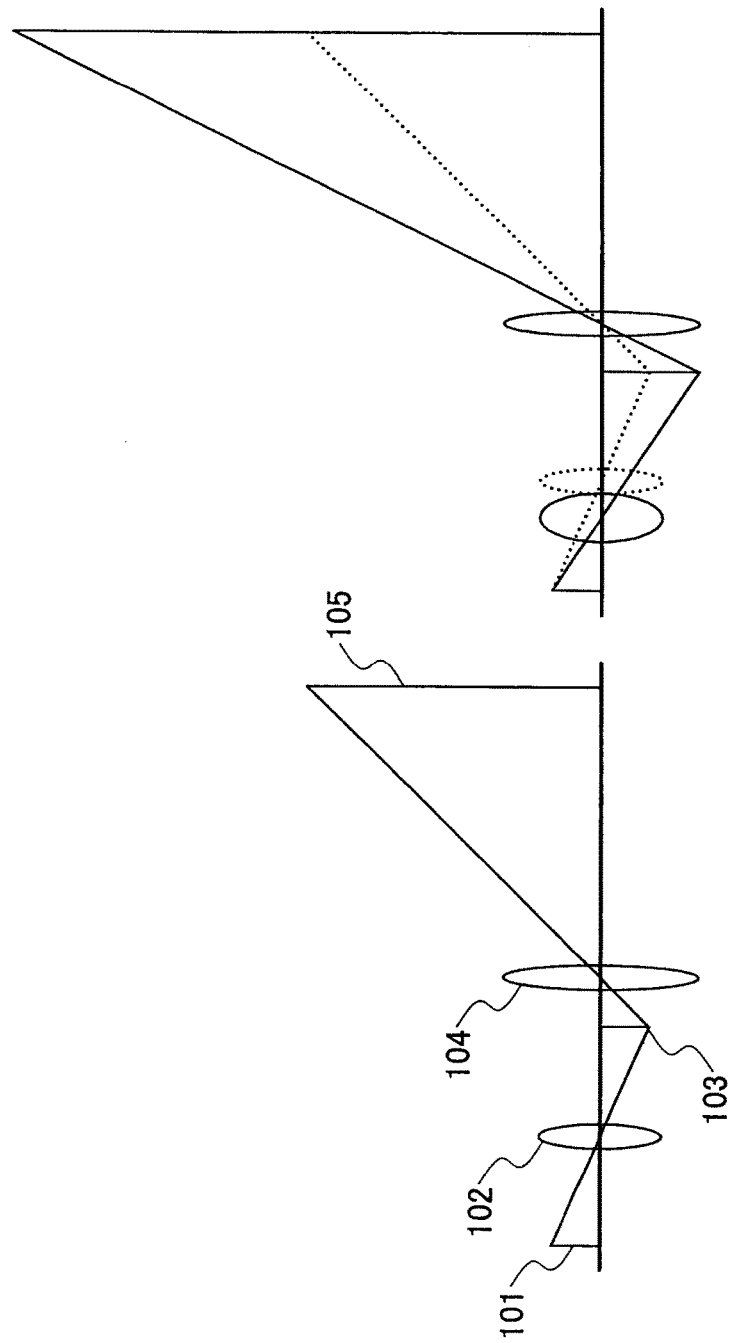
FIG. 23 is a schematic diagram showing the configuration of an optical system disclosed in JP-A-2004-295107.

Similarly to FIG. 23, both a first optical system 102 and a second optical system 104 have positive powers thereof, and although the second optical system 104 is composed of a mirror system, no problem is provided to the descriptions even if it is schematically shown as a lens. Since the second optical system 104 is fixed, the position of an intermediate image 103 is moved so as to change the image distance as shown in FIG. 1, whereby the size of an image 105 is changed. Herein, since the second optical system 104 greatly enlarges the intermediate image 103, the positive power thereof is large. Therefore, even if a the position of the intermediate image 103 is slightly changed, the image distance is greatly changed according to the relationship of a longitudinal magnification and the size of the image 105 is also changed greatly. That is, the size of the image 105 may be greatly changed by slightly changing the position of the intermediate image 103. Then, the first optical system 102 has a fixed focus thereof but moves the position of a principal point thereof, whereby the position of the intermediate image 103 is slightly moved. In practice, the focal length of the first optical system 102 is changed for aberration correction, no change of the focal length is required which change corresponds to the image size change as represented by the above formula (2) ($\alpha'=fa'/fb'$). That is, the above formula (1) (α>fa/fb) is satisfied, wherein α is the magnification ratio of the image size (a value obtained by dividing the maximum image size by the minimum image size) and fa and fb are the maximum focal length and minimum focal length of the first optical system 102, respectively. Since the change of the focal length of the first optical system 102 is allowed to be small, the configuration of the magnification change may be simple. Also, since an aberration change in the entire optical system is small, an aberration change that should be absorbed by the second optical system 104 may be small and the second optical system 104 may be simple. Furthermore, the maximum incident angle of a principal ray incident on the image plane is slightly changed by slightly changing the position of the intermediate image 103 in order to absorb the aberration change, but is configured not substantially to change in the paraxial theory.

Figure 2:
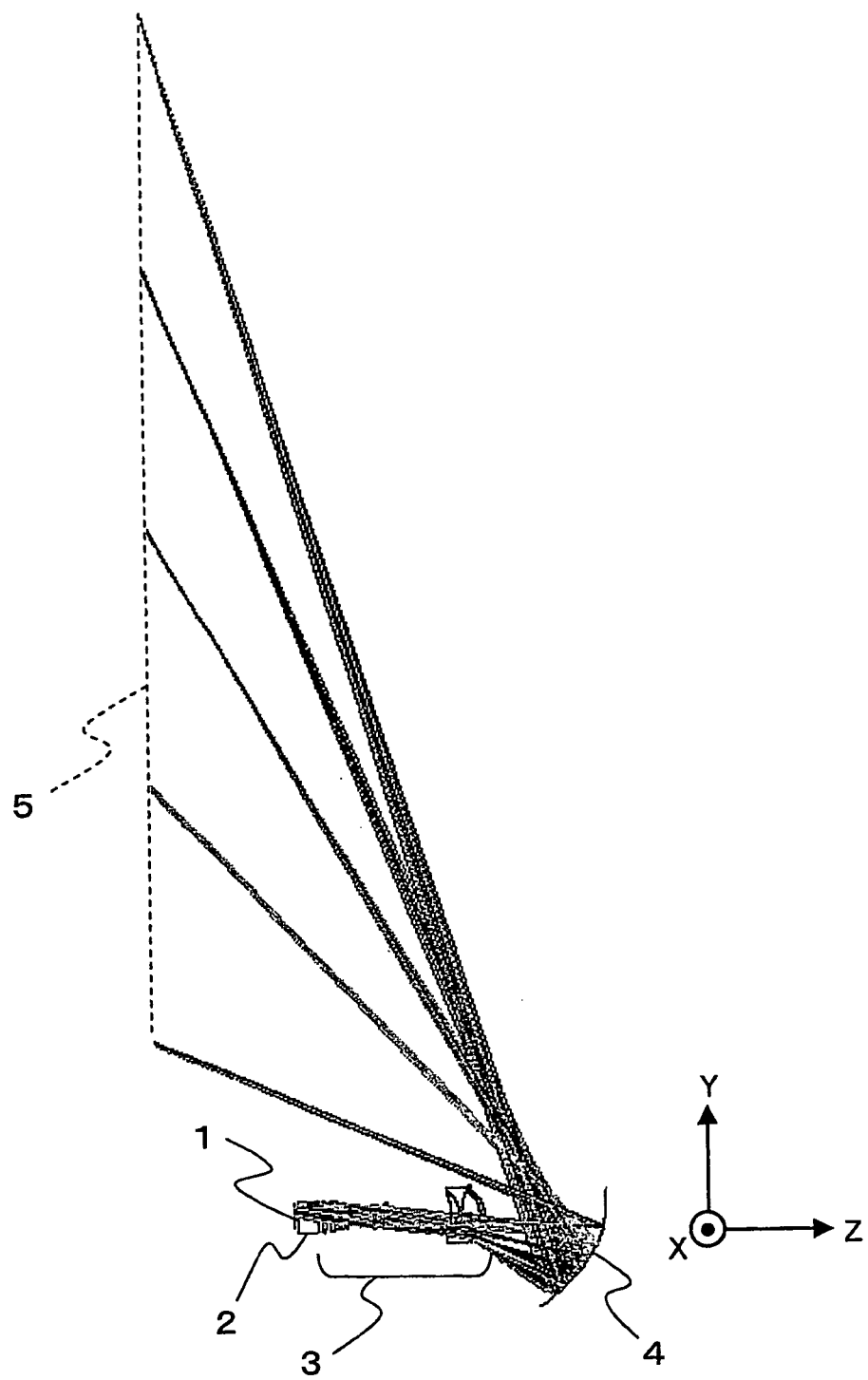
FIG. 2 is a diagram showing a first specific example of an embodiment of the present invention, which shows a state such that an 80-inches-diagonal image is projected onto an image plane at a projection distance of 551 mm.
Figure 3:
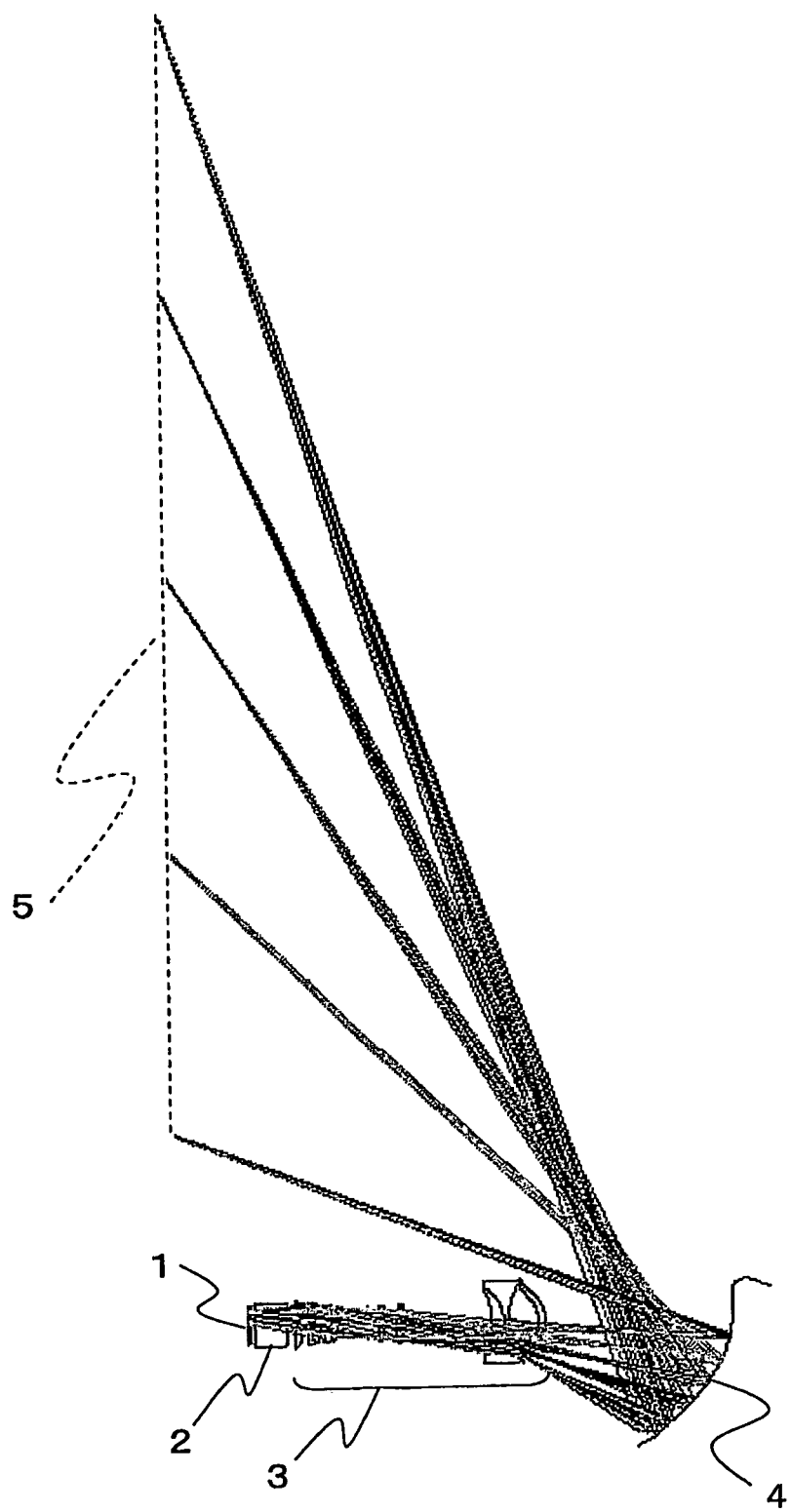
FIG. 3 is a diagram showing a first specific example of an embodiment of the present invention, which shows a state such that a 60-inches-diagonal image is projected at a projection distance of 438 mm.
Figure 4:
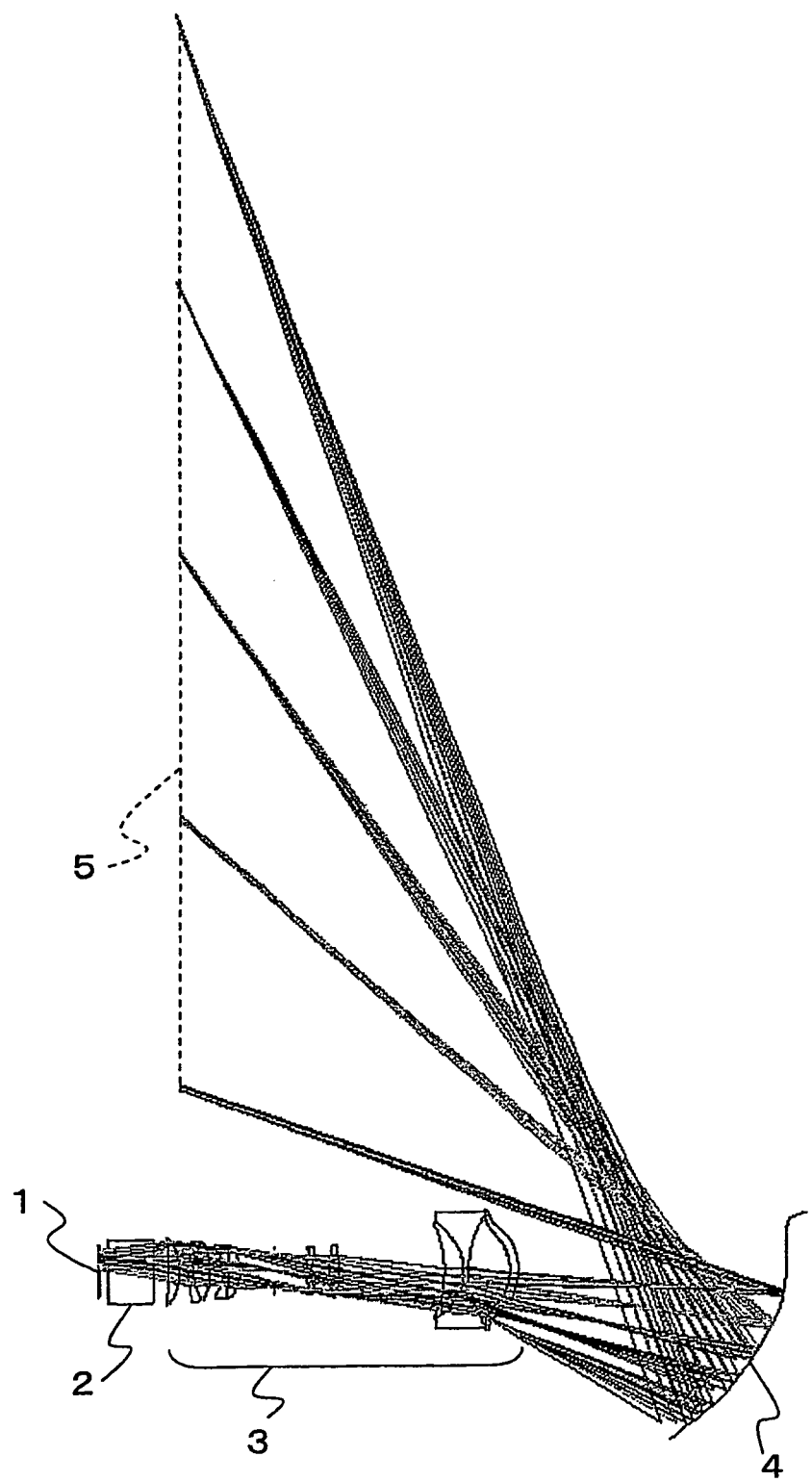
FIG. 4 is a diagram showing a first specific example of an embodiment of the present invention, which shows a state such that a 40-inches-diagonal image is projected at a projection distance of 334 mm.

FIGS. 2, 3 and 4 are diagrams showing the first example of an embodiment of the present invention.

In FIGS. 2, 3 and 4, numerical reference 1 denotes a surface of an object in imaging of a projection optical system. In practice, it is, for example, "an image displaying surface of a light valve", and "an image displaying surface of a reflection-type light valve" is supposed in the specific example of the embodiment. Additionally, it is not limited to the reflection-type one but may be an image displaying surface of a transmission-type light valve. In the specific example of the embodiment, a color image display that uses three reflection-type light valves is supposed, and since the three light valves are arranged at equivalent positions with respect to a projection optical system, an object plane 1 represents three object planes.

Numerical reference 2 denotes "a combination system of a polarization beam splitter for guiding light from a light source to each light valve and a cross prism for combining light beams reflected from the respective light valves" as a transparent plate having an optical path length equivalent thereto.

Numerical reference 3 denotes "plural optical elements having a refractive power". In the specific example of the embodiment, although they are composed of ten lens elements and a stop, the number of the lens elements is not limited to ten. Also, the position of the stop is not limited to the position shown therein.

Numerical reference 4 denotes "a non-movable reflection curved surface". In the embodiment, the second optical system is composed of only the non-movable reflection curved surface 4.

FIG. 2 is a diagram showing the first specific example of an embodiment of the present invention and shows a state such that an 80-inches-diagonal image is projected onto an image plane at a projection distance of 551 mm.

FIG. 3 is a diagram showing the first specific example of an embodiment of the present invention and shows a state such that a 60-inches-diagonal image is projected at a projection distance of 438 mm.

FIG. 4 is a diagram showing the first specific example of an embodiment of the present invention and shows a state such that a 40-inches-diagonal image is projected at a projection distance of 334 mm.

In FIGS. 2, 3 and 4, the light valve element is a 0.6-inches-diagonal one and has an aspect ratio of 3:4.

In FIGS. 2, 3 and 4, all the optical paths of five light beams emitted from the object plane 1 is shown. These are enlarged and focused on an image plane 5.

Figure 5:
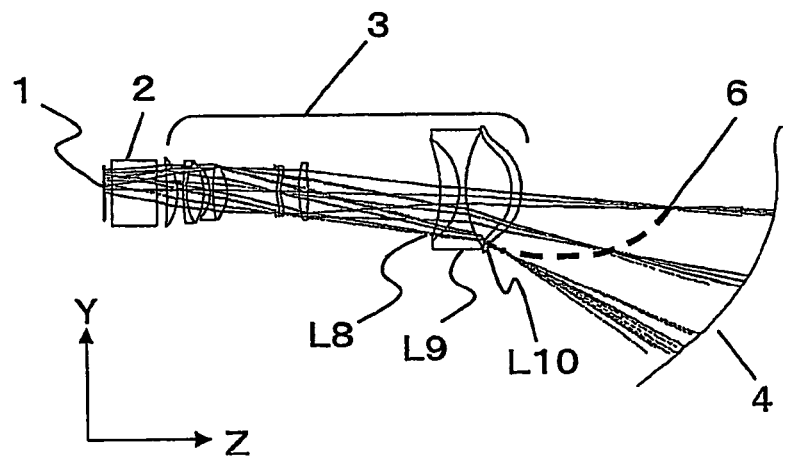
FIG. 5 is an enlarged view of the optical system of FIG. 2.
Figure 6:
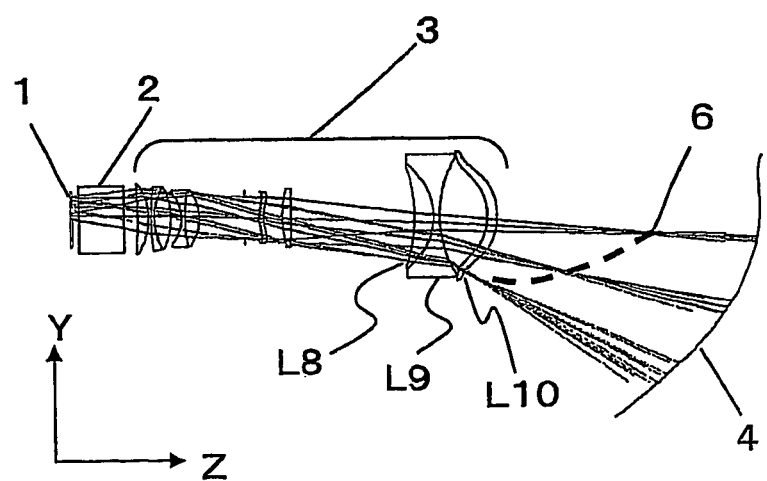
FIG. 6 is an enlarged view of the optical system of FIG. 3.
Figure 7:
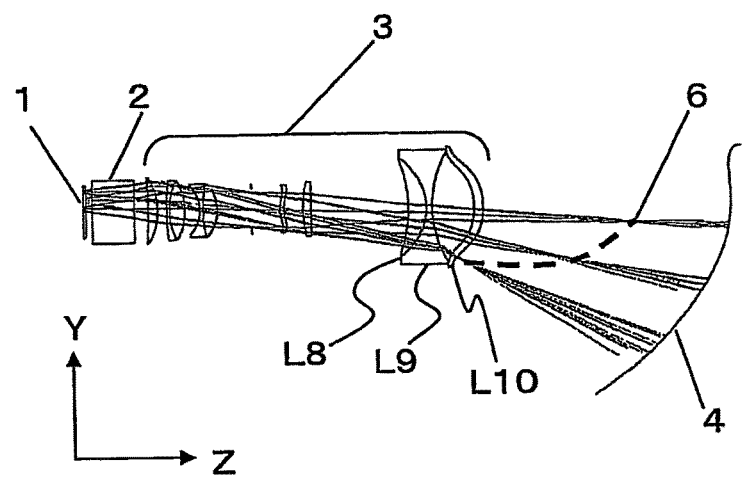
FIG. 7 is an enlarged view of the optical system of FIG. 4.

FIGS. 5, 6 and 7 show enlargements of the object plane 1 to the second optical system 4 in FIGS. 2, 3 and 4, respectively.

FIG. 5 shows an enlarged view of the optical system in FIG. 2.

FIG. 6 shows an enlarged view of the optical system in FIG. 3.

FIG. 7 shows an enlarged view of the optical system in FIG. 4.

In FIGS. 5, 6 and 7, numerical reference 6 denotes an intermediate image of an object point on the object plane 1. Strictly, a light beam of each angle of view may not be focused on one point at the intermediate image and may have aberration.

In FIGS. 5, 6 and 7, countless light beams are emitted from the object plane 1 in practice but not all of them are shown. A dashed line 6 schematically shows an intermediate image obtained by these light beams. As shown in the figures, the intermediate image is curved to the under side in the specific example of the embodiment. In the optical system according to an embodiment of the present invention, an intermediate image that is curved to the under side is shown as a typical example.

In FIGS. 5, 6 and 7, the first optical system forms an intermediate image at the side of the first optical system with respect to the optical surface that is closest to the first optical system in the second optical system.

Then, the intermediate image is enlarged and projected by a mirror of the second optical system.

Herein, when FIG. 5, FIG. 6 and FIG. 7 are referred to, only the elements of the first optical system are moved and the mirror of the second optical system is not moved.

Also, lenses L8, L9 and L10 are not moved in the first optical system.

The second optical system is composed of one concave mirror 4 and the concave mirror has a power. Also, the power is positive. In this practical example, the concave mirror 4 has a free-form surface. The formula for defining the free-form surface is expressed by the formula (c) of anamorphic polynomial free-form surface as described above.

The formula (2) can be applied to the reflection curved surface 4 by taking a coordinate system as shown in FIG. 2. In this case, the reflection curves surface has a symmetric shape with respect to the position of X=0 in the directions of positive X and negative X in a typical example of an embodiment of the present invention.

The reflection curved surface 4 may be a free-form surface in the embodiment, and otherwise, may be, for example, an axially symmetric aspheric surface represented by the above formula (b) or (c). Furthermore, the axially symmetric aspherical surface may include an odd-ordered aspherical surface as represented by the above formula (c).

Figure 8:
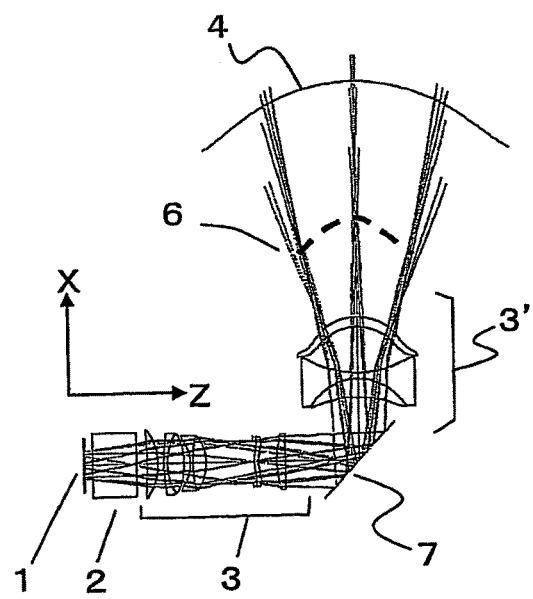
FIG. 8 is a diagram showing a second specific example of an embodiment of the present invention, which shows a configuration for projecting an image onto an 80-inches-diagonal screen.
Figure 9:
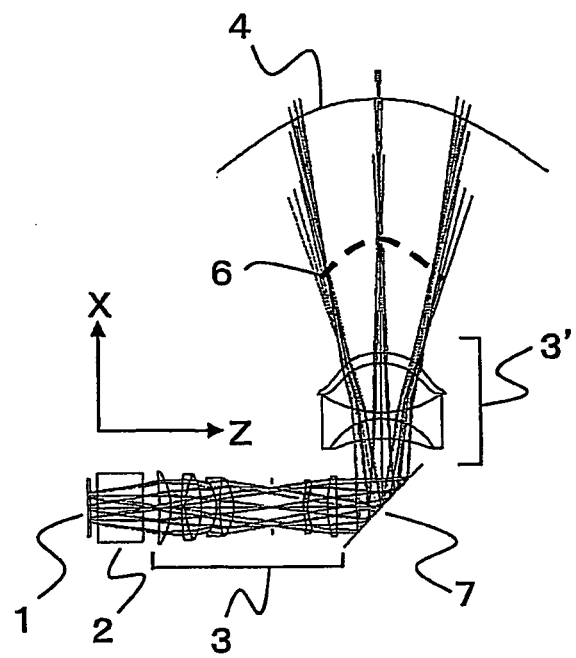
FIG. 9 is a diagram showing a second specific example of an embodiment of the present invention, which shows a configuration for projecting an image onto a 60-inches-diagonal screen.

FIG. 8 and FIG. 9 show the second specific example of an embodiment of the present invention.

FIG. 8 is a diagram showing the second specific example of an embodiment of the present invention and shows a configuration for projecting an image onto an 80-inches-diagonal screen. FIG. 9 is a diagram showing the second specific example of an embodiment of the present invention and shows a configuration for projecting an image onto a 60-inches-diagonal screen.

Figure 27:
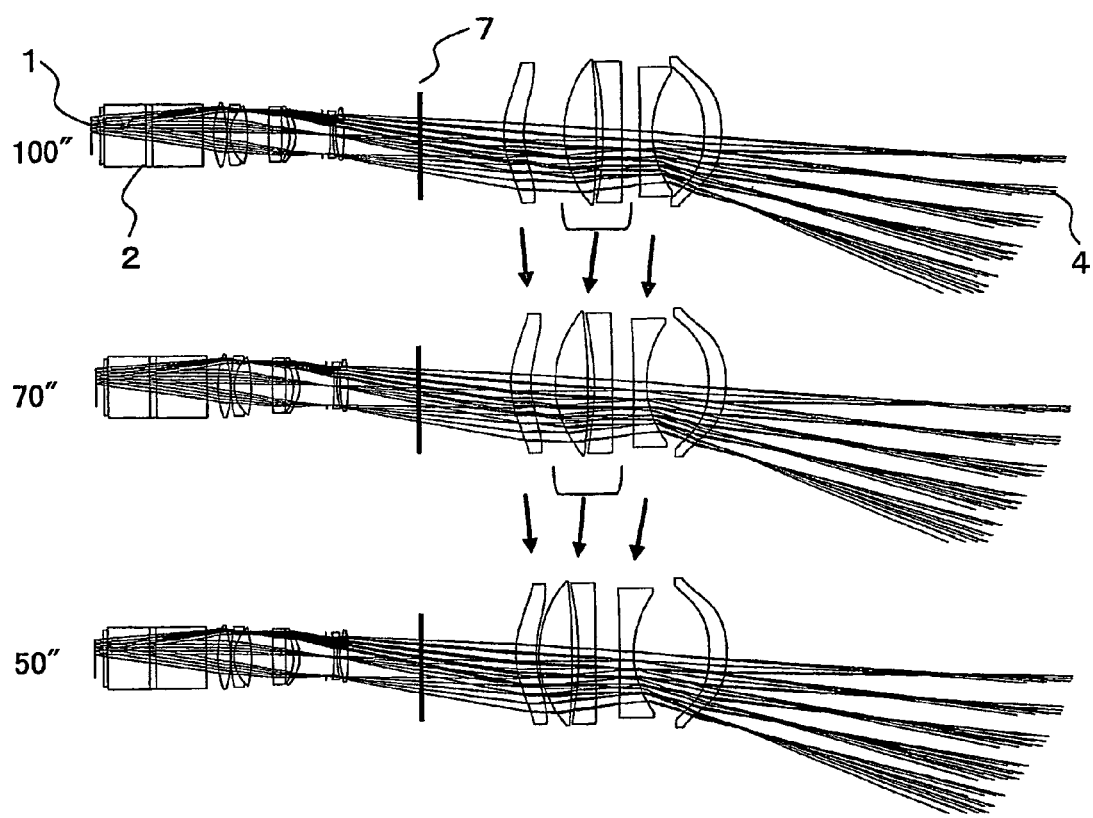
FIG. 27 shows an enlargement of an object plane 1 to a second optical system 4 in any of FIGS. 24, 25 and 26.

A configuration such that a folding mirror 7 is provided between a lens L7 and a lens L8 in the first optical system is shown in FIG. 8. Projection is applied on an 80-inches-diagonal screen in the configuration of FIG. 8. In the configuration of FIG. 9, projection is applied on a 60-inchesdiagonal screen. In FIGS. 8 and 9, since lenses L8, L9 and L10 are not moved in a first optical system 3', it is only necessary to provide a cam at the side of reduction with respect to a folding mirror. Also, a mirror 4 of the second optical system is not moved in FIGS. 8 and 9. Furthermore, the folding mirror is not moved. Herein, although lenses of the first optical system 3' are fixed and a cam is provided only at the side of reduction with respect to the folding mirror in the specific example, otherwise, lenses at the side of reduction with respect to a folding mirror are fixed and a cam may be provided at the side of the second optical system so as to move lenses at the side of the second optical system, as shown in FIG. 27.

Figure 10:
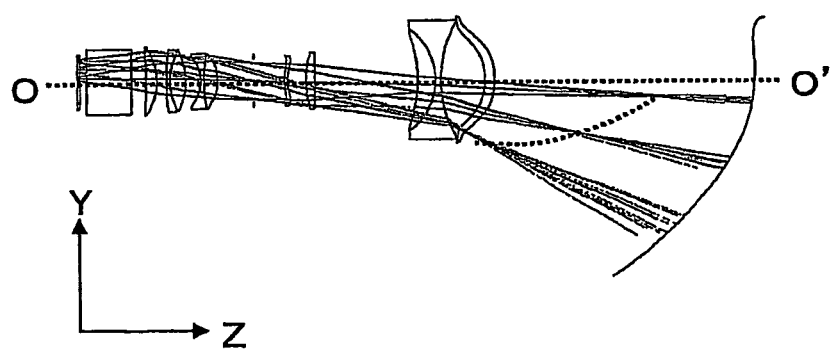
FIG. 10 is a diagram showing a third specific example of an embodiment of the present invention.
Figure 11:
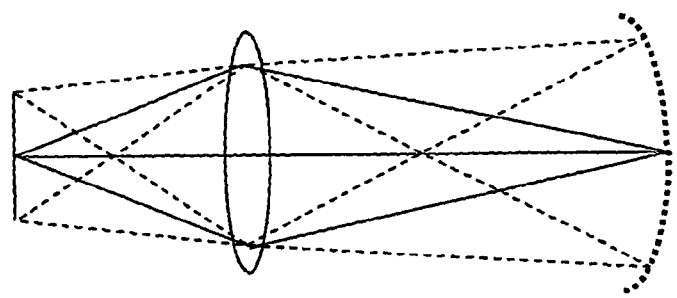
FIG. 11 is a diagram illustrating the curvature of field of an optical element having a positive power.

FIGS. 10 and 11 show the third specific example of an embodiment of the present invention.

FIG. 10 is a diagram showing the third specific example of an embodiment of the present invention. FIG. 11 is a diagram illustrating the curvature of field of an optical element having a positive power.

In FIG. 10, an intermediate image formed by the first optical system is shown by a dashed line. The intermediate image is curved to the under side.

When the intermediate image is provided with the characteristic of a curvature of field to the under side, the inclination of the image may be easily corrected in combination with a mirror having a positive power. The characteristic of a curvature of field to the under side refers to a state such that the larger the distance from an optical axis is, the smaller the distance between the intermediate image and the first optical system is. Herein, the optical axis is expressed by O-O' in FIG. 10.

From a different viewpoint, when the intermediate image 6 is considered as an object plane for the second optical system, the object plane is inclined to the over direction. That is, the larger the distance of a position from the optical axis O-O' is, the larger the distance from the intermediate image 6 to the mirror 4 is. In such a situation, the image inclination of the secondary image of the intermediate image may be easily corrected which secondary image is obtained by a mirror having a positive power. Herein, the secondary image of the intermediate image corresponds to an image plane for the projection optical system.

When an image of an object is obtained by an optical element having a positive power, the image plane tends to incline to the under side on the condition of no inclination of the object. FIG. 11 schematically shows the situation.

Herein, when the object plane gets inclined to the over side, the inclination of the image plane inclining to the under side may be reduced.

Commonly, the inclination is not linear but is curved. Meanwhile, it is commonly difficult to curve the object plane into a curved shape. The object plane is planar in many practical examples. For example, the object plane is on a light valve element in a projector optical system and a planar image is formed on a light valve element. For the light valve element, a DMD (Digital Mirror Device), an LCoS (Liquid Crystal on Silicon), a transmission-type liquid crystal light valve and the like are provided. Any of these has a planar shape. Therefore, high cost is required for forming it into a curved shape.

Meanwhile, a different situation is provided according to an embodiment of the present invention since the object plane corresponds to the intermediate image. That is, it is possible to form the intermediate image into a shape curving to the under side by a design of the first optical system and an additional cost required for implementation thereof is low. Then, an effect is obtained such that the inclination of an image plane for the projection optical system is easily corrected by curving the intermediate image to the under side.

Figure 12:
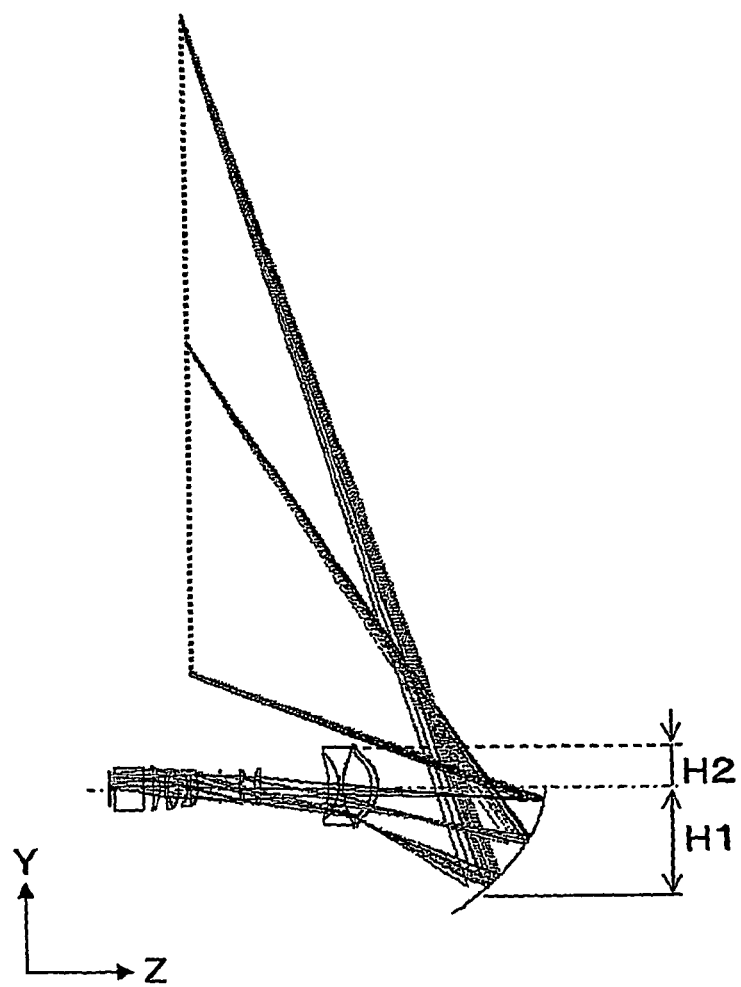
FIG. 12 is a diagram showing a fourth specific example of an embodiment of the present invention, which shows a configuration such that an object plane is shifted with respect to the optical axis of a first optical system.
Figure 13:
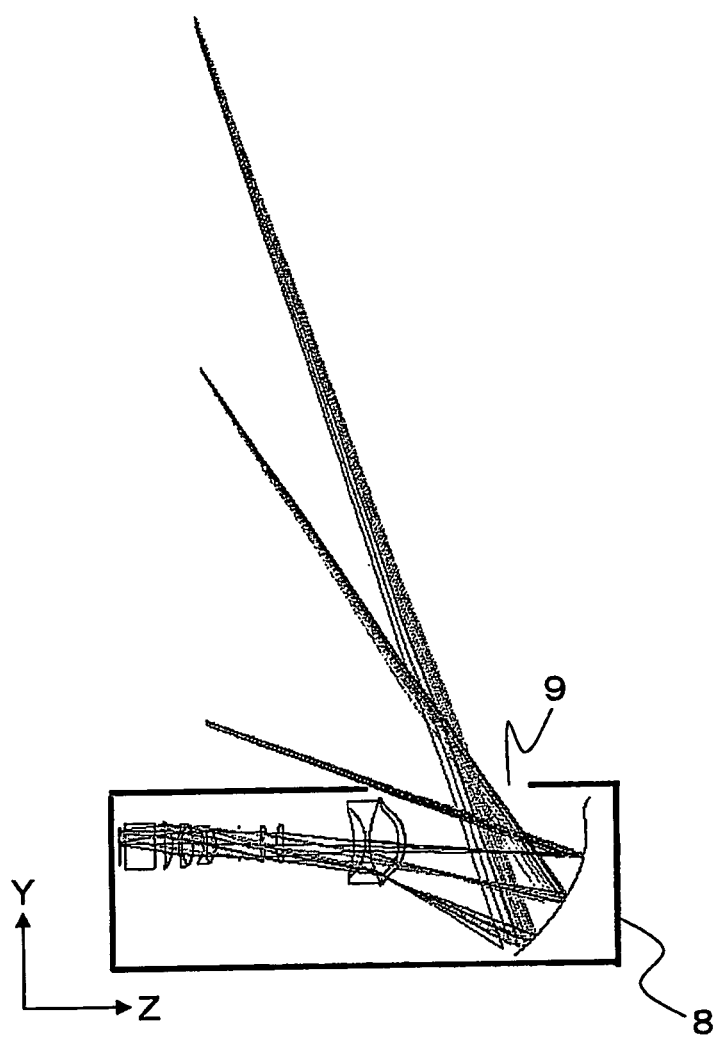
FIG. 13 is a diagram showing a fourth specific example of an embodiment of the present invention, which shows a configuration for covering an optical system by a housing frame.

FIG. 12 and FIG. 13 show the fourth specific example of an embodiment of the present invention. FIG. 12 is a diagram showing the fourth specific example of an embodiment of the present invention and shows a configuration such that the object plane is shifted with respect to the optical axis of the first optical system. FIG. 13 is a diagram showing the fourth specific example of an embodiment of the present invention and shows a configuration such that the optical system is covered by a housing.

In FIG. 10, the optical axis of the first optical system is shown by a straight line O-O'. The object plane is arranged to shift to the side of +Y with respect to the optical axis. Then, the intermediate image formed by the first optical system is shown by a dashed line MM'. The intermediate image is formed at the side of −Y from the optical axis. Also, the figure shows that the concave mirror of the second optical system may be arranged at the side of −Y from the optical axis. FIG. 12 is a general view of the optical system shown in FIG. 10 and also shows the position of an image plane. There is provided a configuration such that light rays reflected from a mirror passes through the optical axis and reaches an image plane at the opposite side. The maximum distance from the optical axis to the mirror is denoted by H1. When the optical system is covered by a housing, only a thickness of approximately H1+H2 (wherein H2 is the outer diameter of a lens L19) is needed. Herein, a configuration such that reflection is not repeated by curved mirrors several times is different from the configuration shown in the diagram of the conventional example. Accordingly, the increase of the thickness of an optical system which is caused by repeated reflection is not caused.

In FIG. 10, a panel surface 1 is arranged to shift to a direction orthogonal to the optical axis of the first optical system. The amount of shifting in this embodiment is 6.8 mm. As shown in FIGS. 10 and 12, an effect may be obtained such that the height of a reflection curved surface of the second optical system is arranged not to be high to the direction of +Y by arranging the panel to shift, since the optical path after emitting from the first optical system is directed to the direction of −Y with respect to the optical axis. Also, as described below, since the size of the reflection curved surface may be configured to be compact, the reflection curved surface may be prevented from being too low to the direction of −Y. Due to these effects, when such an optical system is included in a housing, the reflection curved surface may be easily included in the housing and the height of the housing in the Y-directions may be small.

A configuration such that an optical system including a mirror part is covered by a housing is schematically shown in FIG. 13. In the configuration of FIG. 13, a user does not contact the mirror. Also, since the mirror is covered by a housing 8, dust does not easily adhere to it. These effects similarly apply to the first optical system.

If the dust is scorched by heat, the reflectance of the mirror may be reduced or it may be a scattering source so that the image quality of a projected image is degraded. The reduction of the reflectance reduces the brightness. The scattering reduces the contrast. In this practical example, such situations are prevented. Also, damages such as generation of breakage or warping caused by contacting a mirror are also prevented.

Additionally, an aperture 9 is provided on a part of the apparatus housing 8 in FIG. 13 so that light rays pass out of the housing 8.

Also, although the optical path in the first optical system is not folded in the example of FIG. 13, a folding configuration as shown in FIGS. 8 and 9 is, of course, possible. The length of the apparatus in the Z-directions may be reduced by the folding thereof.

FIGS. 14 (a) and (b) shows the fifth specific example of an embodiment of the present invention.

An image displaying apparatus may be configured by using the projection optical system described above. An example of the configuration is schematically shown in FIGS. 14 (a) and (b).

A lamp light source is shown as a light source 10. For the lamp light source, a xenon lamp, a halogen lamp, a metal halide lamp, a super-high pressure mercury lamp and the like may be used. Alternatively, a solid light source such as an LED, an LD and a laser may be used.

The light from the light source may include a UV component and an IR component but they may be cut out by cut filters 11 and 12 so that the degradation of an optical element is suppressed.

A polarized light converting element 13 is allowed to convert the light polarization characteristic of a light ray to a linearly polarized light so that the efficiency of light utilization may be improved.

A pair of fly-eye lens arrays 14 and 15 are allowed to homogenize the distribution of illumination light quantity.

A condenser lens 16 is allowed to adjust the illumination angle and illumination area for the light valve.

A light beam emitted from the fly-eye lens 15 in FIG. 14(a) reaches a dichroic mirror 17 in FIG. 14(b).

The dichroic mirror 17 selects and reflects a blue-wavelength component so as to separate the optical path of blue illumination from the optical path of multi-color illumination. The light transmitting through the dichroic mirror 17 (the light including a green-wavelength component and a red-wavelength component) is reflected from a mirror 26 and enters a dichroic mirror 18.

The dichroic mirror 18 selects and reflects a green-wavelength component so as to separate the optical paths of green illumination and red illumination.

The light reflected from the dichroic mirror 17 transmits through a polarization beam splitter 19 so as to illuminate a light valve element 22.

The light reflected from the dichroic mirror 18 transmits through a polarization beam splitter 20 so as to illuminate a light valve element 23.

The light transmitting through the dichroic mirror 18 transmits through a polarization beam splitter 21 so as to illuminate a light valve element 24.

The light valve elements 22, 23 and 24 shown here are reflection-type light valve elements.

The illumination light for the light valve element 22 is modulated by the light valve element 22 so as to provide an image signal of the blue-wavelength component.

The illumination light for the light valve element 23 is modulated by the light valve element 23 so as to provide an image signal of the green-wavelength component.

The illumination light for the light valve element 24 is modulated by the light valve element 24 so as to provide an image signal of the red-wavelength component.

The reflected light modulated by the light valve element 22 is reflected from the polarization beam splitter 19 and combined with reflected light with other colors by a cross prism 25.

The reflected light modulated by the light valve element 23 is reflected from the polarization beam splitter 20 and combined with reflected light with other colors by the cross prism.

The reflected light modulated by the light valve element 24 is reflected from the polarization beam splitter 21 and combined with reflected light with other colors by the cross prism.

The reflected light combined by the dichroic prism 25 forms an intermediate image by the first optical system of the projection optical system.

The intermediate image is enlarged and projected by the second optical system.

The projection optical system is configured such that the light valve elements 22, 23 and 24 are object planes 1 for the projection optical system.

According to the configuration example described above, a three-plate-type enlarged image displaying apparatus may be provided. The effect that has already been described may be obtained by using a projection optical system according to an embodiment of the present invention.

Additionally, the projection optical system according to an embodiment of the present invention may also be applied to an image displaying apparatus in which a transmission-type light valve element is used, without a problem.

Alternatively, the projection optical system according to an embodiment of the present invention may also be applied to an image displaying apparatus in which an image is field-sequentially displayed by one light valve element.

Next, numerical practical example 1 of a projection optical system according to an embodiment of the present invention is shown below, with reference to FIGS. 15-22.

The numerical values of a surface number, radius of curvature, surface distance, refractive index and Abbe number for a projection optical system in the practical example are shown in TABLE 1.

TABLE 1

| Surface number | Radius of curvature (mm) | Surface distance (mm) | Refractive index | Abbe number | Note 1 | Note 2 |
|---|---|---|---|---|---|---|
| Object | 0.000 | 4.200 | | | | |
| 1 | 0.000 | 1.100 | 1.517 | 64.2 | | |
| 2 | 0.000 | 4.010 | | | | |
| 3 | 0.000 | 24.900 | 1.517 | 64.2 | | |
| 4 | 0.000 | 6.567 | | | | |
| 5 | −352.269 | 6.496 | 1.497 | 81.6 | | |
| 6 | −32.778 | 2.465 | | | | |
| 7 | 87.501 | 2.946 | 1.834 | 37.3 | | |
| 8 | 30.729 | 9.454 | 1.497 | 81.6 | | |
| 9 | −34.470 | 3.839 | | | | |
| 10 | −20.746 | 1.800 | 1.517 | 64.2 | | |
| 11 | −362.003 | 6.492 | 1.497 | 81.6 | | |
| 12 | −23.226 | 26.066 | | | | |
| Stop | 0.000 | 2.224 | | | | |
| 14 | 26.708 | 2.597 | 1.511 | 56 | ○ | |
| 15 | 19.023 | 9.979 | | | ○ | |
| 16 | 69.143 | 4.990 | 1.569 | 71.3 | | |
| 17 | −99.499 | 77.949 | | | ○ | |
| 18 | −62.400 | 9.835 | 1.713 | 53.9 | | |
| 19 | −32.800 | 3.190 | 1.487 | 70.4 | | |
| 20 | 62.528 | 23.041 | | | | |
| 21 | −33.721 | 5.539 | 1.531 | 56 | ○ | |
| 22 | −35.600 | 30.000 | | | ○ | |
| 23 | 0.000 | 100.566 | | | | |
| 24 | 0.000 | −535.393 | | | ○ | ○ |
| Image | 0.000 | 0.000 | | | | |

Note 1: An aspherical surface is indicated by a "○" mark. (Herein, however, the 24th surface is a free-form surface.)
Note 2: A reflection surface is indicated by a "○" mark.

In TABLE 1, an aspherical surface is indicated by a "○" mark in the column of Note 1. The 14th, 15th, 17th, 21th, and 22th surfaces are rotationally symmetric aspherical surfaces and the 24th surface is an anamorphic polynomial free-form surface.

In TABLE 1, a reflection surface is also indicated by a "○" mark in the column of Note 2. That is, the 24th surface is a mirror surface.

In TABLE 1, the values of surface distance which are changed depending on the projection magnification ratio are shown in the italic format.

An optical path length equivalent to that of the case where a cross prism or a polarization beam splitter is provided is provided between an object and the 5th surface.

The coefficients of aspherical surface are shown in TABLES 2-6.

TABLE 2

| | Surface number 14 |
|---|---|
| K | 0 |
| A | −0.00010 |
| B | −1.64E−08 |
| C | 6.26E−10 |
| D | −1.95E−13 |
| E | −2.80E−14 |
| F | 8.91E−17 |

TABLE 3

| | Surface number 15 |
|---|---|
| K | 0 |
| A | −0.00014 |
| B | −3.66E−08 |
| C | 1.34E−09 |
| D | −8.64E−12 |
| E | 1.74E−14 |
| F | −4.50E−18 |

TABLE 4

| | Surface number 17 |
|---|---|
| K | 0 |
| A | −0.00014 |
| B | −3.66E−08 |
| C | 1.34E−09 |
| D | −8.64E−12 |
| E | 1.74E−14 |
| F | −4.50E−18 |

TABLE 5

| | Surface number 21 |
|---|---|
| K | 0 |
| A | 5.23E−06 |
| B | −6.84E−08 |
| C | 1.10E−10 |
| D | 2.68E−15 |

TABLE 5-continued

| | Surface number 21 |
|---|---|
| E | −7.52E−17 |
| F | 3.35E−20 |

TABLE 6

| | Surface number 22 |
|---|---|
| K | 0 |
| A | 3.12E−06 |
| B | −4.29E−08 |
| C | 6.31E−11 |
| D | −4.01E−14 |
| E | 3.49E−17 |
| F | −1.62E−20 |

TABLE 7

| 4th order coefficient | A |
|---|---|
| 6th order coefficient | B |
| 8th order coefficient | C |
| 10th order coefficient | D |
| 12th order coefficient | E |
| 14th order coefficient | F |

The relation between the orders of the coefficients provided in the above formula (a) and the symbols of the coefficients are summarized in TABLE 7.

The coefficients of free-form surface of the 24th surface are shown in TABLE 8. The coefficients of free-form surface of the 24th surface are the coefficients provided in the above formula (b).

TABLE 8

| | Surface number 24 |
|---|---|
| X2 | −0.0057697 |
| Y2 | −3.44E−03 |
| X2Y | −4.09E−05 |
| Y3 | −1.92E−05 |
| X4 | −1.79E−08 |
| X2Y2 | −4.25E−07 |
| Y4 | −2.15E−07 |
| X4Y | 5.78E−10 |
| X2Y3 | −2.26E−09 |
| Y5 | −2.25E−09 |
| X6 | −8.76E−13 |
| X4Y2 | −9.06E−13 |
| X2Y4 | −8.10E−12 |
| Y6 | −2.90E−11 |
| X6Y | 1.47E−14 |
| X4Y3 | −1.15E−13 |
| X2Y5 | −2.12E−13 |
| Y7 | −3.89E−14 |
| X8 | −1.48E−15 |
| X6Y2 | 2.05E−15 |
| X4Y4 | −9.37E−16 |
| X2Y6 | −5.66E−15 |
| Y8 | 7.05E−15 |
| X8Y | −1.84E−17 |
| X6Y3 | 5.49E−18 |
| X4Y5 | 3.85E−17 |
| X2Y7 | −6.43E−17 |
| Y9 | 1.06E−16 |
| X10 | 2.27E−19 |

TABLE 8-continued

| | Surface number 24 |
|---|---|
| X8Y2 | −4.02E−19 |
| X6Y4 | −2.97E−21 |
| X4Y6 | 4.72E−19 |
| X2Y8 | −3.17E−19 |
| Y10 | 4.88E−19 |

The degree of decentering of the 24th surface is shown in TABLE 9.

TABLE 9

| Shift in an X direction (mm) | −48.22 |
|---|---|
| Rotation in a YZ plane (°) | −33.66 |

The numerical aperture (NA) of the optical system at the side of an object in numerical practical example 1 is 0.25.

In numerical practical example 1, the center of an image plane is arranged to be shifted to a +Y direction by 6.46 mm with respect to the optical axis of the first optical system.

Additionally, the magnification ratio of numerical practical example 1 in TABLE 1 is 127. Herein, the magnification ratio is approximately a ratio of the size of an image to the size of an object.

Also, the values of the surface distance in the states of different magnification ratios in numerical practical example 1 are shown in TABLE 10.

In TABLE 10, for example, surface distance d10 means the surface distance between the surface of number 10 and the surface of number 11.

TABLE 10

| | Magnification | | |
|---|---|---|---|
| | 126.99 | 95.20 | 63.49 |
| d4 | 6.57 | 7.59 | 8.52 |
| d6 | 2.46 | 1.97 | 5.53 |
| d9 | 3.84 | 6.15 | 7.69 |
| d12 | 26.07 | 23.08 | 19.20 |
| d13 | 2.22 | 9.04 | 18.13 |
| d17 | 77.95 | 71.23 | 60.00 |
| d24 | −535.39 | −424.89 | −321.62 |

Figure 15:
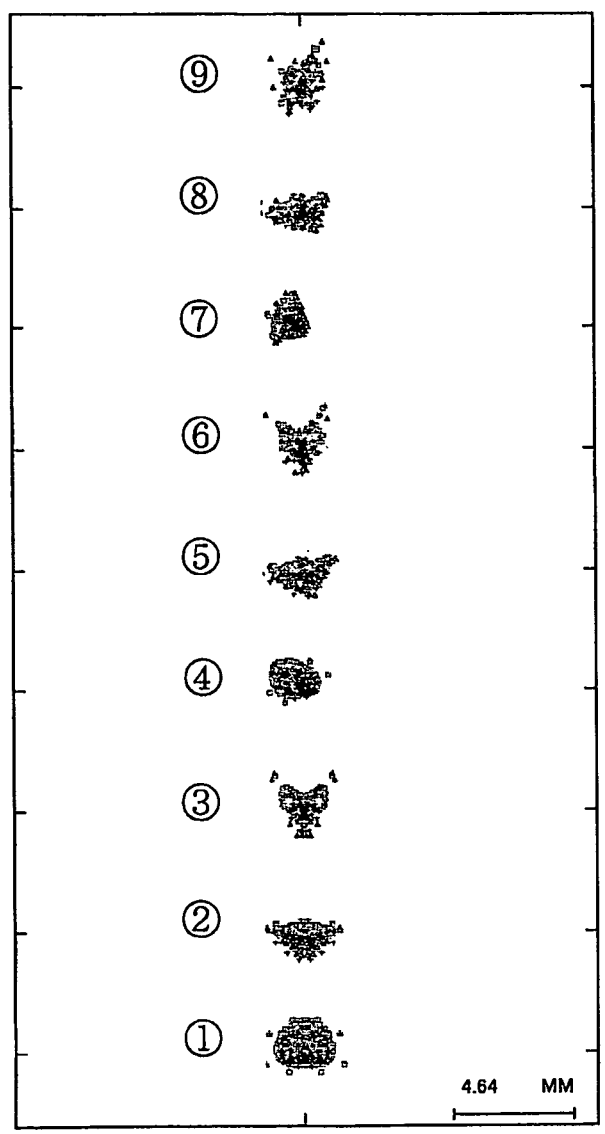
FIG. 15 is a diagram showing a spot diagram on an image plane at a magnification ratio of 127 in numerical practical example 1.
Figure 16:
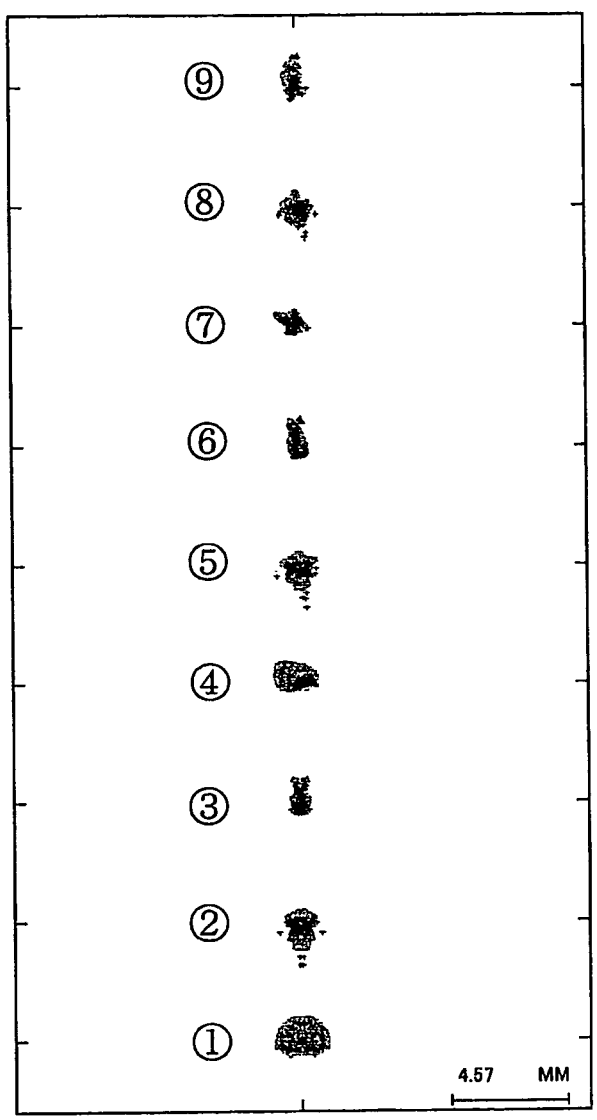
FIG. 16 is a diagram showing a spot diagram on an image plane at a magnification ratio of 95.2 in numerical practical example 1.

FIG. 15 is a diagram showing a spot diagram on an image plane at a magnification ratio of 127 in numerical practical example 1. Similarly, FIG. 16 is a diagram showing a spot diagram on an image plane at a magnification ratio of 95.2 in numerical practical example 1. Furthermore, FIG. 17 is a diagram showing a spot diagram on an image plane at a magnification ratio of 63.5 in numerical practical example 1.

Figure 17:
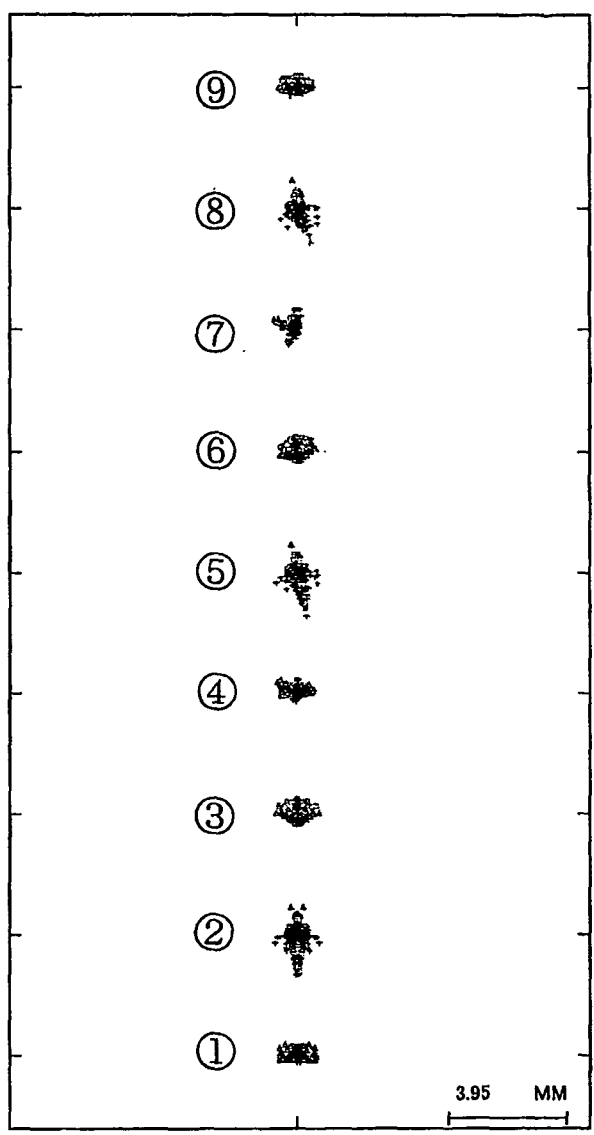
FIG. 17 is a diagram showing a spot diagram on an image plane at a magnification ratio of 63.5 in numerical practical example 1.
Figure 18:
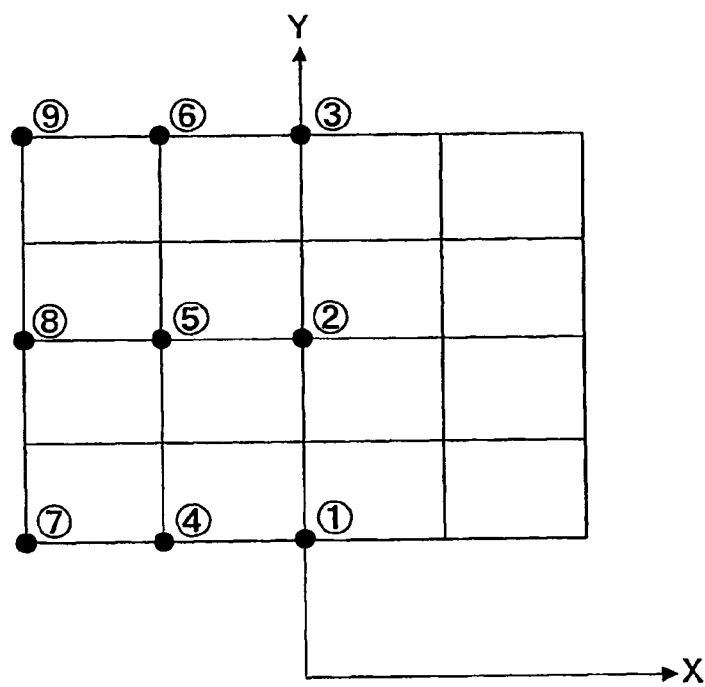
FIG. 18 is a diagram showing correspondence between spots shown in FIGS. 15, 16 and 17 and the positions thereof on the image plane.

FIG. 18 is a diagram showing the correspondence between spots shown in FIGS. 15, 16 and 17 and the positions thereof on the image plane. In regard to an area of X≤0 on an image plane in an XY plane, nine lattice points obtained by equally dividing it in the X-directions into three parts and equally dividing it in the Y-directions into three parts are shown in FIG. 18. These lattice points are indicated by

①-⑨ and the spot diagrams of them are shown in FIGS. 15, 16 and 17.

Additionally, in numerical practical example 1, the image plane is in an XY plane and only the positions of spots at the side of +X are shown in FIG. 18 since the spot characteristics on the image plane should be symmetric spot characteristics with respect to the Y-axis in the ±X-directions.

As shown in FIGS. 15, 16 and 17, the light spots are condensed well in any of the projection magnification ratios. In numerical practical example 1, an XGA class of resolution can be obtained.

In regard to an XGA resolution frequency, the obtained performance that is the value of a white modulation transfer function (MTF) is 50% or greater all over the area of a screen.

Figure 19:
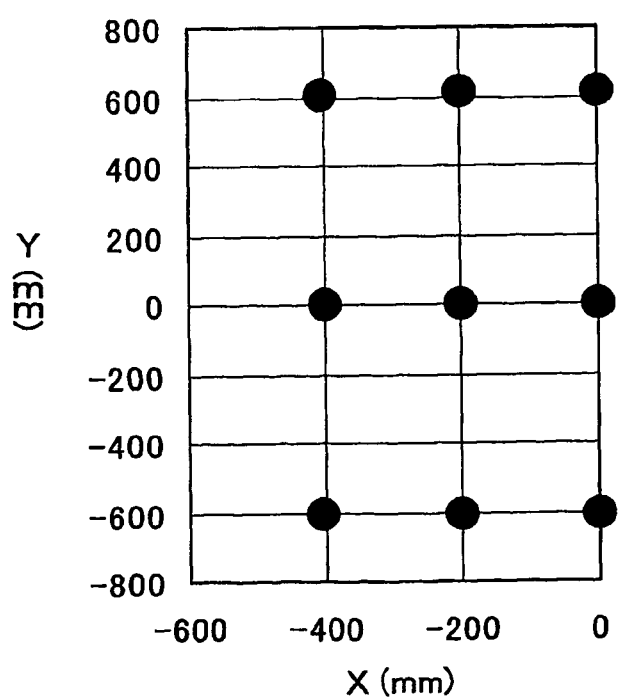
FIG. 19 is a diagram showing a TV distortion characteristic at a projection magnification ratio of 127 in numerical practical example 1.
Figure 20:
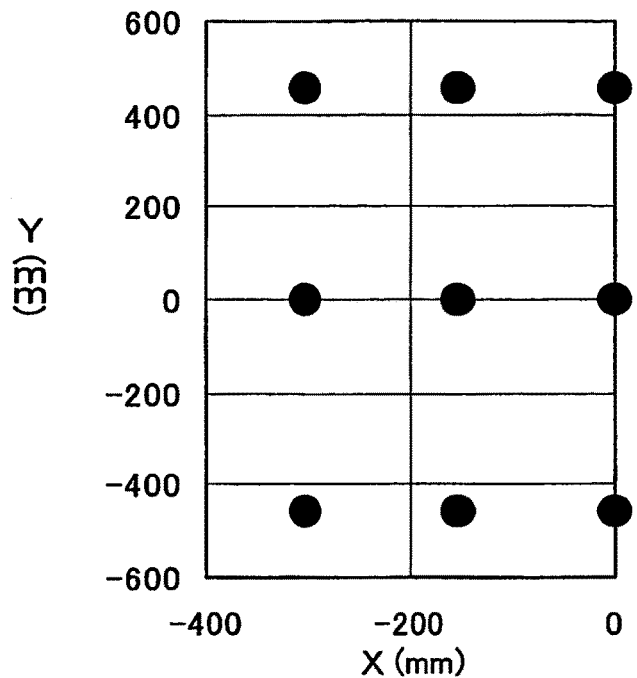
FIG. 20 is a diagram showing a TV distortion characteristic at a projection magnification ratio of 95.2 in numerical practical example 1.
Figure 21:
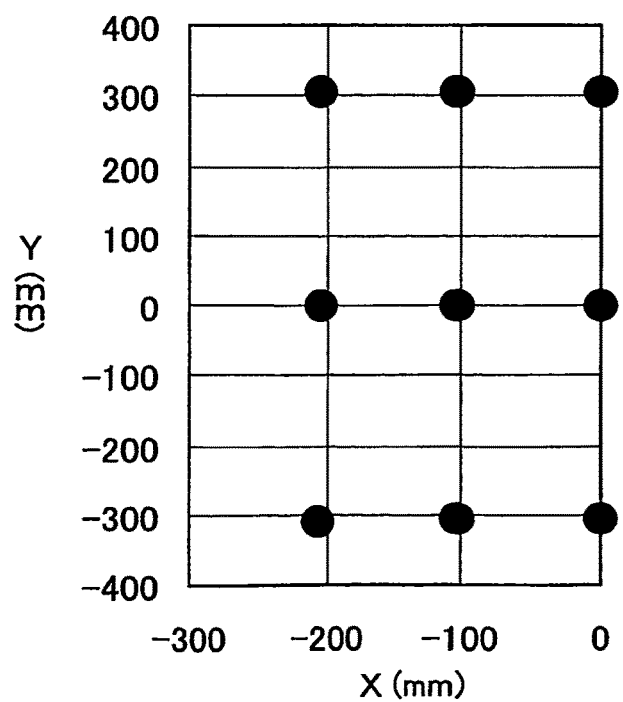
FIG. 21 is a diagram showing a TV distortion characteristic at a projection magnification ratio of 63.5 in numerical practical example 1.

FIG. 19 is a diagram showing a TV distortion characteristic at a projection magnification ratio of 127. FIG. 20 is a diagram showing a TV distortion characteristic at a projection magnification ratio of 95.2. FIG. 21 is a diagram showing a TV distortion characteristic at a projection magnification ratio of 63.5.

Herein, the TV distortion is a numerical value for evaluating the distortion of an image in the directions of a long side thereof when the image is projected on a TV monitor and is defined by Dh=Δh/2 h×100%, wherein Dh represents the TV distortion, h represents the length between the center of the image and an end of the image in the directions of a short side thereof, and Δh represents the distance from a straight line extending in the directions of a long side of the image and passing through an apex of the image to a straight line extending in the directions of a long side of the image and passing through an end of the image in the directions of a short side of the image.

The TV distortion is 1% or less and the distortion is corrected well in any of the cases.

Also, the maximum distances between the image plane and the mirror at projection magnification ratios of 127, 95.2, and 63.5 are 535.4 mm, 424.9 mm, and 321.6 mm, respectively. Thus, the distance from the mirror to the image plane is small and the practical example may attain a performance such that enlarging projection with a high magnification ratio in a close range may be allowed.

Also, the maximum value of a half angle of view of a principal ray projected toward a projection surface is approximately 74° in the projection optical system in numerical practical example 1.

Additionally, in the projection optical system in numerical practical example 1, an intermediate image is moved when the projection distance and the projection magnification ratio are changed.

Figure 22:
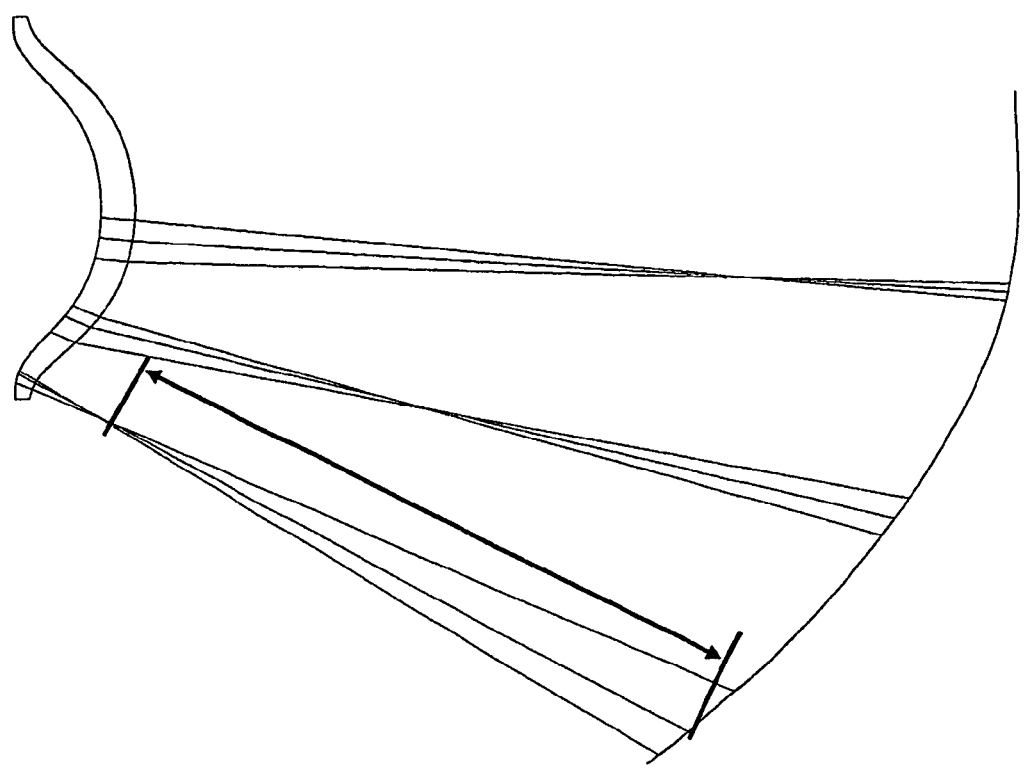
FIG. 22 is a diagram illustrating the movement of an intermediate image in numerical practical example 1.

FIG. 22 is a diagram illustrating the movement of an intermediate image in numerical practical example 1. A concave mirror (having the 24th surface) and a lens (having the 21th and 22th surfaces) which is closest to the concave mirror are shown in FIG. 22. As shown in FIG. 22, "a" is the optical path length of a principal ray from the intermediate image to the impingement thereof on the concave mirror which ray is the uppermost one reaching a portion of a screen in an axis connecting the optical axis of the lens and the center of the screen (the Y-axis, the directions of a short axis of the screen).

TABLE 11

| Image plane size | a |
|---|---|
| 80 inches | 112.3 mm |
| 40 inches | 117.6 mm |

As shown in TABLE 11, the optical path length "a" between an intermediate image and a concave mirror in an 80-inches one whose projection distance is large is small and the optical path length "a" between an intermediate image and a concave mirror in a 40-inches one whose projection distance is small is large. Thus, when the projection distance is changed, that is, the projection magnification ratio is changed, from for 80 inches to for 40 inches in numerical practical example 1, it may be confirmed that the intermediate image is moved.

Next, numerical practical example 2 of a projection optical system according to an embodiment of the present invention is shown below, with reference to FIGS. 24-33.

The numerical values of a surface number, radius of curvature, surface distance, refractive index and Abbe number for a projection optical system in the practical example are shown in TABLE 12.

TABLE 12

| Surface number | Radius of curvature (mm) | Surface distance (mm) | Refractive index | Abbe number | Note 1 | Note 2 |
|---|---|---|---|---|---|---|
| Object | 0.000 | 4.000 | | | | |
| 1 | 0.000 | 1.800 | 1.517 | 64.2 | | |
| 2 | 0.000 | 0.400 | 1.517 | 64.2 | | |
| 3 | 0.000 | 20.560 | 1.589 | 61.3 | | |
| 4 | 0.000 | 3.250 | 1.589 | 61.3 | | |
| 5 | 0.000 | 25.000 | 1.517 | 64.2 | | |
| 6 | 0.000 | 5.000 | | | | |
| 7 | 49.502 | 6.228 | 1.497 | 81.6 | | |
| 8 | −57.839 | 0.100 | | | | |
| 9 | 73.010 | 1.600 | 1.835 | 43.0 | | |
| 10 | 18.571 | 8.910 | 1.497 | 81.6 | | |
| 11 | −62.839 | 11.303 | | | | |
| 12 | 279.254 | 6.379 | 1.567 | 42.8 | | |
| 13 | −201.777 | 3.891 | | | | |
| 14 | −26.570 | 2.839 | 1.581 | 40.9 | | |
| 15 | −22.006 | 12.388 | | | | |
| 16 | 0.000 | 3.755 | | | | |
| 17 | −73.296 | 1.300 | 1.806 | 40.7 | | |
| 18 | 43.180 | 1.500 | | | | |
| 19 | 51.386 | 3.920 | 1.723 | 38.0 | | |
| 20 | −93.574 | 1.000 | | | | |
| 21 | 0.000 | *78.501* | | | | |
| 22 | 41.833 | 10.000 | 1.533 | 56.7 | ○ | |
| 23 | 47.189 | *20.022* | | | | ○ |
| 24 | 55.093 | 16.606 | 1.488 | 70.4 | | |
| 25 | −353.432 | 3.273 | | | | |
| 26 | −166.099 | 9.000 | 1.786 | 43.9 | | |
| 27 | −1582.630 | *8.796* | | | | |
| 28 | −936.901 | 6.442 | 1.713 | 53.9 | | |
| 29 | 50.387 | *26.257* | | | | |
| 30 | −83.019 | 8.000 | 1.533 | 56.7 | ○ | |
| 31 | −62.823 | 12.000 | | | ○ | |
| 32 | 0.000 | 100.000 | | | | |
| 33 | 0.000 | *−703.095* | | | ○ | ○ |
| Image | 0.000 | 0.000 | | | | |

Note 1: An aspherical surface is indicated by a "○" mark. (Herein, however, the 33th surface is a free-form surface.)
Note 2: A reflection surface is indicated by a "○" mark.

In TABLE 12, an aspherical surface is indicated by a "○" mark in the column of Note 1. The 22th, 23th, 30th, and 31th surfaces are rotationally symmetric aspherical surfaces and the 33th surface is an anamorphic polynomial free-form surface.

In TABLE 12, a reflection surface is also indicated by a "○" mark in the column of Note 2. That is, the 33th surface is a mirror surface.

In TABLE 12, the values of surface distance which are changed depending on the projection magnification ratio are shown in the italic format.

An optical path length equivalent to that of the case where a cross prism or a polarization beam splitter is provided is provided between an object and the 7th surface.

The coefficients of aspherical surface are shown in TABLES 13-16.

TABLE 13

| | Surface number 22 |
|---|---|
| K | 0 |
| A | −6.22E−06 |
| B | −5.72E−10 |
| C | 1.13E−12 |
| D | −9.50E−16 |
| E | 1.92E−19 |
| F | −5.59E−23 |
| G | −5.45E−27 |

TABLE 14

| | Surface number 23 |
|---|---|
| K | 0 |
| A | −8.09E−06 |
| B | 1.39E−09 |
| C | −7.92E−14 |
| D | −1.41E−16 |
| E | −1.37E−19 |
| F | 1.22E−23 |
| G | 2.53E−26 |

TABLE 15

| | Surface number 30 |
|---|---|
| K | 0 |
| A | −1.23E−05 |
| B | 1.42E−08 |
| C | −2.88E−11 |
| D | 2.74E−14 |
| E | −9.84E−18 |
| F | 1.33E−21 |
| G | −8.38E−26 |

TABLE 16

| | Surface number 31 |
|---|---|
| K | 0 |
| A | −9.30E−06 |
| B | 9.38E−09 |
| C | −1.51E−11 |
| D | 1.14E−14 |
| E | −4.21E−18 |
| F | 1.98E−21 |
| G | −5.82E−25 |

TABLE 17

| 4th order coefficient | A |
| 6th order coefficient | B |
| 8th order coefficient | C |
| 10th order coefficient | D |
| 12th order coefficient | E |

TABLE 17-continued

| | |
|---|---|
| 14th order coefficient | F |
| 16th order coefficient | G |

The relation between the orders of the coefficients provided in the above formula (a) and the symbols of the coefficients are summarized in TABLE 17.

The coefficients of free-form surface of the 33th surface are shown in TABLE 18. The coefficients of free-form surface of the 33th surface are the coefficients provided in the above formula (c).

TABLE 18

| | Surface number 33 |
|---|---|
| X2 | −0.0038697 |
| Y2 | −0.0017467 |
| X2Y | −1.09E−05 |
| Y3 | −1.87E−05 |
| X4 | −2.48E−08 |
| X2Y2 | −3.35E−07 |
| Y4 | 7.79E−07 |
| X4Y | −8.55E−10 |
| X2Y3 | 9.47E−09 |
| Y5 | −2.07E−08 |
| X6 | −4.53E−12 |
| X4Y2 | 4.18E−11 |
| X2Y4 | −3.29E−10 |
| Y6 | 3.08E−10 |
| X6Y | 4.80E−14 |
| X4Y3 | −1.32E−12 |
| X2Y5 | 6.54E−12 |
| Y7 | −2.61E−12 |
| X8 | 9.46E−16 |
| X6Y2 | −3.83E−15 |
| X4Y4 | 1.35E−14 |
| X2Y6 | −8.68E−14 |
| Y8 | 9.33E−15 |
| X8Y | 2.71E−18 |
| X6Y3 | 1.09E−16 |
| X4Y5 | 2.78E−18 |
| X2Y7 | 6.43E−16 |
| Y9 | 1.16E−17 |
| X10 | −1.13E−19 |
| X8Y2 | −8.22E−20 |
| X6Y4 | −1.00E−18 |
| X4Y6 | −4.92E−19 |
| X2Y8 | −2.06E−18 |
| Y10 | −1.45E−19 |

The degree of decentering of the 33th surface is shown in TABLE 19.

TABLE 19

| | |
|---|---|
| Shift in a Y direction (mm) | −97.18 |
| Rotation in a YZ plane (°) | −48.46 |

The numerical aperture (NA) of the optical system at the side of an object in numerical practical example 2 is 0.22.

In numerical, practical example 2, the center of an image plane is arranged to be shifted to a +Y direction by 5.57 mm with respect to the optical axis of the first optical system.

Additionally, the magnification ratio of numerical practical example 2 in TABLE 12 is 164.7.

Also, the values of the surface distance in the states of different magnification ratios in numerical practical example 2 are shown in TABLE 20.

In TABLE 20, for example, surface distance d21 means the surface distance between the surface of number 21 and the surface of number 22.

TABLE 20

| | Magnification | | |
|---|---|---|---|
| | 164.72 | 115.30 | 82.36 |
| d21 | 78.501 | 80.012 | 82.289 |
| d23 | 20.022 | 12.258 | 1.500 |
| d27 | 8.796 | 9.984 | 11.545 |
| d29 | 26.257 | 31.322 | 38.242 |
| d33 | −703.095 | −487.617 | −343.987 |

Figure 24:
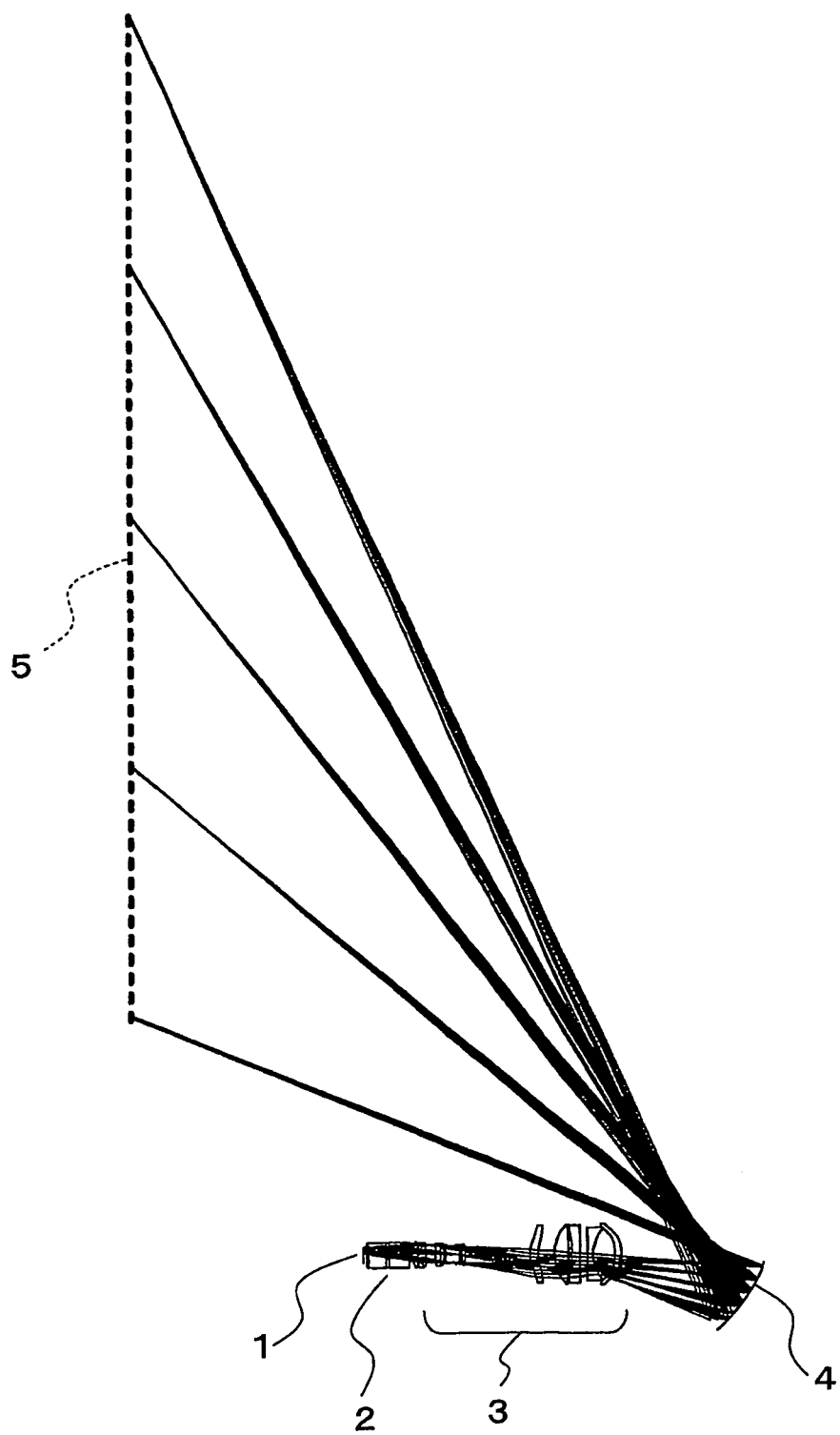
FIG. 24 shows a state such that a 100-inches-diagonal image is projected at a projection distance of 759 mm in numerical practical example 2.
Figure 25:
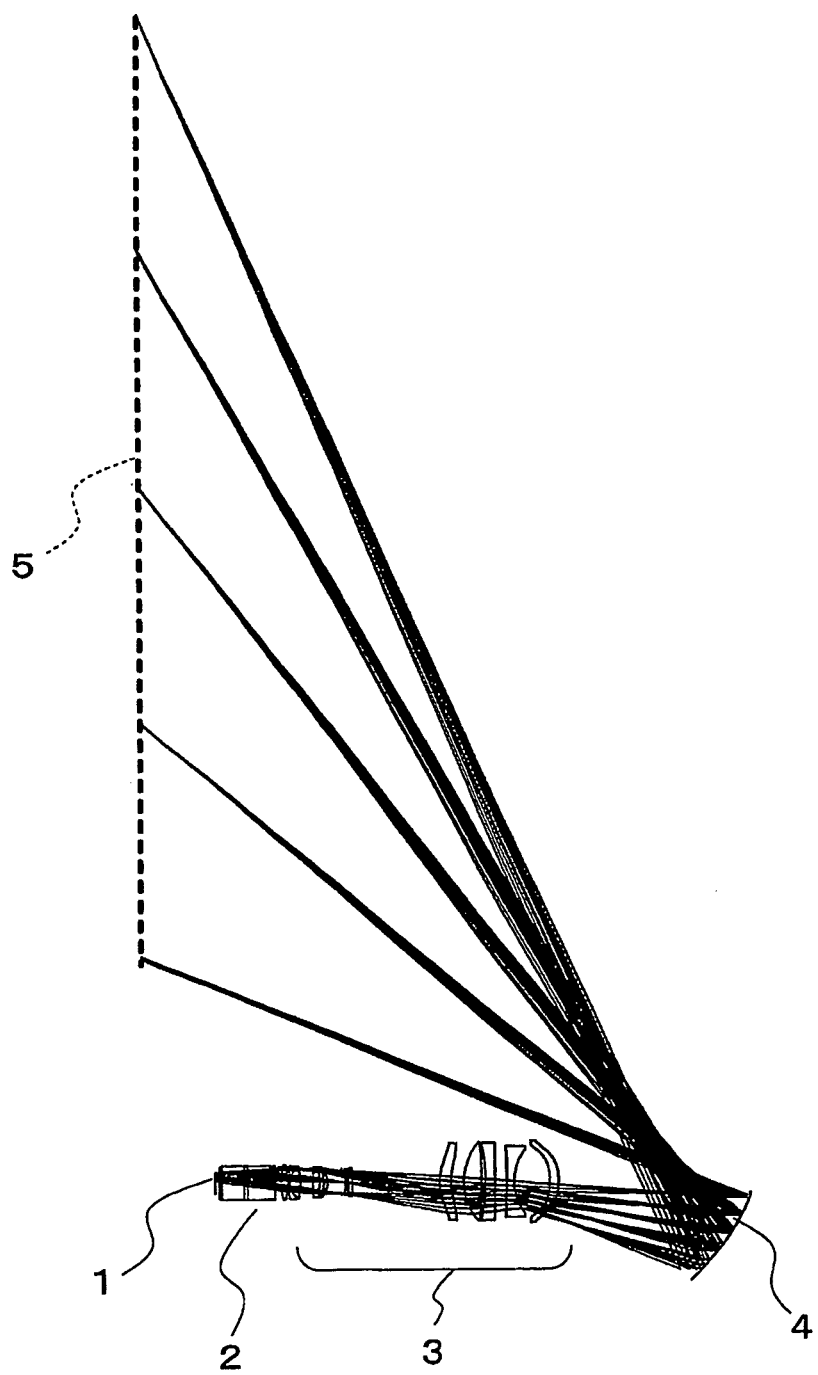
FIG. 25 shows a state such that a 70-inches-diagonal image is projected at a projection distance of 544 mm in numerical practical example 2.
Figure 26:
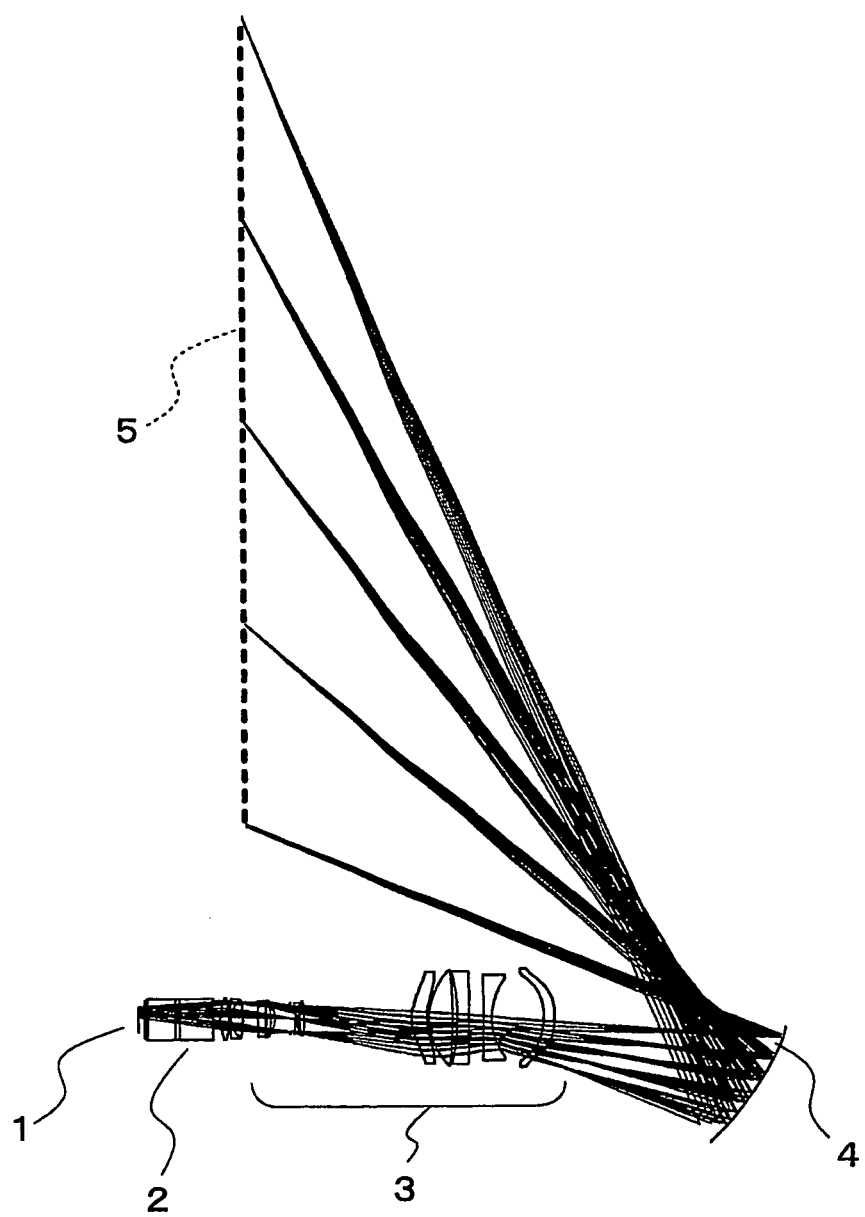
FIG. 26 shows a state such that a 50-inches-diagonal image is projected at a projection distance of 400 mm in numerical practical example 2.

FIG. 24 shows a state such that a 100-inches-diagonal image is projected at a projection distance of 759 mm in numerical practical example 2. FIG. 25 shows a state such that a 70-inches-diagonal image is projected at a projection distance of 544 mm in numerical practical example 2. FIG. 26 shows a state such that a 50-inches-diagonal image is projected at a projection distance of 400 mm in numerical practical example 2.

In FIGS. 24, 25 and 26, the light-valve element is a 0.16-inches-diagonal one and the aspect ratio thereof is 9:16.

FIG. 27 shows the object plane 1 to the second optical system 4 in any of FIGS. 24, 25 and 26.

Similarly to FIGS. 5, 6 and 7, an intermediate image is provided and the image plane of the intermediate image is curved to the under side.

Herein, although folding of the optical path of the first optical system by a folding mirror as shown in FIGS. 8 and 9 is not provided in FIG. 27, space for arranging a folding mirror 7 to conduct such folding is sufficiently retained, and although the optical path is schematically drawn in a straight one, the optical path is allowed to be folded by the folding mirror 7.

Whereas a lens at the side of reduction, that is, at the side of an object plane is moved with respect to the folding mirror 7 in numerical practical example 1, a lens at the side of enlargement, that is, between the folding mirror and the second optical system 4 is moved with respect to the folding mirror 7 in numerical practical example 2. Thus, a cam mechanism for moving a lens may be a lens group at the side of reduction with respect to the folding mirror 7 or may be a lens group at the side of enlargement.

Figure 28:
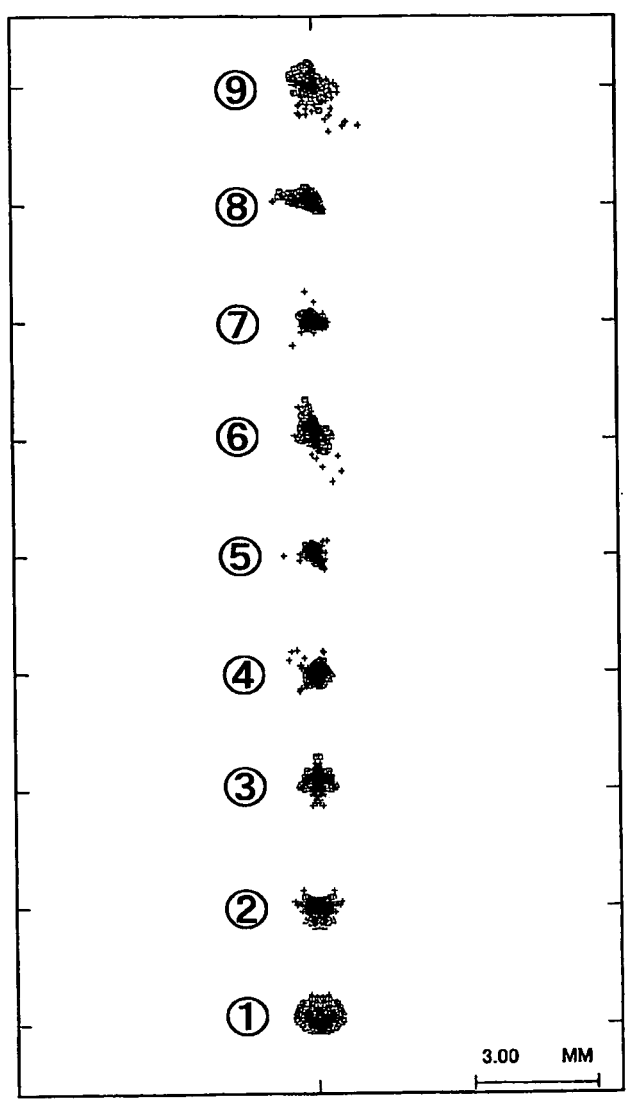
FIG. 28 is a diagram showing a spot diagram on an image plane at a magnification ration of 164.7 in numerical practical example 2.
Figure 29:
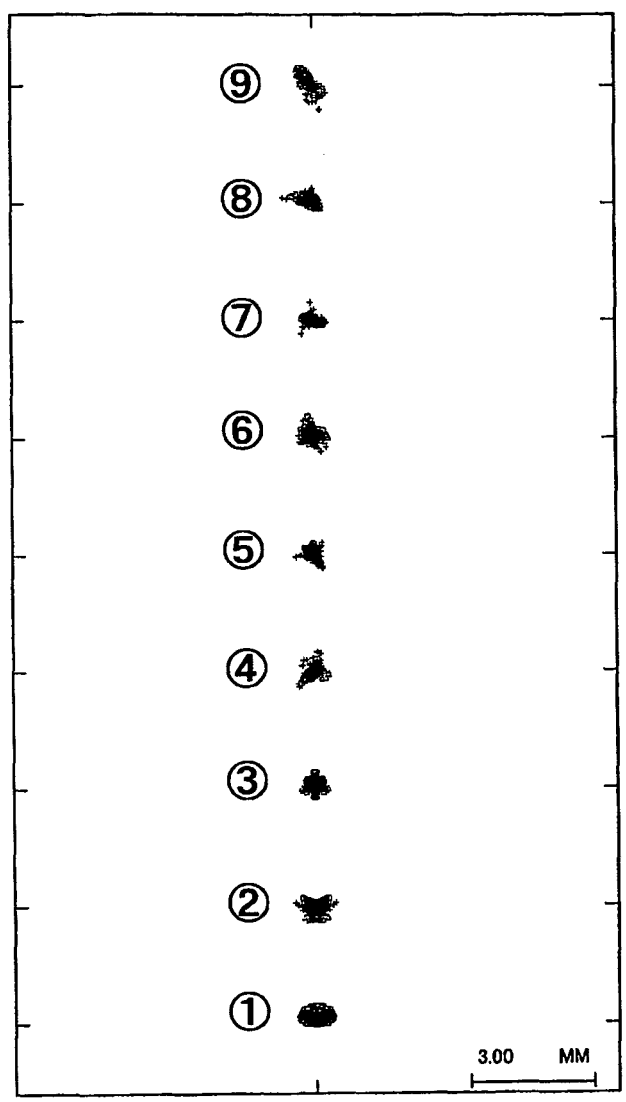
FIG. 29 is a diagram showing a spot diagram on an image plane at a magnification ration of 115.3 in numerical practical example 2.

FIG. 28 is a diagram showing a spot diagram on an image plane at a magnification ratio of 164.7 in numerical practical example 2. Similarly, FIG. 29 is a diagram showing a spot diagram on an image plane at a magnification ratio of 115.3 in numerical practical example 2. Furthermore, FIG. 30 is a diagram showing a spot diagram on an image plane at a magnification ratio of 82.4 in numerical practical example 2.

Figure 30:
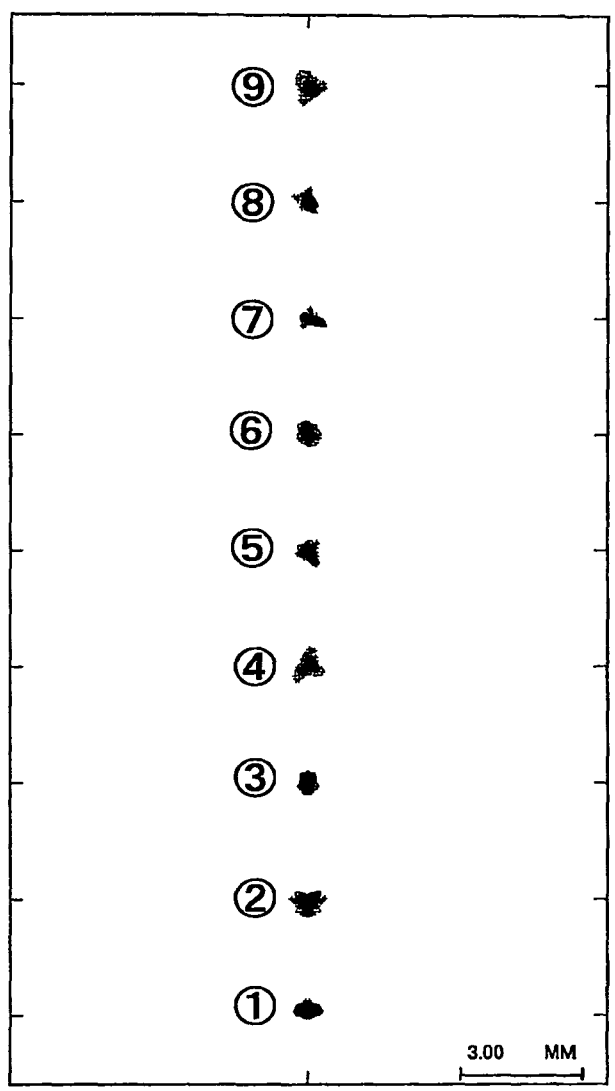
FIG. 30 is a diagram showing a spot diagram on an image plane at a magnification ration of 82.4 in numerical practical example 2.

Herein, FIGS. 28, 29 and 30 show spot diagrams on nine lattice points as shown in FIG. 18, similarly to FIGS. 15, 16 and 17.

Additionally, also in numerical practical example 2, the image plane is in an XY plane and only the positions of spots at the side of +X are shown in FIG. 18 since the spot characteristics on the image plane should be symmetric spot characteristics with respect to the Y-axis in the ±X-directions.

As shown in FIGS. 28, 29 and 30, the light spots are condensed well in any of the projection magnification ratios. In numerical practical example 2, a full-high-definition-television class of resolution (1920×1080) can be obtained.

Figure 31:
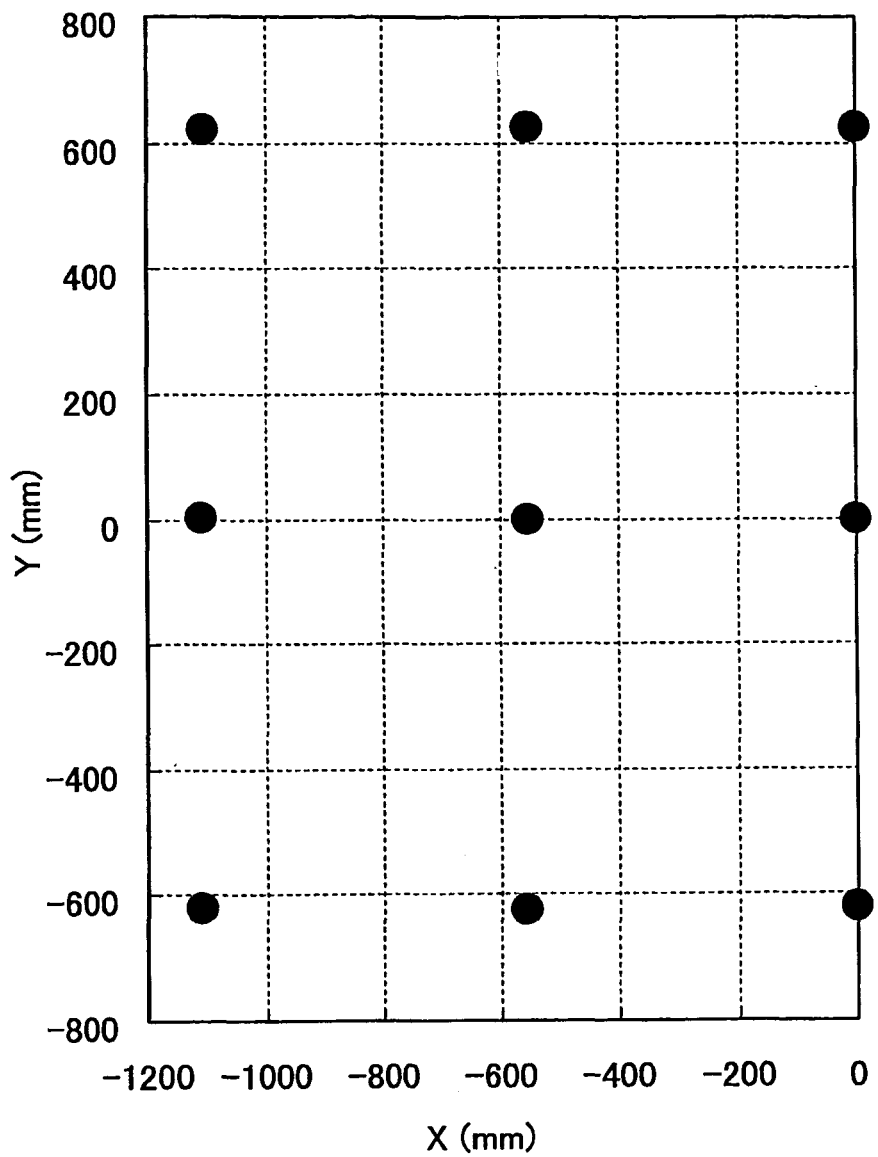
FIG. 31 is a diagram showing a TV distortion characteristic at a projection magnification ratio of 164.7 in numerical practical example 2.
Figure 32:
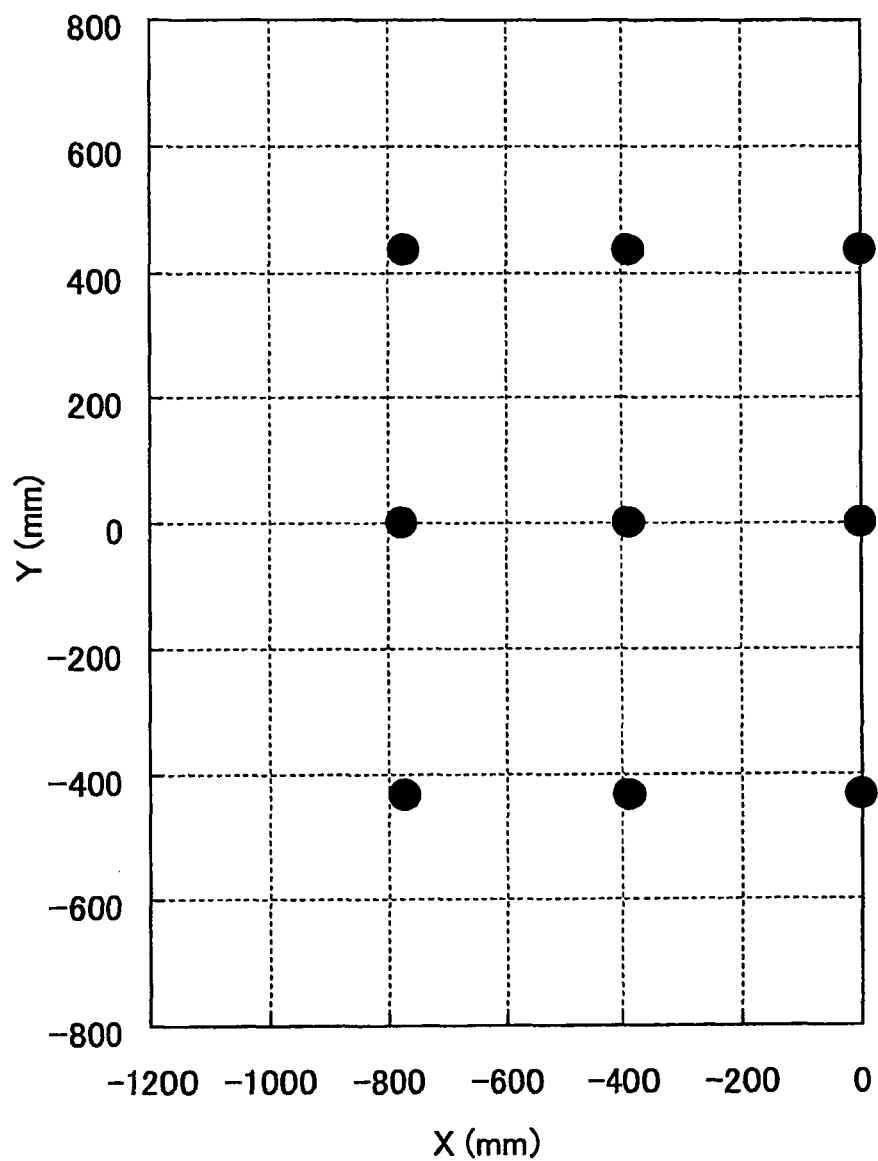
FIG. 32 is a diagram showing a TV distortion characteristic at a projection magnification ratio of 115.3 in numerical practical example 2.
Figure 33:
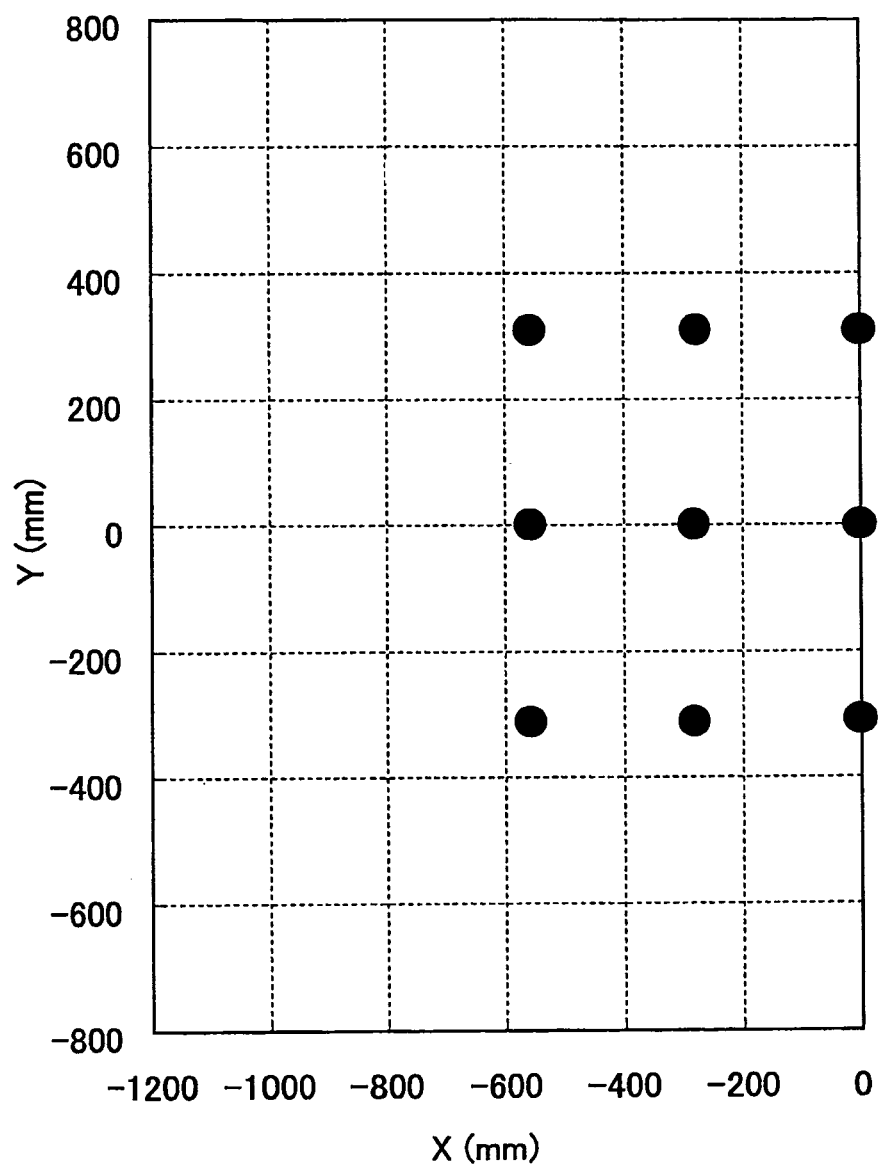
FIG. 33 is a diagram showing a TV distortion characteristic at a projection magnification ratio of 82.4 in numerical practical example 2.

FIG. 31 is a diagram showing a TV distortion characteristic at a projection magnification ratio of 164.7. FIG. 32 is a diagram showing a TV distortion characteristic at a projection magnification ratio of 115.3. FIG. 33 is a diagram showing a TV distortion characteristic at a projection magnification ratio of 82.4. The TV distortion is 1% or less and the distortion is corrected well in any of the cases.

Also, the maximum distances between the image plane and the mirror at projection magnification ratios of 164.7, 115.3, and 82.4 are 759 mm, 544 mm, and 400 mm, respectively. Thus, the distance from the mirror to the image plane is small and the practical example may attain a performance such that enlarging projection with a high magnification ratio in a close range may be allowed. Also, the maximum value of a half angle of view of a principal ray projected toward a projection surface is approximately 71.9° in the projection optical system in numerical practical example 2.

Furthermore, similarly to numerical practical example 1, where "a" is the optical path length of a principal ray from the intermediate image to the impingement thereof on the concave mirror which ray is the uppermost one reaching a portion of a screen in an axis connecting the optical axis of the lens and the center of the screen (the Y-axis, the directions of a short axis of the screen), the optical path length "a" between an intermediate image and a concave mirror in an 100-inches one whose projection distance is large is small and the optical path length "a" between an intermediate image and a concave mirror in a 50-inches one whose projection distance is small is large, as shown in TABLE 21.

TABLE 21

| Image plane size | a |
| --- | --- |
| 100 inches | 113.5 mm |
| 50 inches | 121.1 mm |

Thus, when the projection distance is changed, that is, the projection magnification ratio is changed, from for 100 inches to for 50 inches in numerical practical example 2, it may be confirmed that the intermediate image is moved.

Next, numerical practical example 3 of a projection optical system according to an embodiment of the present invention is shown below, with reference to FIGS. 34-43.

The numerical values of a surface number, radius of curvature, surface distance, refractive index and Abbe number for a projection optical system in the practical example are shown in TABLE 22.

TABLE 22

| Surface number | Radius of curvature (mm) | Surface distance (mm) | Refractive index | Abbe number | Note 1 | Note 2 |
| --- | --- | --- | --- | --- | --- | --- |
| Object | 0.000 | 22.100 | | | | |
| 1 | 0.000 | 12.000 | 1.835 | 43.0 | | |
| 2 | 0.000 | 27.300 | 1.517 | 64.2 | | |
| 3 | 0.000 | 6.050 | | | | |
| 4 | 164.630 | 4.792 | 1.488 | 70.4 | | |
| 5 | −84.820 | 0.300 | | | | |
| 6 | 31.675 | 6.548 | 1.488 | 70.4 | | |
| 7 | 158.047 | 0.300 | | | | |
| 8 | 56.577 | 1.600 | 1.804 | 35.1 | | |
| 9 | 26.874 | 7.546 | 1.488 | 70.4 | | |
| 10 | −365.882 | 0.300 | | | | |
| 11 | −665.123 | 1.600 | 1.762 | 32.2 | | |
| 12 | 22.955 | 10.471 | 1.497 | 81.6 | | |
| 13 | −31.691 | 0.395 | | | | |
| 14 | −30.477 | 1.700 | 1.808 | 40.3 | | |
| 15 | 26.927 | 8.552 | 1.785 | 25.7 | | |
| 16 | −53.271 | 24.826 | | | | |
| 17 | 0.000 | 5.000 | | | | |
| 18 | −52.415 | 1.896 | 1.534 | 58.1 | ○ | |

TABLE 22-continued

| Surface number | Radius of curvature (mm) | Surface distance (mm) | Refractive index | Abbe number | Note 1 | Note 2 |
| --- | --- | --- | --- | --- | --- | --- |
| 19 | −44.013 | *67.772* | | | ○ | |
| 20 | 35.540 | 14.290 | 1.506 | 73.7 | | |
| 21 | 439.032 | 15.735 | | | | |
| 22 | −147.851 | 10.790 | 1.835 | 43.0 | ○ | |
| 23 | 52.844 | *37.629* | | | ○ | |
| 24 | 82.003 | 13.000 | 1.608 | 39.3 | | |
| 25 | −96.520 | *1.827* | | | | |
| 26 | −95.986 | 10.000 | 1.835 | 43.0 | | |
| 27 | 90.174 | *25.217* | | | | |
| 28 | −85.919 | 7.423 | 1.550 | 51.8 | ○ | |
| 29 | −62.856 | 154.802 | | | ○ | |
| 30 | −74.638 | *−738.910* | | | ○ | ○ |
| Image | 0.000 | 0.000 | | | | |

Note 1: An aspherical surface is indicated by a "○" mark.
Note 2: A reflection surface is indicated by a "○" mark.

In TABLE 22, an aspherical surface is indicated by a "O" mark in the column of Note 1. The 18th, 19th, 22th, 23th, 28th, 29th, and 30th surfaces are rotationally symmetric aspherical surfaces.

In TABLE 22, a reflection surface is also indicated by a "O" mark in the column of Note 2. That is, the 30th surface is a mirror surface. Against numerical practical examples 1 and 2, the mirror surface of the second optical system is a rotationally symmetric aspherical surface in numerical practical example 3. In TABLE 22, the values of surface distance which are changed depending on the projection magnification ratio are shown in the italic format.

An optical path length equivalent to that of the case where a cross prism or a polarization beam splitter is provided is provided between an object and the 4th surface.

The coefficients of aspherical surface are shown in TABLES 23-29.

TABLE 23

| | Surface number 18 |
| --- | --- |
| K | 0 |
| A | 1.84E−06 |
| B | −6.61E−09 |
| C | 6.08E−11 |
| D | −1.13E−13 |

TABLE 24

| | Surface number 19 |
| --- | --- |
| K | 0 |
| A | 1.71E−06 |
| B | −7.40E−09 |
| C | 5.89E−11 |
| D | −1.07E−13 |

TABLE 25

| | Surface number 22 |
| --- | --- |
| K | 0 |
| A | −1.18E−05 |

TABLE 25-continued

| | Surface number 22 |
|---|---|
| B | 1.67E−08 |
| C | −1.30E−11 |
| D | 3.94E−16 |
| E | 2.64E−17 |
| F | −2.74E−20 |

TABLE 26

| | Surface number 23 |
|---|---|
| K | −10.1056 |
| A | −3.89E−06 |
| B | 1.37E−08 |
| C | −1.49E−11 |
| D | 1.32E−14 |
| E | 6.37E−18 |
| F | −5.72E−21 |

TABLE 27

| | Surface number 28 |
|---|---|
| K | 0 |
| A | −5.36E−06 |
| B | −1.27E−08 |
| C | 2.26E−11 |
| D | −1.89E−14 |

TABLE 28

| | Surface number 29 |
|---|---|
| K | 0 |
| A | −3.53E−06 |
| B | −1.26E−08 |
| C | 2.57E−11 |
| D | −3.21E−14 |
| E | 2.09E−17 |
| F | −8.00E−21 |

TABLE 29

| | Surface number 30 |
|---|---|
| K | −2.2565 |
| A | −1.44E−07 |
| B | 7.94E−12 |
| C | −4.34E−16 |
| D | −1.95E−20 |
| E | 3.69E−24 |
| F | −1.41E−28 |

TABLE 30

| 4th order coefficient | A |
|---|---|
| 6th order coefficient | B |
| 8th order coefficient | C |
| 10th order coefficient | D |
| 12th order coefficient | E |
| 14th order coefficient | F |

The relation between the orders of the coefficients provided in the above formula (a) and the symbols of the coefficients are summarized in TABLE 30.

The numerical aperture (NA) of the optical system at the side of an object in numerical practical example 3 is 0.20.

In numerical practical example 3, the center of an image plane is arranged to be shifted to a +Y direction by 5.80 mm with respect to the optical axis of the first optical system.

Additionally, the magnification ratio of numerical practical example 3 in TABLE 22 is 131.8.

Also, the values of the surface distance in the states of different magnification ratios in numerical practical example 3 are shown in TABLE 31.

In TABLE 31, for example, surface distance d19 means the surface distance between the surface of number 19 and the surface of number 20.

TABLE 31

| | Magnification | | |
|---|---|---|---|
| | 131.77 | 98.83 | 65.89 |
| d19 | 67.772 | 69.026 | 71.398 |
| d23 | 37.629 | 30.428 | 13.482 |
| d25 | 1.827 | 2.278 | 3.183 |
| d27 | 25.217 | 30.713 | 44.381 |
| d30 | −738.910 | −570.890 | −400.000 |

Figure 34:
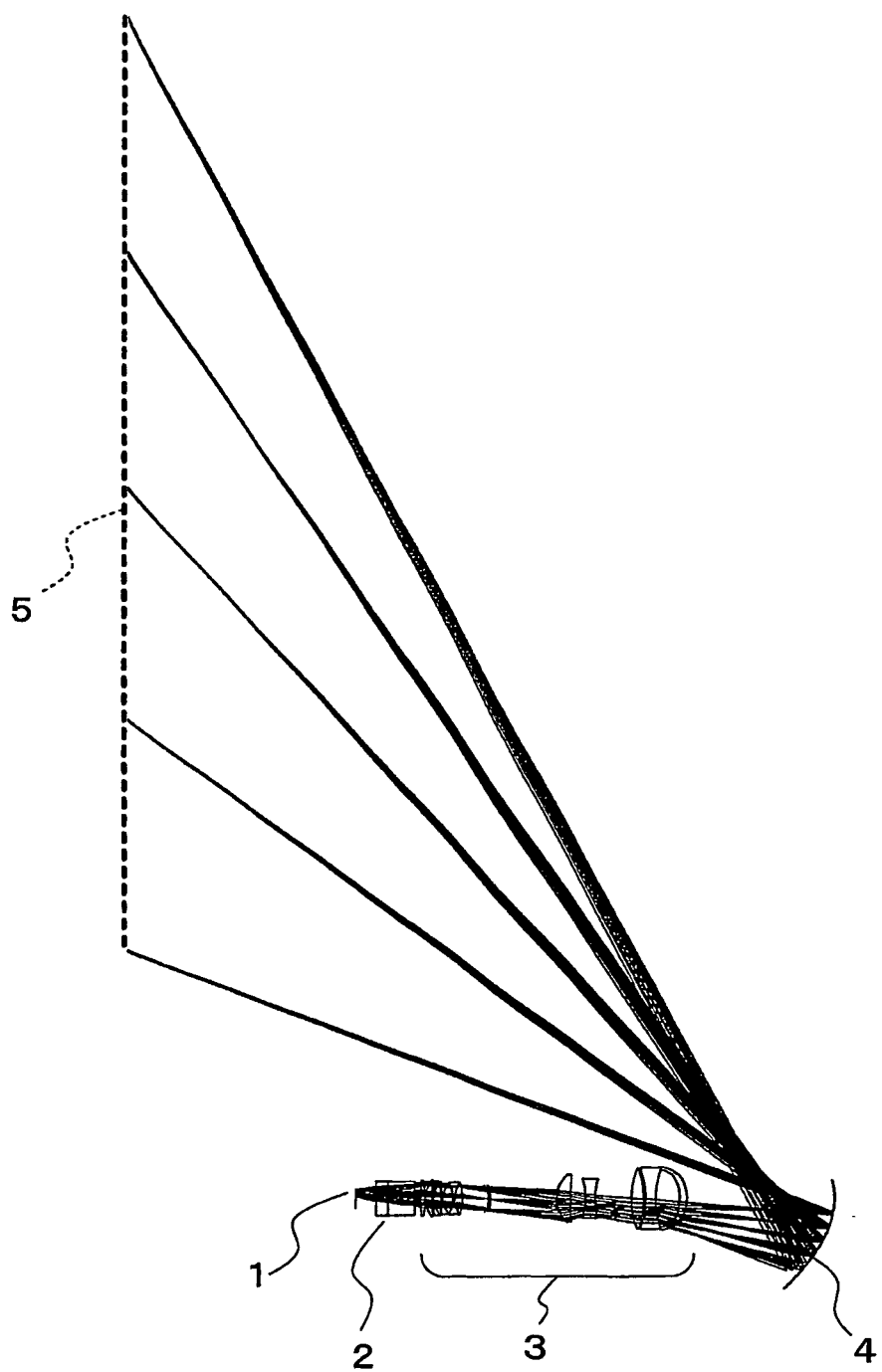
FIG. 34 is a diagram showing a state such that an 80-inches-diagonal image is projected at a projection distance of 739 mm in numerical practical example 3.

FIG. 34 shows a state such that an 80-inches-diagonal image is projected at a projection distance of 739 mm in numerical practical example 3.

Figure 35:
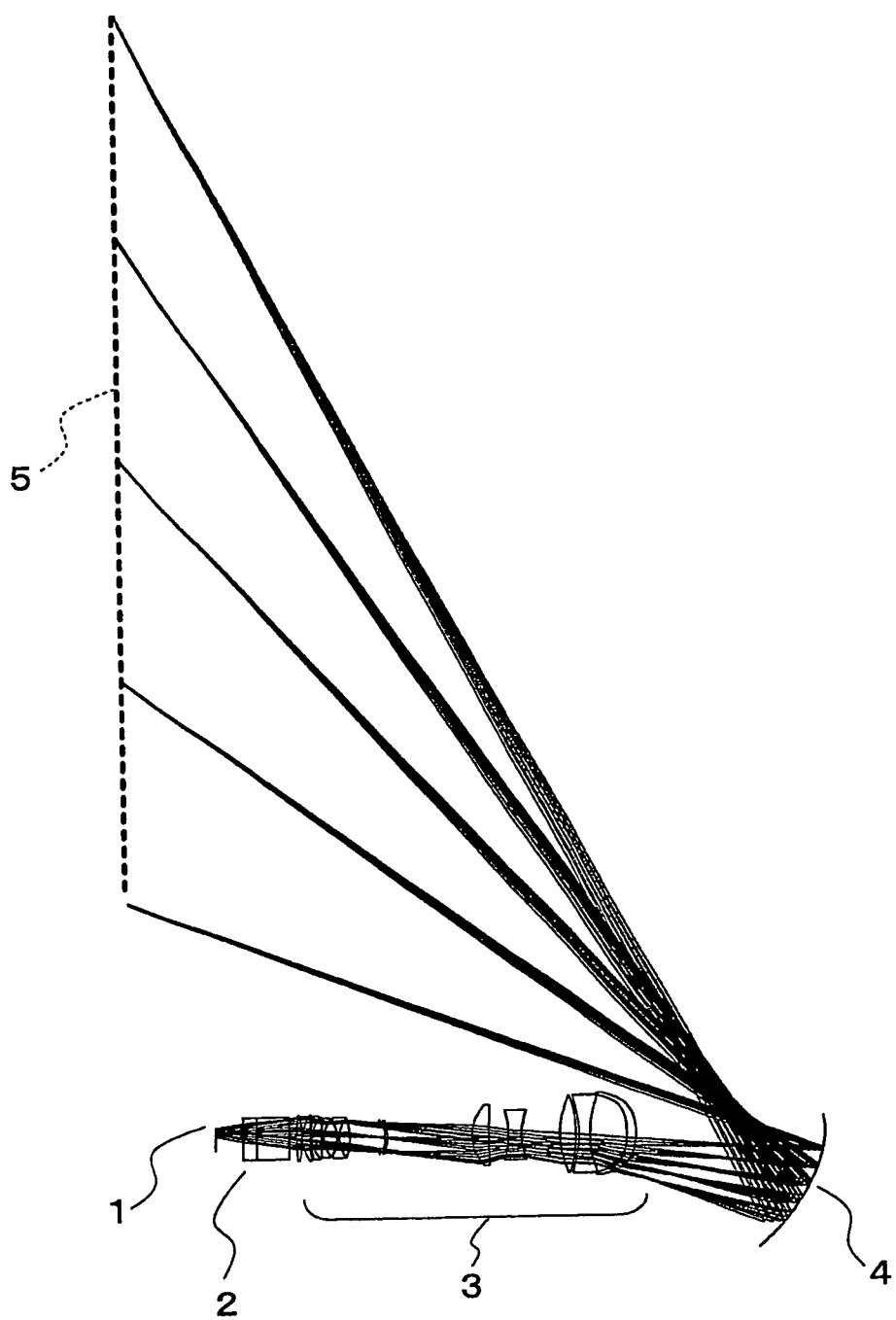
FIG. 35 is a diagram showing a state such that a 60-inches-diagonal image is projected at a projection distance of 571 mm in numerical practical example 3.

FIG. 35 shows a state such that a 60-inches-diagonal image is projected at a projection distance of 571 mm in numerical practical example 3.

Figure 36:
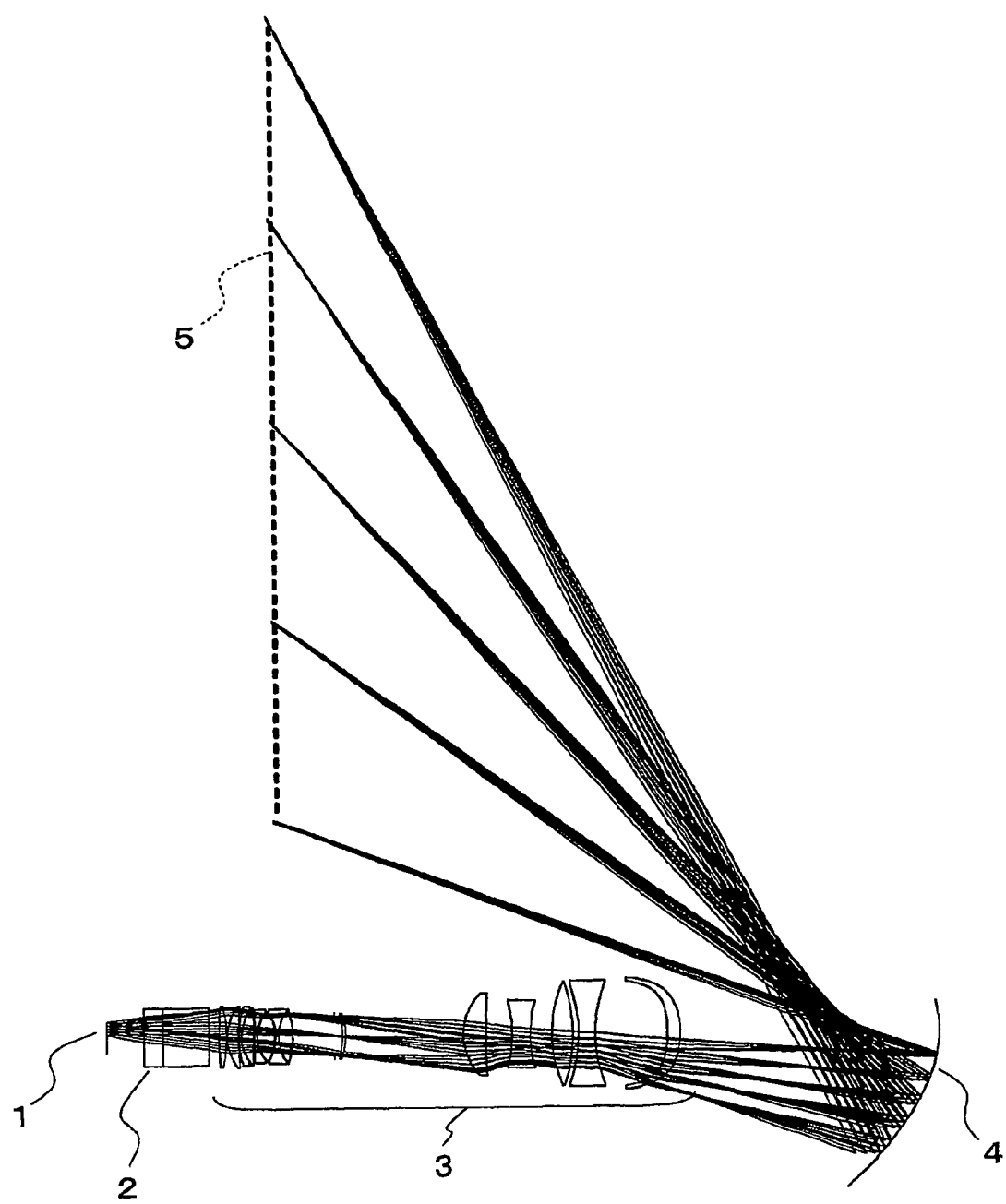
FIG. 36 is a diagram showing a state such that a 40-inches-diagonal image is projected at a projection distance of 400 mm in numerical practical example 3.

FIG. 36 shows a state such that a 40-inches-diagonal image is projected at a projection distance of 400 mm in numerical practical example 3.

In FIGS. 34, 35 and 36, the light-valve element is a 0.16-inches-diagonal one and the aspect ratio thereof is 9:16.

Figure 37:
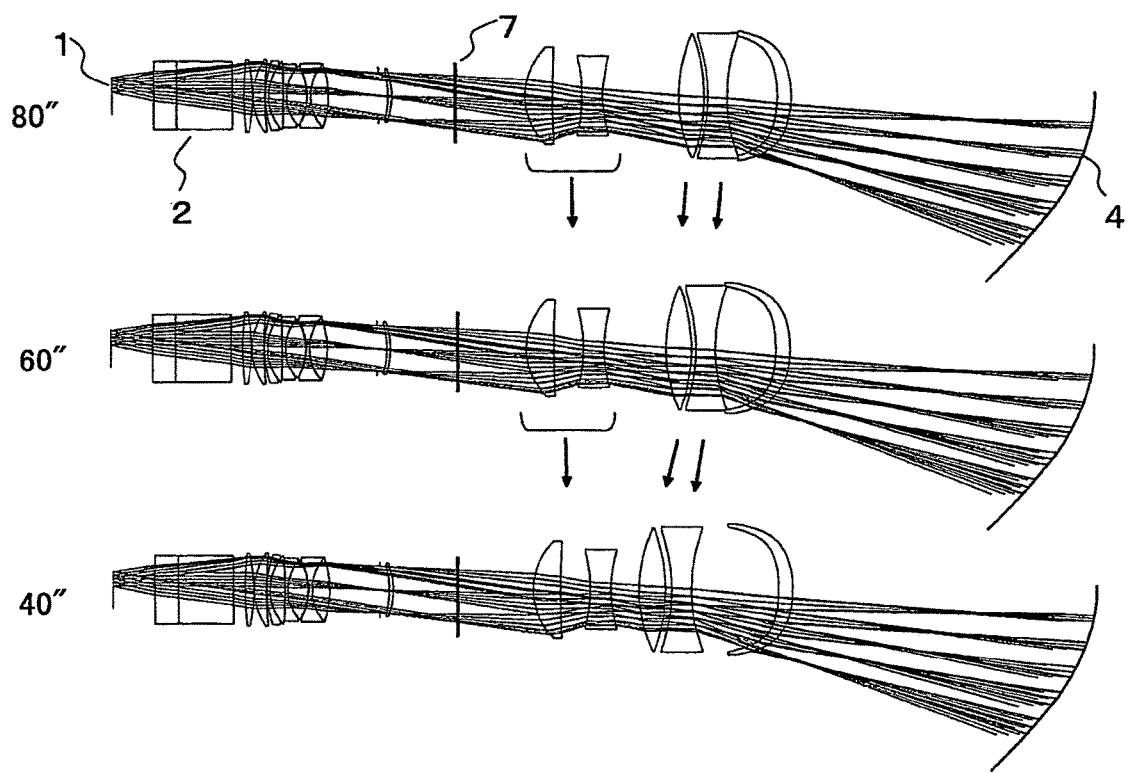
FIG. 37 shows an enlargement of an object plane 1 to a second optical system 4 in any of FIGS. 34, 35 and 36.

FIG. 37 shows the object plane 1 to the second optical system 4 in any of FIGS. 34, 35 and 36.

Similarly to FIGS. 5, 6 and 7, an intermediate image is provided and the image plane of the intermediate image is curved to the under side.

Herein, although folding of the optical path of the first optical system by a folding mirror as shown in FIGS. 8 and 9 is not provided in FIG. 37, space for arranging a folding mirror 7 to conduct such folding is sufficiently retained, and although the optical path is schematically drawn in a straight one, the optical path is allowed to be folded by the folding mirror 7.

Similarly to numerical practical example 2, a lens at the side of enlargement, that is, between the folding mirror and the second optical system 4 is moved with respect to the folding mirror 7. Lens elements after the folding mirror can be considered a second lens group of the lens system.

Figure 38:
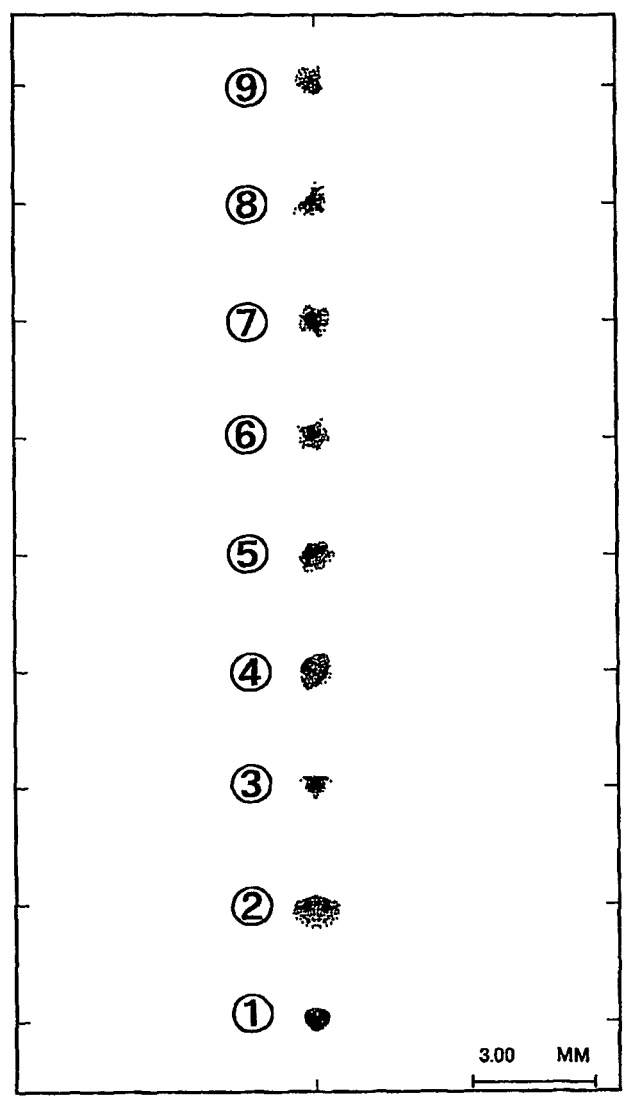
FIG. 38 is a diagram showing a spot diagram on an image plane at a magnification ratio of 131.8 in numerical practical example 3.
Figure 39:
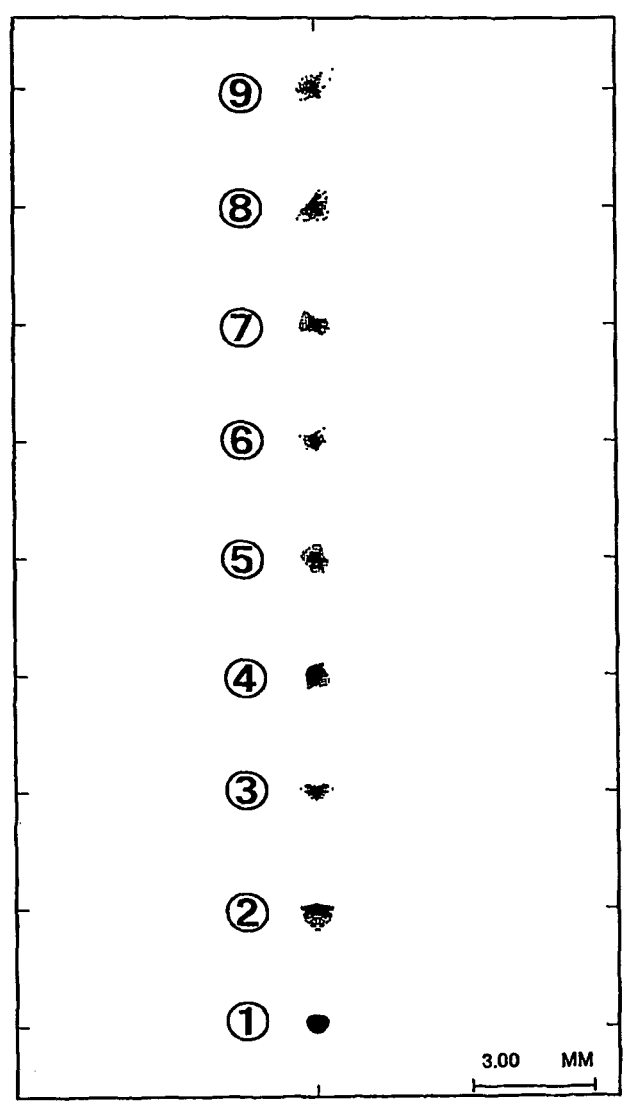
FIG. 39 is a diagram showing a spot diagram on an image plane at a magnification ratio of 98.8 in numerical practical example 3.

FIG. 38 is a diagram showing a spot diagram on an image plane at a magnification ratio of 131.8 in numerical practical example 3. Similarly, FIG. 39 is a diagram showing a spot diagram on an image plane at a magnification ratio of 98.8 in numerical practical example 3. Furthermore, FIG. 40 is a diagram showing a spot diagram on an image plane at a magnification ratio of 65.9 in numerical practical example 3.

Figure 40:
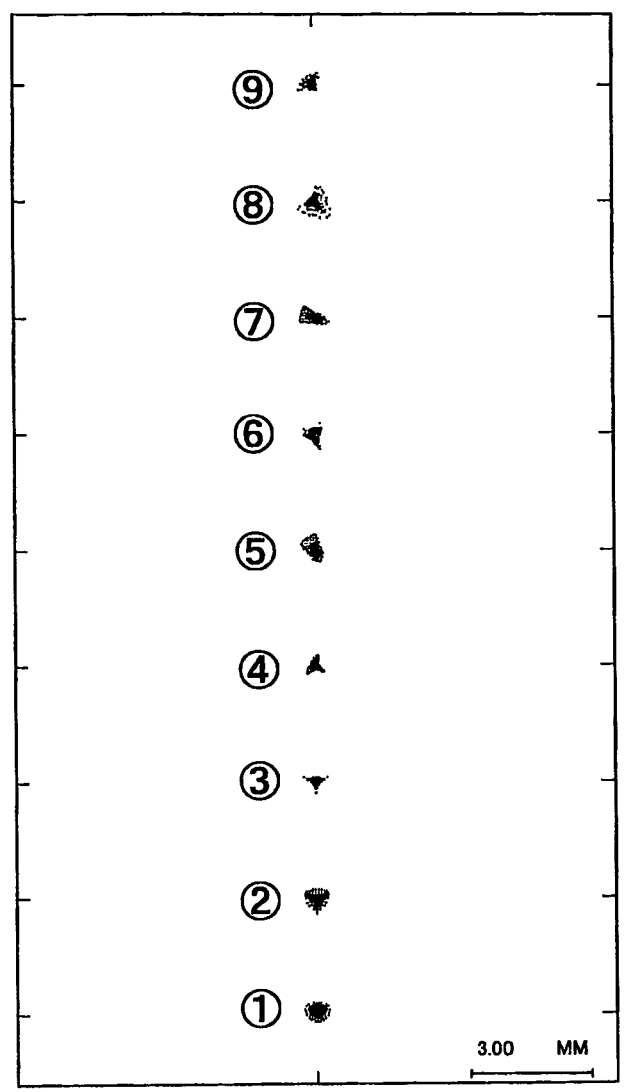
FIG. 40 is a diagram showing a spot diagram on an image plane at a magnification ratio of 65.9 in numerical practical example 3.

Herein, FIGS. 38, 39 and 40 show spot diagrams on nine lattice points as shown in FIG. 18, similarly to FIGS. 15, 16 and 17.

Additionally, also in numerical practical example 3, the image plane is in an XY plane and only the positions of spots at the side of +X are shown in FIG. 18 since the spot characteristics on the image plane should be symmetric spot characteristics with respect to the Y-axis in the ±X-directions.

As shown in FIGS. 38, 39 and 40, the light spots are condensed well in any of the projection magnification ratios. In numerical practical example 3, a full-high-definition television class of resolution (1920×1080) can be obtained.

Figure 41:
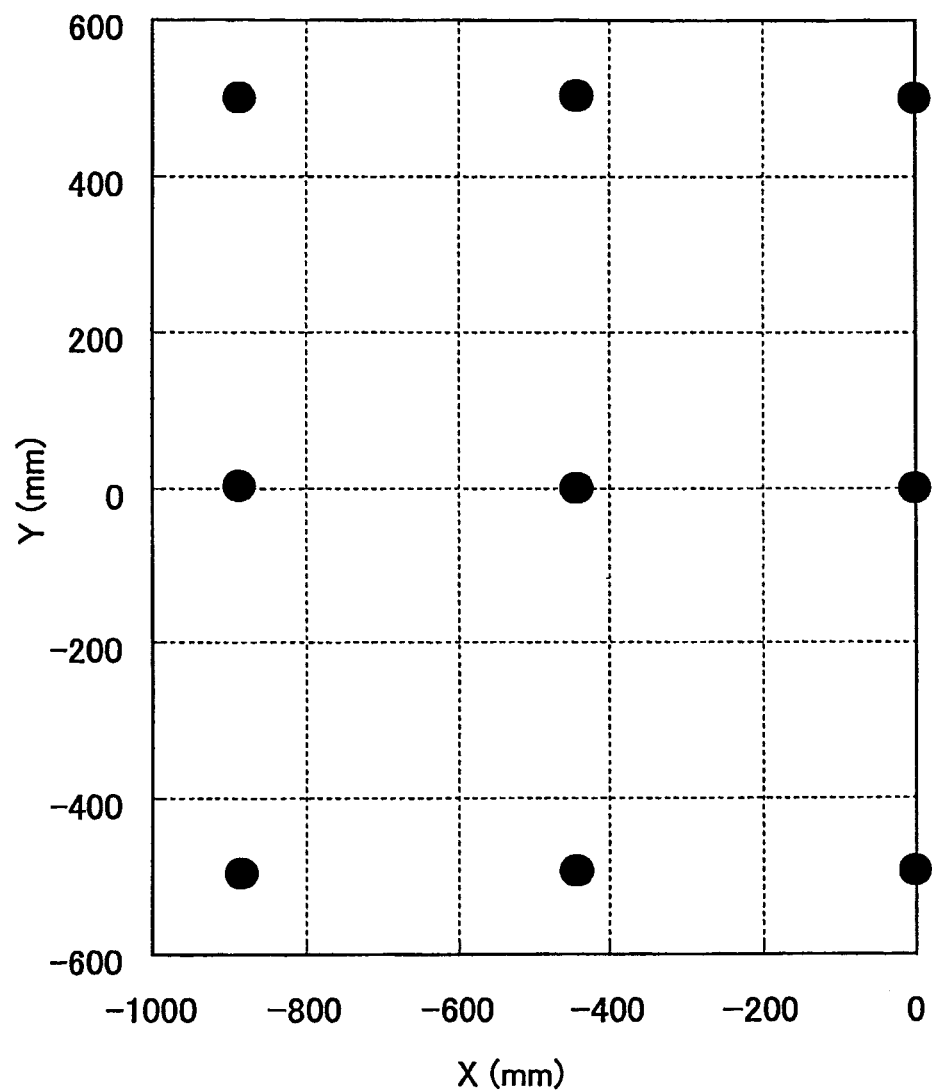
FIG. 41 is a diagram showing a TV distortion characteristic at a projection magnification ratio of 131.8 in numerical practical example 3.
Figure 42:
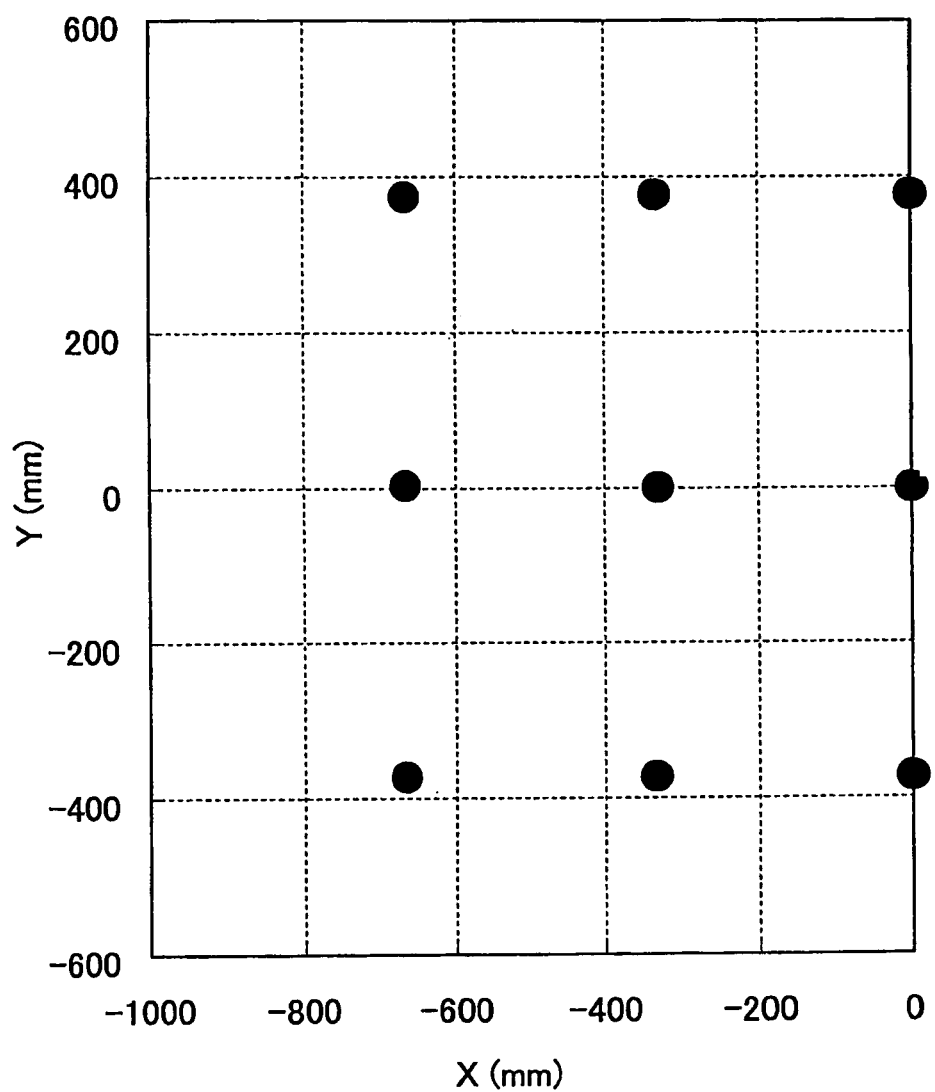
FIG. 42 is a diagram showing a TV distortion characteristic at a projection magnification ratio of 98.8 in numerical practical example 3.
Figure 43:
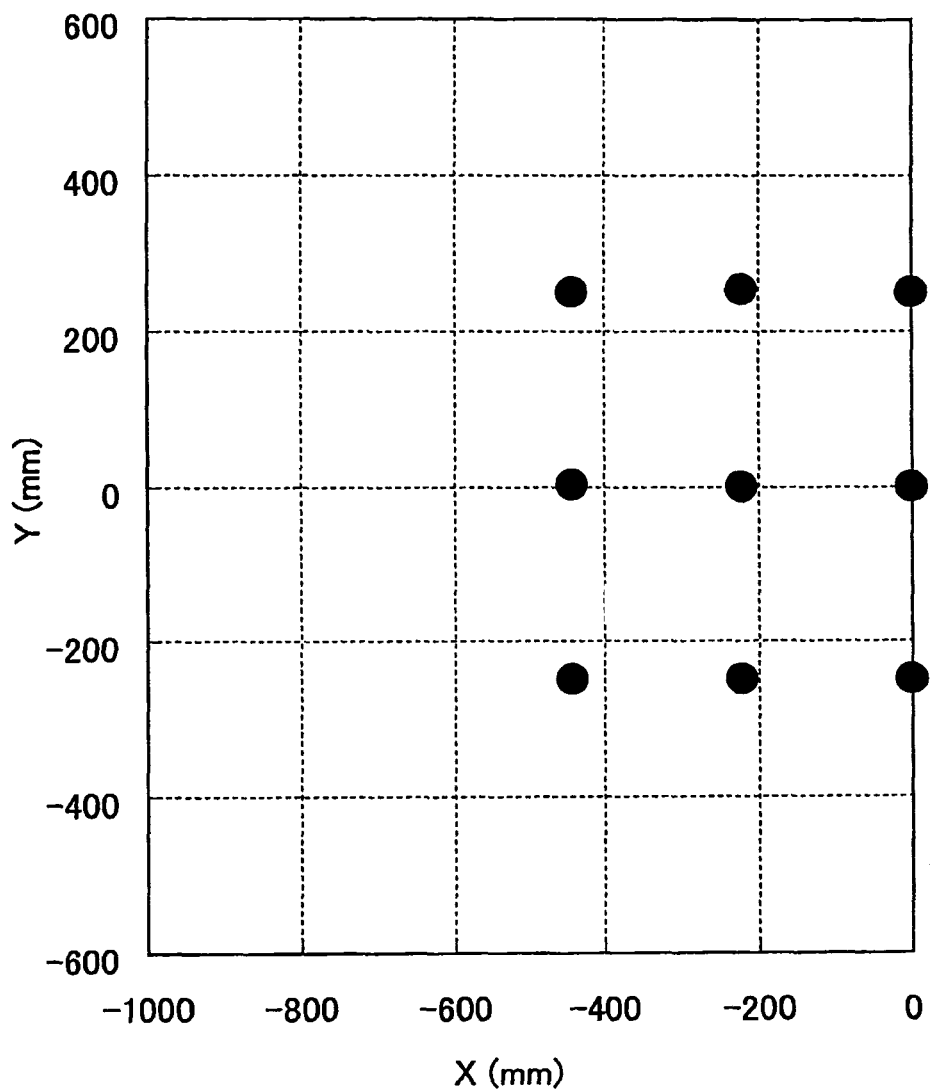
FIG. 43 is a diagram showing a TV distortion characteristic at a projection magnification ratio of 65.9 in numerical practical example 3.

FIG. 41 is a diagram showing a TV distortion characteristic at a projection magnification ratio of 131.8. FIG. 42 is a diagram showing a TV distortion characteristic at a projection magnification ratio of 98.8. FIG. 43 is a diagram showing a TV distortion characteristic at a projection magnification ratio of 65.9. The TV distortion is 1% or less and the distortion is corrected well in any of the cases.

Also, the maximum distances between the image plane and the mirror at projection magnification ratios of 131.8, 98.8, and 65.9 are 739 mm, 571 mm, and 400 mm, respectively. Thus, the distance from the mirror to the image plane is small and the practical example may attain a performance such that enlarging projection with a high magnification ratio in a close range may be allowed.

Also, the maximum value of a half angle of view of a principal ray projected toward a projection surface is approximately 67.7° in the projection optical system in numerical practical example 3.

Furthermore, similarly to numerical practical example 1, where "a" is the optical path length of a principal ray from the intermediate image to the impingement thereof on the concave mirror which ray is the uppermost one reaching a portion of a screen in an axis connecting the optical axis of the lens and the center of the screen (the Y-axis, the directions of a short axis of the screen), the optical path length "a" between an intermediate image and a concave mirror in an 80-inches one whose projection distance is large is small and the optical path length "a" between an intermediate image and a concave mirror in a 40-inches one whose projection distance is small is large, as shown in TABLE 32.

TABLE 32

| Image plane size | a |
|---|---|
| 80 inches | 106.2 mm |
| 40 inches | 111.2 mm |

Thus, when the projection distance is changed, that is, the projection magnification ratio is changed, from for 80 inches to for 40 inches in numerical practical example 3, it may be confirmed that the intermediate image is moved.

Although an embodiment(s) and/or a practical example(s) of the present invention has/have been specifically described above, the present invention is not limited to the embodiment(s) and/or practical example(s) and the embodiment(s) and/or practical example(s) may be altered or modified without departing from the spirit and scope of the present invention.

[Appendix]

Typical embodiments (1) to (20) of the present invention are provided below.

Embodiment (1) is a projection optical system comprising a first optical system configured to form a first image conjugated with an object and a second optical system configured to project a second image conjugated with the first image toward a projection surface, in which at least one of the first optical system and second optical system comprises at least one optical element(s) movable relative to the object, characterized in that an image distance of the projection optical system is changed and a size of the second image is changed, by moving at least one of the optical element(s) relative to the object.

Embodiment (2) is the projection optical system as described in embodiment (1) above, characterized in that a distance between the first image and the second optical system is changed by moving at least one of the optical element(s) relative to the object.

Embodiment (3) is the projection optical system as described in embodiment (1) or (2) above, characterized in that the first optical system comprises at least one of the optical element(s) and the first image is moved relative to the object by moving at least one of the optical element(s) comprised in the first optical system relative to the object.

Embodiment (4) is the projection optical system as described in embodiment (3) above, characterized in that the second optical system is fixed relative to the object.

Embodiment (5) is the projection optical system as described in embodiment (4) above, characterized in that when a focal length of the first optical system is changed from a first focal length to a second focal length and a size of the second image is changed from a first size to a second size by moving at least one of the optical element(s) comprised in the first optical system relative to the object, a ratio of the second focal length to the first focal length is different from a ratio of the second size to the first size.

Embodiment (6) is the projection optical system as described in embodiment (5) above, characterized in that when the second focal length is greater than the first focal length and the second size is greater than the first size, a ratio of the second size to the first size is greater than a ratio of the second focal length to the first focal length.

Embodiment (7) is the projection optical system as described in any of embodiments (1) to (6) above, characterized in that at least one of the first optical system and second optical system, which comprise(s) at least one of the optical element(s), is a coaxial optical system.

Embodiment (8) is the projection optical system as described in any of embodiments (1) to (7) above, characterized in that one of the first optical system and second optical system comprises the at least one optical element(s) and comprises optical element(s) more than an optical element(s) constituting the other of the first optical system or second optical system.

Embodiment (9) is the projection optical system as described in any of embodiments (1) to (8) above, characterized in that a half angle of view of a principal ray projected toward the projection surface is substantially constant while a size of the second image is changed.

Embodiment (10) is the projection optical system as described in embodiment (9) above, characterized in that a maximum vale of a half angle of view of a principal ray projected toward the projection surface is equal to or greater than 60°.

Embodiment (11) is the projection optical system as described in any of embodiments (1) to (10) above, characterized in that the second optical system comprises at least one optical element with a reflection surface having a positive power.

Embodiment (12) is the projection optical system as described in embodiment (11) above, characterized in that at least one of the reflection surface(s) having a positive power in the at least one optical element with a reflection surface having a positive power is a rotationally symmetric aspherical surface.

Embodiment (13) is the projection optical system as described in embodiment (11) above, characterized in that at least one of the reflection surface(s) having a positive power in the at least one optical element with a reflection surface having a positive power is a free-form surface.

Embodiment (14) is the projection optical system as described in any of embodiments (11) to (13) above, characterized in that a number of the at least one optical element with a reflection surface having a positive power, comprised in the second optical system is one.

Embodiment (15) is the projection optical system as described in any of embodiments (1) to (14) above, characterized in that at least one folding mirror configured to fold an optical path from the object to the second image is comprised in the optical path.

Embodiment (16) is the projection optical system as described in embodiment (15) above, characterized in that the at least one optical element(s) movable relative to the object is arranged at a side of the object or at a side of the second image relative to the at least one folding mirror.

Embodiment (17) is the projection optical system as described in embodiment (15) or (16) above, characterized in that the at least one folding mirror is arranged between the object and the first image.

Embodiment (18) is the projection optical system as described in any of embodiments (1) to (17) above, characterized in that the first image has a curvature of field which curves toward a side of the object.

Embodiment (19) is the projection optical system as described in any of embodiments (1) to (18) above, characterized in that the first optical system is a coaxial optical system and the object is decentered relative to an optical axis of the first optical system.

Embodiment (20) is an image projecting apparatus configured to project an image onto a projection surface, characterized by comprising the projection optical system as described in any of embodiments (1) to (19) above.

INDUSTRIAL APPLICABILITY

An embodiment of the present invention may be applied to a projection optical system, an enlargement projection optical system, a variable magnification projection optical system and an image displaying apparatus such as a projector. For example, an embodiment of the present invention may be applied to a projection optical system of an image projecting apparatus such as a projection apparatus, and in particular, may be applied to a projection optical system for attaining projection in a close range in a front projector.

The present application claims the benefits of the priorities based on Japanese patent application No. 2006-327592 filed on Dec. 4, 2006 and Japanese patent application No. 2007-264801 filed on Oct. 10, 2007, the entire contents of which are hereby incorporated by reference.

The invention claimed is:

1. A projection optical system comprising:
   a first optical system configured to form a first image conjugated with an object; and
   a second optical system configured to form a second image onto a projection surface,
   wherein the object is shifted from an optical axis of the first optical system,
   wherein the first optical system includes a first lens group and a second lens group sequentially from the object,
   wherein the first lens group has positive power,
   wherein the second lens group includes a first lens having positive power, a second lens having negative power, a third lens having positive power, a fourth lens having negative power, and a fifth lens having positive power sequentially from the object,
   wherein the second optical system forms the second image by converging, with a positive power of the second optical system, a light beam diverged after the first image is formed,
   wherein the first lens, the second lens, the third lens, and the fourth lens are movable relative to the object to change a focal position of the first image and a focal position of the second image and thereby to change a size of the second image, the first lens group and the second lens group allowing a light beam to pass therethrough,
   and
   wherein, the first lens and the second lens move towards the second optical system and the third lens and the fourth lens move towards the object to change focal positions of the first and second images and to change the size of the second image.

2. The projection optical system as claimed in claim 1, wherein a distance between the first image and the second optical system is changed by moving the first lens, the second lens, the third lens, and the fourth lens relative to the object.

3. The projection optical system as claimed in claim 1, wherein the second optical system is fixed relative to the object.

4. The projection optical system as claimed in claim 3, wherein a focal length of the first optical system is changed from a first focal length to a second focal length and a size of the second image is changed from a first size to a second size by moving the first lens, the second lens, the third lens, and the fourth lens relative to the object, and a ratio of the second focal length to the first focal length is different from a ratio of the second size to the first size.

5. The projection optical system as claimed in claim 4, wherein the second focal length is greater than the first focal length and the second size is greater than the first size, and a ratio of the second size to the first size is greater than a ratio of the second focal length to the first focal length.

6. The projection optical system as claimed in claim 1, wherein the first optical system is a coaxial optical system.

7. The projection optical system as claimed in claim 1, wherein the first optical system comprises a number of optical elements which is greater than a number of optical element(s) constituting the second optical system.

8. The projection optical system as claimed in claim 1, wherein a half angle of view of a principal ray projected toward the projection surface is substantially constant while a size of the second image is changed.

9. The projection optical system as claimed in claim 8, wherein a maximum value of a half angle of view of a principal ray projected toward the projection surface is equal to or greater than 60°.

10. The projection optical system as claimed in claim 1, wherein the second optical system comprises at least one optical element with a reflection surface having a positive power.

11. The projection optical system as claimed in claim 10, wherein the reflection surface having a positive power is a rotationally symmetric aspherical surface.

12. The projection optical system as claimed in claim 10, wherein the reflection surface having a positive power is a free-form surface.

13. The projection optical system as claimed in claim 10, wherein a number of the at least one optical element with a reflection surface having a positive power, comprised in the second optical system is one.

14. The projection optical system as claimed in claim 1, wherein at least one folding mirror configured to fold an optical path from the object to the second image is comprised in the optical path.

15. The projection optical system as claimed in claim 14, wherein second lens group is arranged at a side of the object or at a side of the second image relative to the at least one folding mirror.

16. The projection optical system as claimed in claim 14, wherein the at least one folding mirror is arranged between the object and the first image.

17. The projection optical system as claimed in claim 1, wherein the first image has a curvature of field which curves toward a side of the object.

18. The projection optical system as claimed in claim 1, wherein the first optical system is a coaxial optical system and the object is decentered relative to an optical axis of the first optical system.

19. The projection optical system as claimed in claim 1, wherein the first optical system comprises ten lenses.

20. The projection optical system as claimed in claim 1, wherein at least one lens moves with distance that is different from that of the other movable lenses.

* * * * *